(12) United States Patent
Goddard et al.

(10) Patent No.: US 11,814,533 B2
(45) Date of Patent: Nov. 14, 2023

(54) CURABLE POLYMERIC COATINGS FOR FUNCTIONAL SURFACE PREPARATIONS

(71) Applicant: Cornell University, Ithaca, NY (US)

(72) Inventors: Julie M. Goddard, Ithaca, NY (US); Zhuangsheng Lin, Amherst, MA (US)

(73) Assignee: CORNELL UNIVERSITY, Ithaca, NY (US)

(*) Notice: Subject to any disclaimer, the term of this patent is extended or adjusted under 35 U.S.C. 154(b) by 699 days.

(21) Appl. No.: 16/626,186

(22) PCT Filed: Jun. 22, 2018

(86) PCT No.: PCT/US2018/038913
§ 371 (c)(1),
(2) Date: Dec. 23, 2019

(87) PCT Pub. No.: WO2018/237224
PCT Pub. Date: Dec. 27, 2018

(65) Prior Publication Data
US 2020/0216708 A1    Jul. 9, 2020

Related U.S. Application Data

(60) Provisional application No. 62/524,123, filed on Jun. 23, 2017.

(51) Int. Cl.
| | |
|---|---|
| C09D 133/14 | (2006.01) |
| C09D 133/04 | (2006.01) |
| B65D 23/02 | (2006.01) |
| B65D 25/14 | (2006.01) |
| C08F 2/46 | (2006.01) |
| B32B 5/16 | (2006.01) |
| B32B 13/04 | (2006.01) |
| B32B 5/18 | (2006.01) |
| B32B 15/18 | (2006.01) |
| B32B 27/08 | (2006.01) |
| B32B 5/32 | (2006.01) |
| B32B 27/34 | (2006.01) |
| B32B 27/36 | (2006.01) |
| B32B 27/32 | (2006.01) |
| B32B 27/38 | (2006.01) |
| B32B 27/12 | (2006.01) |
| B65D 1/02 | (2006.01) |
| C08F 220/68 | (2006.01) |
| C08L 33/14 | (2006.01) |
| C08L 33/04 | (2006.01) |

(52) U.S. Cl.
CPC .......... *C09D 133/14* (2013.01); *B65D 1/0215* (2013.01); *B65D 23/02* (2013.01); *B65D 25/14* (2013.01); *C08F 2/46* (2013.01); *C08F 220/68* (2013.01); *C08L 33/04* (2013.01); *C08L 33/14* (2013.01); *C09D 133/04* (2013.01)

(58) Field of Classification Search
None
See application file for complete search history.

(56) References Cited

U.S. PATENT DOCUMENTS

| | | | |
|---|---|---|---|
| 8,632,838 | B2 | 1/2014 | Roth et al. |
| 9,156,606 | B2 | 10/2015 | Goddard et al. |
| 9,956,542 | B2 | 5/2018 | Haupt et al. |
| 2003/0113792 | A1 | 6/2003 | Swan et al. |
| 2008/0254234 | A1 | 10/2008 | Fink et al. |
| 2009/0220436 | A1 | 9/2009 | Anderson et al. |
| 2015/0031846 | A1 | 1/2015 | Backer et al. |
| 2016/0270732 | A1 | 9/2016 | Kallback et al. |

FOREIGN PATENT DOCUMENTS

| | | |
|---|---|---|
| WO | 2005095507 A1 | 10/2005 |
| WO | 2017030950 A1 | 2/2017 |

OTHER PUBLICATIONS

Lin et al., "Preparation of Metal-Chelating Active Packaging Materials via Photo-Curable Metal-Chelating Coatings," Gordon Research Conference, POSTER (Jul. 22, 2017).
Lin et al., "Reducing Additive Use via Non-Migratory Active Packaging Technologies," Presentation at the Institute of Food Technologists Annual Meeting (Jun. 27, 2017).
International Search Report and Written Opinion for corresponding Application No. PCT/US2018/038913 (dated Oct. 30, 2018).
Lin et al., "Photoreactive Polymers Bearing a Zwitterionic Phosphorylcholine Group for Surface Modification of Biomaterials," ACS App. Mater. Interfaces, 7:117489-17498 (2015).
Lin et al., "Synthesis of Iminodiacetate Functionalized Polyprophylene Films and Their Efficacy as Antioxidant Active-Packaging Materials," J. Agric. Food Chem., 64:4606-4617 (2016).
Roman et al.,"Biomimetic Polyphenol Coatings for Antioxidant Active Packaging Applications," Colloid Interface Sci. Commun. 13:10-13 (2016).
Tian et al., "Biomimetic Design of Chelating Interfaces," J. Appl. Polym. Sci. 41231:1-8 (2015).
Lin et al., "Preparation of Metal Chelating Active Packaging Materials by Laminated Photografting," J. Coat. Technol. Res. 13(2):395-404 (2016).
Roman et al.,"Retaining Oxidative Stability of Emulsified Foods by Novel Nonmigratory Polyphenol Coated Active Packaging," J. Agric. Food Chem. 64:5574-5582 (2016).
Roman et al.,"Performance of Nonmigratory Iron Chelating Active Packaging Materials in Viscous Model Food Systems," J. Food Sci. 80(9):E1965-E1973 (2015).

(Continued)

*Primary Examiner* — Sheeba Ahmed
(74) *Attorney, Agent, or Firm* — Troutman Pepper Hamilton Sanders LLP (Rochester)

(57) ABSTRACT

The present invention is directed to a curable polymer comprising: a base acrylic monomer (monomer A); a monomer with bioactive functionality (monomer B); a monomer containing a cross-linker (monomer C). The present invention also relates to a method of making a polymer coating on a solid support. The present invention also relates to a method of preserving a product.

35 Claims, 33 Drawing Sheets

(56) References Cited

OTHER PUBLICATIONS

Ogiwara et al., "Iron Chelating Active Packaging: Influence of Competing Ions and pH Value on Effectiveness of Soluble and Immobilized Hydroxamate Chelators," Food Chem. 196:842-847 (2016).
Johnson et al., "Development of Iron-Chelating Poly(ethylene terephthalate) Packaging for Inhibiting Lipid Oxidation in Oil-in-Water Emulsions," J. Agric. Food Chem. 63:5055-5060 (2015).
International Preliminary Report on Patentability for Application No. PCT/US2018/038913 (dated Dec. 24, 2019).
Lin et al., "Photo-Curable Metal-Chelating Coatings Offer a Scalable Approach to Production of Antioxidant Active Packaging," Journal of Food Science 83(2):367-376 (2018).
Werner et al., "Hurdles to Commercial Translation of Next Generation Active Packaging Technologies," Current Opinion in Food Science 16:40-48 (2017).

CURABLE POLYMERIC COATINGS FOR FUNCTIONAL SURFACE PREPARATIONS

This application is a national stage application under 35 U.S.C. § 371 of PCT Application No. PCT/US2018/038913, filed Jun. 22, 2018, which claims the priority benefit of U.S. Provisional Patent Application Ser. No. 62/524,123, filed Jun. 23, 2017, which are hereby incorporated by reference in their entirety.

This invention was made with government support under 2012-67017-30157 awarded by U.S. Department of Agriculture and 2015-67017-23119 awarded by U.S. Department of Agriculture. The government has certain rights in the invention.

FIELD OF THE INVENTION

The present invention relates to curable polymeric coatings for functional surface preparations.

BACKGROUND OF THE INVENTION

Synthetic metal chelators (e.g. ethylenediamine tetraacetic acid (EDTA)) are often used in shelf-stable consumer products to control transition metal induced oxidative degradation. In response to the increasing consumer demand for natural and 'clean label' consumer products (Asioli et al., "Making Sense of the "Clean Label" Trends: A Review of Consumer Food Choice Behavior and Discussion of Industry Implications," *Food Res. Int.* 99:58-71 (2017)), an active packaging technology was developed to serve as an alternative to synthetic additives (FIG. 1) (Tian et al., "Control of Lipid Oxidation by Nonmigratory Active Packaging Films Prepared by Photoinitiated Graft Polymerization," *J. Agric. Food. Chem.* 60(31):7710-7718 (2012); Lin et al., "Synthesis of Iminodiacetate Functionalized Polypropylene Films and Their Efficacy as Antioxidant Active-Packaging Materials," *J. Agric. Food. Chem.* 64(22):4606-4617 (2016); Lin et al., "Photo-Curable Metal-Chelating Coatings Offer a Scalable Approach to Production of Antioxidant Active Packaging," *J. Food Sci.* 83(2):367-376 (2018); Roman et al., "Retaining Oxidative Stability of Emulsified Foods by Novel Nonmigratory Polyphenol Coated Active Packaging," *J. Agric. Food. Chem.* 64(27):5574-5582 (2016); Johnson et al., "Development of Iron-Chelating Poly(ethylene Terephthalate) Packaging for Inhibiting Lipid Oxidation in Oil-in-Water Emulsions," *J. Agric. Food. Chem.* 63(20):5055-5060 (2015); Tian et al., "Controlling Lipid Oxidation via a Biomimetic Iron Chelating Active Packaging Material," *J. Agric. Food. Chem.* 61(50): 12397-12404 (2013); Lin et al., "Preparation of Metal Chelating Active Packaging Materials by Laminated Photografting," *J. Coat. Technol. Res.* 13(2): 395-404 (2016)). In particular, metal chelating moieties (e.g. carboxylic acids, hydroxamic acid & derivatives, phenolic compounds, and iminodiacetic acid & derivatives) have been introduced to polymer surfaces to partition transition metal ions and prevent their reactivity. The metal chelating active packaging materials are effective in controlling transition metal induced oxidative degradation of labile components, with demonstrated performance in retaining stability of lipids (Tian et al., "Control of Lipid Oxidation by Nonmigratory Active Packaging Films Prepared by Photoinitiated Graft Polymerization," *J. Agric. Food. Chem.* 60(31):7710-7718 (2012); Lin et al., "Synthesis of Iminodiacetate Functionalized Polypropylene Films and Their Efficacy as Antioxidant Active-Packaging Materials," *J. Agric. Food. Chem.* 64(22):4606-4617 (2016); Roman et al., "Retaining Oxidative Stability of Emulsified Foods by Novel Nonmigratory Polyphenol Coated Active Packaging," *J. Agric. Food. Chem.* 64(27):5574-5582 (2016); Johnson et al., "Development of Iron-Chelating Poly(ethylene Terephthalate) Packaging for Inhibiting Lipid Oxidation in Oil-in-Water Emulsions," *J. Agric. Food. Chem.* 63(20):5055-5060 (2015); Tian et al., "Controlling Lipid Oxidation via a Biomimetic Iron Chelating Active Packaging Material," *J. Agric. Food. Chem.* 61(50): 12397-12404 (2013)), ascorbic acids (Lin et al., "Synthesis of Iminodiacetate Functionalized Polypropylene Films and Their Efficacy as Antioxidant Active-Packaging Materials," *J. Agric. Food. Chem.* 64(22): 4606-4617 (2016); Lin et al., "Photo-Curable Metal-Chelating Coatings Offer a Scalable Approach to Production of Antioxidant Active Packaging," *J. Food Sci.* 83(2):367-376 (2018)), and lycopene (Roman et al., "Retaining Oxidative Stability of Emulsified Foods by Novel Nonmigratory Polyphenol Coated Active Packaging," *J. Agric. Food. Chem.* 64(27):5574-5582 (2016)). By utilizing covalent immobilization chemistries, such active packaging technologies are considered non-migratory (or immobilized) and, thus, can potentially be regulated in the U.S.A. by the Food and Drug Admission (FDA) as food contact substance (FCS), rather than as direct additives (C.F.R. 172.120 Title 21, Food And Drugs, Regulations (2017)). Other than active packaging, metal chelating materials have application in heavy metal removal in water treatment (Li et al., "Preparation of an Ion-Imprinted Fiber for the Selective Removal of $Cu^{2+}$," *Langmuir* 27(11):6753-6758 (2011); Yamada et al., "Adsorption and Desorption Properties of the Chelating Membranes Prepared From the PE Films," *J. Appl. Polym. Sci.* 99(4): 1895-1902 (2006); Kavakli et al., "Preparation and Characterization of Fe(III)-loaded Iminodiacetic Acid Modified GMA Grafted Nonwoven Fabric Adsorbent for Anion Adsorption," *Radiat. Phys. Chem.* 94:105-110 (2014)), protein separation (Zhu et al., "Facile Fabrication of Hydrophilic Nanofibrous Membranes With an Immobilized Metal-Chelate Affinity Complex for Selective Protein Separation," *ACSAppl. Mater. Interfaces* 6(2):925-32 (2014); Sun et al., "High-Capacity, Protein-Binding Membranes Based on Polymer Brushes Grown in Porous Substrates," *Chem. Mater.* 18(17):4033-4039 (2006)), and catalytic chemistry (Mentbayeva et al., "Polymer-Metal Complexes in Polyelectrolyte Multilayer Films as Catalysts for Oxidation of Toluene," *Langmuir* 28(32):11948-55 (2012); Rahim et al., "Metal Ion-Enriched Polyelectrolyte Complexes and Their Utilization in Multilayer Assembly and Catalytic Nanocomposite Films," *Langmuir* 28(22):8486-8495 (2012)). However, preparation of these materials has typically relied on extensive, complicated material preparation steps to tether metal chelating ligands, including degassing (Johnson et al., "Development of Iron-Chelating Poly(ethylene Terephthalate) Packaging for Inhibiting Lipid Oxidation in Oil-in-Water Emulsions," *J. Agric. Food. Chem.* 63(20):5055-5060 (2015); Tian et al., "Controlling Lipid Oxidation via a Biomimetic Iron Chelating Active Packaging Material," *J. Agric. Food. Chem.* 61(50):12397-12404 (2013); Li et al., "Preparation of an Ion-Imprinted Fiber for the Selective Removal of $Cu^{2+}$," *Langmuir* 27(11):6753-6758 (2011); Tian et al., "Development of an Iron Chelating Polyethylene Film for Active Packaging Applications," *J. Agric. Food. Chem.* 60(8):2046-2052 (2012)), batch chemical reactions (Lin et al., "Synthesis of Iminodiacetate Functionalized Polypropylene Films and Their Efficacy as Antioxidant Active-Packaging Materials," *J. Agric. Food. Chem.* 64(22): 4606-4617 (2016); Roman et al., "Retaining Oxidative Stability of Emulsified Foods by Novel Nonmigratory Polyphenol Coated Active Packaging," *J. Agric. Food. Chem.* 64(27):5574-5582 (2016); Yamada et al., "Adsorption and Desorption Properties of the Chelating Membranes Prepared From the PE Films," *J. Appl. Polym. Sci.* 99(4):1895-1902 (2006); Zhu et al., "Facile Fabrication of Hydrophilic Nanofibrous Membranes With an Immobilized Metal-Chelate Affinity Complex for Selective Protein Separation," ACS Appl. Mater. Interfaces 6(2):925-32 (2014)), and longtime thermal curing processes (Mentbayeva et al., "Polymer-Metal Complexes in Polyelectrolyte Multilayer Films as Catalysts for Oxidation of Toluene," *Langmuir* 28(32): 11948-55 (2012); U.S. Pat. No. 4,861,839 to Mizuguchi et al.), thus limiting the commercial availability of the materials, especially in the area of active packaging.

Photocuring (i.e. light-induced hardening of monomeric or polymeric substances) has been widely adopted in the printing and coating industries due to its low energy, high speed, and solvent-free processing (Ligon et al., "Strategies to Reduce Oxygen Inhibition in Photoinduced Polymerization," *Chem. Rev.* 114(1):557-589 (2013)) Photocurable copolymers have been reported in recent years for preparation of a range of functional coatings (e.g. antimicrobial (Dhende et al., "One-Step Photochemical Synthesis of Permanent, Nonleaching, Ultrathin Antimicrobial Coatings for Textiles and Plastics," *ACS Appl. Mater. Interfaces* 3(8): 2830-2837 (2011); Hsu et al., "Light-Activated Covalent Coating of Cotton with Bactericidal Hydrophobic Polycations," *Biomacromolecules* 12(1):6-9 (2011)), antifouling (Liu et al., "Covalent Grafting of Antifouling Phosphorylcholine-Based Copolymers With Antimicrobial Nitric Oxide Releasing Polymers to Enhance Infection-Resistant Properties of Medical Device Coatings," *Langmuir* 33(45):13105-13113 (2017)), biopatterning (Baek et al., "Fine Neurite Patterns From Photocrosslinking of Cell-Repellent Benzophenone Copolymer," *J Neurosci. Methods* 210(2):161-168 (2012)), adhesives (Nanjundan et al., "Homopolymer of 4-Benzoylphenyl Methacrylate and its Copolymers With Glycidyl Methacrylate: Synthesis, Characterization, Monomer Reactivity Ratios and Application as Adhesives," *React. Funct. Polym.* 62(1): 11-24 (2005); Janko et al., "Cross-Linking Cellulosic Fibers With Photoreactive Polymers: Visualization With Confocal Raman and Fluorescence Microscopy," *Biomacromolecules* 16(7):2179-2187 (2015)), surface bound lubricants (Li et al., "On the Lubrication Mechanism of Surfaces Covered with Surface-Attached Hydrogels," *Macromol. Chem. Phys.* 217(4):526-536 (2016)), and other polymer thin films (Lehaf et al., "Correlating the Compliance and Permeability of Photo-Cross-Linked Polyelectrolyte Multilayers," *Langmuir* 27(8):4756-4763 (2011); Schlemmer et al., "The Design of Thin Polymer Membranes Filled With Magnetic Particles on a Microstructured Silicon Surface," *Nanotechnology* 20(25): 255301 (2009); Toomey et al., "Swelling Behavior of Thin, Surface-Attached Polymer Networks," *Macromolecules* 37(3):882-887 (2004))). Photocurable copolymers permit introduction of a target functional group (e.g. antimicrobial, lubricant) via a simple coat/cure process, without the need for degassing or batch chemical reactions typical of grafting-from style surface modifications. Benzophenone is the most commonly reported photocrosslinker used in photocurable copolymers (Dhende et al., "One-Step Photochemical Synthesis of Permanent, Nonleaching, Ultrathin Antimicrobial Coatings for Textiles and Plastics," *ACS Appl. Mater. Interfaces* 3(8):2830-2837 (2011); Nanjundan et al., "Homopolymer of 4-Benzoylphenyl Methacrylate and its Copolymers With Glycidyl Methacrylate: Synthesis, Characterization, Monomer Reactivity Ratios and Application as Adhesives," *React. Funct. Polym.* 62(1): 11-24 (2005); Janko et al., "Cross-Linking Cellulosic Fibers With Photoreactive Polymers: Visualization With Confocal Raman and Fluorescence Microscopy," *Biomacromolecules* 16(7):2179-2187 (2015); Li et al., "On the Lubrication Mechanism of Surfaces Covered with Surface-Attached Hydrogels," *Macromol. Chem. Phys.* 217(4):526-536 (2016); Schlemmer et al., "The Design of Thin Polymer Membranes Filled With Magnetic Particles on a Microstructured Silicon Surface," *Nanotechnology* 20(25):255301 (2009)), and monomeric benzophenone and its derivatives have been used in ink formulations for paper and paperboard food packaging (Anderson et al., "Benzophenone in Cartonboard Packaging Materials and the Factors That Influence its Migration Into Food," *Food Additives & Contaminants* 20(6):607-618 (2003)). When exposed to UV light (365 nm), benzophenone is excited to its biradical state, which can abstract a hydrogen from neighboring C—H bond and permit formation of a new, stable C—C bond (Dorman et al., "Benzophenone Photophores in Biochemistry," *Biochemistry* 33(19):5661-5673 (1994)). Benzophenone derivatives can be introduced into copolymers and are not prone to oxygen inhibition, enabling atmospheric photocuring without the need for degassing (Ligon et al., "Strategies to Reduce Oxygen Inhibition in Photoinduced Polymerization," *Chem. Rev.* 114(1):557-589 (2013)). Benzophenone moieties can further covalently crosslink with polymeric substances rich in alkyl groups (e.g. polypropylene, polyethylene) via photocuring.

Iminodiacetic acid (IDA) is a metal chelating ligand used in commercial metal chelating resins and membranes for heavy metal removal (Yamada et al., "Adsorption and Desorption Properties of the Chelating Membranes Prepared From the PE Films," *J. Appl. Polym. Sci.* 99(4): 1895-1902 (2006); Dinu et al., "Heavy Metals Adsorption on Some Iminodiacetate Chelating Resins as a Function of the Adsorption Parameters," *React. Funct. Polym.* 68(9):1346-1354 (2008)). IDA has half of the chemical structure of EDTA, and is a tridentate metal chelator with specificity to transition metals common in foods and beverages (e.g. iron). IDA derived metal chelating active packaging materials have been explored due to IDA's high affinity to iron (log K=10.72 for $Fe^{3+}$) and low affinity to common multivalent ions in foods, such as calcium (log K=2.59 for $Ca^{2+}$) and magnesium (log K=2.98 $Mg^{2+}$) (Martell, Critical Stability Constants. Plenum Press: New York (1974)), supporting its potential efficacy in complex food matrices. The antioxidant efficacy of IDA functionalized materials against both transition metal-induced lipid oxidation and ascorbic acid degradation in simulated food systems has been previously demonstrated (Lin et al., "Synthesis of Iminodiacetate Functionalized Polypropylene Films and Their Efficacy as Antioxidant Active-Packaging Materials," *J. Agric. Food. Chem.* 64(22):4606-4617 (2016); Lin et al., "Photo-Curable Metal-Chelating Coatings Offer a Scalable Approach to Production of Antioxidant Active Packaging," *J. Food Sci.* 83(2):367-376 (2018)). However, by introducing only polar IDA ligands, the resulting coating presented a swellable, hydrogel like morphology, unsuitable for application as a packaging material for which product release is required.

The present invention is directed to overcoming these and other deficiencies in the art.

SUMMARY OF THE INVENTION

One aspect of the present invention relates to a curable polymer comprising:
one or more base acrylic monomeric units (monomer A);
one or more monomeric units with bioactive functionality (monomer B); and
one or more monomeric units containing a cross-linker (monomer C), wherein the one or more of monomers A, B, and C are linked together in any order.

Another aspect of the present invention relates to a substrate comprising:
a solid support; and
the curable polymer according any aspect of the present invention applied to a surface of the solid support.

Another aspect of the present invention relates to a method of making a curable polymer coating on a solid support. This method includes:
providing a solid support;
providing a composition comprising a curable polymer, wherein the curable polymer comprises:
one or more base acrylic monomeric units (monomer A);
one or more monomeric units with bioactive functionality (monomer B); and
one or more monomeric units containing a cross-linker (monomer C), wherein the one or more of monomers A, B, and C are linked together in any order; and
applying the composition comprising the curable polymer on a surface of the solid support.

Another aspect of the present invention relates to a method of making a curable polymer coating on a solid support. This method includes:
providing a solid support;
providing a composition comprising a curable polymer, wherein the curable polymer comprises:
one or more base acrylic monomeric units (monomer A);
one or more monomeric units containing a reactive pendant group (monomer D); and
one or more monomeric units containing a cross-linker (monomer C), wherein the one or more of monomers A, D, and C are linked together in any order; and
applying the composition comprising the curable polymer on a surface of the solid support.

Another aspect of the present invention relates to a method of preserving a product. This method includes:
providing a product to be preserved;
providing a container according to any aspect of the present invention;
placing the product in the container; and
storing said product in the container under conditions to preserve said product.

Another aspect of the present invention relates to a curable polymer comprising:
one or more base acrylic monomeric units (monomer A);
one or more monomeric units containing a reactive pendant group (monomer D); and
one or more monomeric units containing a cross-linker (monomer C), wherein the one or more of monomers A, D, and C are linked together in any order.

A method to synthesize a photocurable metal chelating copolymer coating via emulsion polymerization to enable a facile coat/cure preparation of metal chelating materials is described. The photocurable polymer coatings of the present invention enable scalable production of active materials with metal chelating functionality.

A poly(n-butyl acrylate) based copolymer coating with IDA and benzophenone moieties to impart metal-chelating and photocrosslinking, respectively, was prepared via emulsion copolymerization (FIG. 2). Poly(n-butyl acrylate) based copolymers are FDA approved as indirect additives for food contact applications (e.g. non-stick coatings for cooking pans (U.S. Pat. No. 7,375,152 to Bate)) (C.F.R. 172.120 Title 21, Food And Drugs, Regulations (2017), which is hereby incorporated by reference in its entirety), and as a polymer base to control the thermal mechanical properties and to control the surface energy of the coating. Poly(n-butyl acrylate) based copolymers have been prepared by emulsion polymerization to prepare functional polymer coatings for application in antimicrobial (Ye et al., "Novel Core-Shell Particles With Poly(N-Butyl Acrylate) Cores and Chitosan Shells as an Antibacterial Coating for Textiles," *Polymer* 46(23): 10538-10543 (2005), which is hereby incorporated by reference in its entirety), UV-shielding (Suma et al., "Studies on the Effect of Nano-TiO2 on Vinyl Acetate-Butyl Acrylate Latex-Based Surface Coating," *Mater. Sci. Eng., B* 168(1-3):254-258 (2010), which is hereby incorporated by reference in its entirety), and corrosion protection (Gustavsson et al., "Processable Polyaniline-HCSA/poly(vinyl acetate-co-butyl acrylate) Corrosion Protection Coatings for Aluminium Alloy 2024-T3: A SVET and Raman Study," *Electrochimica Acta* 54(5): 1483-1490 (2009), which is hereby incorporated by reference in its entirety). Emulsion copolymerization is a water-based polymerization system and has been widely used for preparation of latex paints, adhesives, print inks, and coatings with reduced emission of volatile organic compounds (VOC) (Steward et al., "An overview of Polymer Latex Film Formation and Properties," *Adv. Colloid Interface Sci.* 86(3): 195-267 (2000), which is hereby incorporated by reference in its entirety). Copolymers comprised of IDA and poly(n-butyl acrylate) have been produced via emulsion copolymerization with applications in antimicrobial (Chen et al., "Formation of Silver Nanoparticles on a Chelating Copolymer Film Containing Iminodiacetic Acid," *Thin Solid Films* 484(1-2):68-72 (2005), which is hereby incorporated by reference in its entirety), oxygen scavenging (Wang et al., "Facilitated Transport of Molecular Oxygen in Cobalt-Chelated Copolymer Membranes Prepared by Soap-Free Emulsion Polymerization," *J. Membr. Sci.* 208(1-2): 133-145 (2002), which is hereby incorporated by reference in its entirety), and semi-conductive materials (Chu et al., "A New Approach to Hybrid CdS Nanoparticles in Poly(BA-co-GMA-co-GMA-IDA) Copolymer Membranes," *J. Membr. Sci.* 247(1-2):201-209 (2005), which is hereby incorporated by reference in its entirety); however, such materials had limited stability in aqueous environments due to the lack of crosslinkers. The photocurable metal chelating copolymer coating technology prepared in this application will enable a simple coat/cure preparation of metal chelating materials. The resulting coatings were characterized for surface chemistry, thickness, chelating capacity, and surface energy. Their antioxidant efficacy against transition metal-induced ascorbic acid degradation and stability in food simulants were also tested.

DETAILED DESCRIPTION OF THE INVENTION

Figure 1:
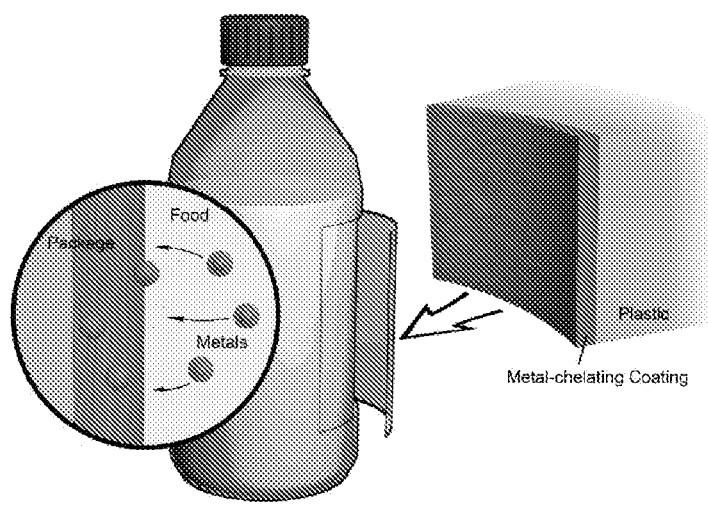
FIG. 1 is a conceptual illustration of metal chelating active packaging materials in food packaging application.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "alkyl" means an aliphatic hydrocarbon group which may be straight or branched having about 1 to about 20 carbon atoms in the chain. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

The term "cycloalkyl" refers to a non-aromatic saturated mono- or polycyclic ring system which may contain 3 to 20 (e.g., 3, 4, 5, 6, 7, 8, 9, 10, 11, 12, 13, 14, 15, 16, 17, 18, 19, 20) carbon atoms. Exemplary cycloalkyl groups include, without limitation, cyclopropyl, cyclobutyl, cyclopentyl, cyclohexyl.

The term "halogen" means fluoro, chloro, bromo, or iodo.

The term "alkoxy" means groups of from 1 to 8 carbon atoms of a straight, branched, or cyclic configuration and combinations thereof attached to the parent structure through an oxygen. Examples include methoxy, ethoxy, propoxy, isopropoxy, cyclopropyloxy, cyclohexyloxy, and the like. Lower-alkoxy refers to groups containing one to four carbons. For the purposes of the present patent application, alkoxy also includes methylenedioxy and ethylenedioxy in which each oxygen atom is bonded to the atom, chain, or ring from which the methylenedioxy or ethylenedioxy group is pendant so as to form a ring. Thus, for example, phenyl substituted by alkoxy may be, for example,

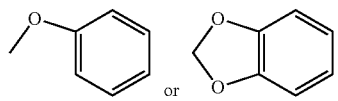

As used herein, "heterocyclyl" refers to a stable 3- to 18-membered ring (radical) which consists of carbon atoms and from one to five heteroatoms selected from the group consisting of nitrogen, oxygen, and sulfur. For purposes of this application, the heterocycle may be a monocyclic, or a polycyclic ring system, which may include fused, bridged, or spiro ring systems; and the nitrogen, carbon, or sulfur atoms in the heterocycle may be optionally oxidized; the nitrogen atom may be optionally quatemrnized; and the ring may be partially or fully saturated. Examples of such heterocycles include, without limitation, azepinyl, azocanyl, pyranyl dioxanyl, dithianyl, 1,3-dioxolanyl, tetrahydrofuryl, dihydropyrrolidinyl, decahydroisoquinolyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, 2-oxoazepinyl, oxazolidinyl, oxiranyl, piperidinyl, piperazinyl, 4-piperidonyl, pyrrolidinyl, pyrazolidinyl, thiazolidinyl, tetrahydropyranyl, thiamorpholinyl, thiamorpholinyl sulfoxide, and thiamorpholinyl sulfone. Further heterocycles and heteroaryls are described in Katritzky et al., eds., *Comprehensive Heterocyclic Chemistry: The Structure, Reactions, Synthesis and Use of Heterocyclic Compounds*, Vol. 1-8, Pergamon Press, N.Y. (1984), which is hereby incorporated by reference in its entirety.

The term "monocyclic" used herein indicates a molecular structure having one nring.

The term "polycyclic" or "multi-cyclic" used herein indicates a molecular structure having two or more rings, including, but not limited to, fused, bridged, or spiro rings.

The term "aryl" means an aromatic monocyclic or multi-cyclic (polycyclic) ring system of 6 to about 19 carbon atoms, or of 6 to about 10 carbon atoms, and includes arylalkyl groups. The ring system of the aryl group may be optionally substituted. Representative aryl groups include, but are not limited to, groups such as phenyl, naphthyl, azulenyl, phenanthrenyl, anthracenyl, fluorenyl, pyrenyl, triphenylenyl, chrysenyl, and naphthacenyl.

The terms "arylalkyl" mean an alkyl substituted with one or more aryl groups, wherein the alkyl and aryl groups are as herein described. One particular example is an arylmethyl group, in which a single carbon spacer unit is attached to an aryl group, where the carbon spacer and the aryl group can be optionally substituted as described herein.

The term "heteroaryl" means an aromatic monocyclic or multi-cyclic ring system of about 5 to about 19 ring atoms, or about 5 to about 10 ring atoms, in which one or more of the atoms in the ring system is/are element(s) other than carbon, for example, nitrogen, oxygen, or sulfur. In the case of multi-cyclic ring system, only one of the rings needs to be aromatic for the ring system to be defined as "heteroaryl". Particular heteroaryls contain about 5 to 6 ring atoms. The prefix aza, oxa, thia, or thio before heteroaryl means that at least a nitrogen, oxygen, or sulfur atom, respectively, is present as a ring atom. A nitrogen, carbon, or sulfur atom in the heteroaryl ring may be optionally oxidized; the nitrogen may optionally be quaternized. Representative heteroaryls include pyridyl, 2-oxo-pyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

"Unsubstituted" atoms bear all of the hydrogen atoms dictated by their valency.

The term "substituted" or "substitution" of an atom means that one or more hydrogen on the designated atom is replaced with a selection from the indicated group, provided that the designated atom's normal valency is not exceeded and the identity of each substituent is independent of the others. Up to three H atoms in each residue are replaced with alkyl, halogen, haloalkyl, hydroxy, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture, and formulation into an efficacious therapeutic agent.

The term "copolymer" refers to a polymer derived from more than one species of monomer.

The term "alternating copolymer" or "alternating polymer" refers to a copolymer consisting of two or more species of monomeric units that are arranged in an alternating sequence (in which every other building unit is different $(-M_1M_2-)_n$.

The term "random copolymer" or "random polymer" refers to a copolymer in which there is no definite order for the sequence of the different building blocks $(-M_1M_2M_1M_1M_2M_1M_2M_2-)$.

The term "statistical copolymer" or "statistical polymer" refers to a copolymer in which the sequential distribution of the monomeric units obeys known statistical laws.

The term "block copolymer" or "block polymer" refers to a macromolecule consisting of long sequences of different repeat units. Exemplary block polymers include, but are not limited to $A_nB_m$, $A_nB_mA_m$, $A_nB_mC_k$, or $A_nB_mC_kA$.

One aspect of the present invention relates to a curable polymer comprising:
  one or more base acrylic monomeric units (monomer A);
  one or more monomeric units with bioactive functionality (monomer B); and
  one or more monomeric units containing a cross-linker (monomer C), wherein the one or more of monomers A, B, and C are linked together in any order.

The base acrylic monomeric units are responsible for bulk physical and mechanical properties of the polymer.

Suitable monomers that can be used as monomer A in accordance with the present invention include acrylic (such as methacrylates, acrylates, methacrylamides, acrylamides, etc.), vinyl (such as vinyl aromatic), diolefin, nitrile, dinitrile, and acrylonitrile monomer, or a mixture thereof.

Exemplary acrylates include tert-butyl acrylate (tBA), 2-(acryloyloxy)ethyl phosphate (AEP), butyl acrylate (BA), 3-chloropropyl acrylate (CPA), dodecyl acrylate (DA), di(ethylene glycol) 2-ethylhexyl ether acrylate (DEHEA), 2-(dimethylamino)ethyl acrylate (DMAEA), ethyl acrylate (EA), ethyl a-acetoxyacrylate (EAA), ethoxyethyl acrylate (EEA), 2-ethylhexyl acrylate (EHA), isobornyl acrylate (iBoA), methyl acrylate (MA), propargyl acrylate (PA), (poly(ethylene glycol) monomethyl ether) acrylate (PEGA), hydroxyethyl acrylate, and the like.

Exemplary methacrylates include $C_1$-$C_6$ (meth)acrylate (i.e., methyl methacrylate, ethyl methacrylate, propyl (meth)acrylate, butyl (meth)acrylate, isobutyl methacrylate, heptyl (meth)acrylate, or hexyl (meth)acrylate), 2-(acetoacetoxy) ethyl methacrylate (AAEMA), 2-aminoethyl methacrylate (hydrochloride) (AEMA), allyl methacrylate (AMA), cholesteryl methacrylate (CMA), t-butyldimethylsilyl methacrylate (BDSMA), (diethylene glycol monomethyl ether) methacrylate (DEGMA), 2-(dimethylamino)ethyl methacrylate (DMAEMA), (ethylene glycol monomethyl ether) methacrylate (EGMA), 2-hydroxyethyl methacrylate (HEMA), dodecyl methacrylate (LMA), methacryloyloxyethyl phosphorylcholine (MPC), (poly(ethylene glycol) monomethyl ether) methacrylate (PEGMA), pentafluorophenyl methacrylate (PFMA), 2-(trimethylamonium)ethyl methacrylate (TMAEMA), 3-(trimethylamonium)propyl methacrylate (TMAPMA), triphenylmethyl methacrylate (TPMMA), and the like.

Vinyl aromatic monomers are exemplary vinyl monomers that can be used in accordance with the present invention, and include any vinyl aromatics optionally having one or more substituents on the aromatic moiety. The aromatic moiety can be either mono- or polycyclic. Exemplary vinyl aromatic monomers include styrene, α-methyl styrene, t-butyl styrene, vinyl xylene, vinyl naphthalene, vinyl pyridine, divinyl benzene, N-vinyl heteroaromatics (such as 4-vinylimidazole (Vim), N-vinylcarbazole (NVC), N-vinylpyrrolidone, etc.). Other exemplary vinyls include vinyl esters (such as vinyl acetate (VAc), vinyl butyrate (VB), vinyl benzoate (VBz)), N-vinyl amides and imides (such as N-vinylcaprolactam (NVCL), N-vinylpyrrolidone (NVP), N-vinylphthalimide (NVPI), etc.), vinylsulfonates (such as 1-butyl ethenesulfonate (BES), neopentyl ethenesulfonate (NES), etc.), vinylphosphonic acid (VPA), haloolefins (such as vinylidene fluoride (VF2)), etc. Exemplary methacrylamides include N-(2-aminoethyl)methacrylamide (hydrochloride) (AEMAm) and N-(3-aminopropyl)methacrylamide (hydrochloride) (APMAm), N-(2-(dimethylamino)ethyl) acrylamide (DEAPMAm), N-(3-(dimethylamino)propyl) methacrylamide (hydrochloride) (DMAPMAm), etc. Other exemplary acrylamides include acrylamide (Am) 2-acrylamido-2-methylpropanesulfonic acid sodium salt (AMPS), N-benzylacrylamide (BzAm), N-cyclohexylacrylamide (CHAm), diacetone acrylamide (N-(1,1-dimethyl-3-oxobutyl) acrylamide) (DAAm), N,N-diethylacrylamide (DEAm), N,N-dimethylacrylamide (DMAm), N-(2-(dimethylamino)ethyl)acrylamide (DMAEAm), N-isopropylacrylamide (NIPAm), N-octylacrylamide (OAm), etc. Exemplary nitriles include acrylonitrile, adiponitrile, methacrylonitrile, etc. Exemplary diolefins include butadiene, isoprene, etc.

The bioactive moiety or bioactive functionality, or functional bioactive moiety that is incorporated in the structure of monomer B is responsible for functional properties of the polymer. Suitable monomers that can be used as monomer B in accordance with the present invention include monomers that have a chelating moiety, antioxidant moiety, antimicrobial moiety, antifouling moiety, odor absorbing, gas scavenging (e.g. oxygen, ethylene), or reactive group amenable to subsequent functionalization (e.g. biotinylated, epoxy, carboxylic acid, amine, protected group, etc).

Many ion chelators can be suitable for use in the present invention, provided that they can be attached to a monomer or a polymer (forming a chelating moiety) and retain their ion chelating activity. Suitable ion chelators include deferoxamine, ethylene diamine tetraacetic acid, poly(acrylic acid), hydroxamic acid, biomimetic synthetic siderophores, and desferrioxamine analogs with hydroxamic acid functionality.

Many metal chelators can be suitable for use in the present invention, provided that they can be attached to a monomer or a polymer (forming a metal chelating moiety) and retain their metal chelating activity. Metal chelating moieties include amino, hydroxyl, carboxylate, —SH, ether, immine, phosphate, and sulfide groups. Suitable metal chelators include carboxylic acids, hydroxamic acid, iminodiacetic acid, ethylenediamine, ethylenediaminetetraacetic acid (EDTA), dimercaprol (2,3-dimercapto-1-propanol), phenolic derivatives, siderophore derivatives, and desferroxiamine (also deferoxamine) & derivatives, acetylacetone, DOPA derivatives, and ethylenediaminetriacetic acid.

Many antioxidants can be suitable for use in the present invention, provided that they can be attached to a monomer or a polymer (forming an antioxidant moiety) and retain their antioxidant activity. Suitable antioxidants include ascorbic acid, tocopherols, phenolic antioxidants, and antioxidant dyestuffs.

Phenolic antioxidants typically have one or more bulky alkyl groups (alkyl groups having a secondary or tertiary carbon alpha to the phenol ring) ortho or meta, preferably ortho, to the phenol hydroxyl group. Phenolic antioxidants can alternatively have an alkylenedioxy substituent, an alkoxycarbonyl substituent, a 1-propenyl-3-carboxylic acid substituent or an ester thereof. A preferred bulky alkyl group is a tert-butyl group. The phenol hydroxyl group can be protected by a removable protecting group (e.g., an acyl group). Phenolic antioxidants for use in the present invention also generally have a substituent that can react with the pendant reactive group of one of the monomers or the polymers described above to form a covalent bond between the antioxidant and the monomer or the polymer.

Specific examples of phenolic antioxidants include 3-(3, 5-di-tert-butyl-4-hydroxyphenyl)propionic acid, 3,5-di-tert-butyl-4-hydroxybenzenethiol, 2-(3,5-di-tert-butyl-4-hydroxyphenyl)acetic acid, 3,5-di-tert-butyl-4-hydroxybenzoic acid, 3,5-di-tert-butyl-4-hydroxycinnamic acid, gallic acid, alkyl gallates, 3,5-di-tert-butyl-4-hydroxybenzyl alcohol, tert-butyl-hydroquinone, 2,5-di-tert-butyl-hydroquinone, 2,6-di-tert-butyl-hydroquinone, 3,5-di-tert-butyl-4-hydroxybenzaldehyde, monoacetoxy-tert-butylhydroquinone, sesamol, isoflavones, flavanoids and coumarins.

Another class of suitable antioxidants can be antioxidant dyestuffs. Antioxidant dyestuff can include aniline dyes, acridine dyes, thionine dyes, bis-naphthalene dyes, thiazine dyes, azo dyes, anthraquinone dyes, and mixtures thereof. For example, the antioxidant dyestuff may be selected from the group consisting of gentian violet, aniline blue, methylene blue, crystal violet, acriflavine, 9-aminoacridine, acridine yellow, acridine orange, proflavin, quinacrine, brilliant green, trypan blue, trypan red, malachite green, azacrine, methyl violet, methyl orange, methyl yellow, ethyl violet, acid orange, acid yellow, acid blue, acid red, thioflavin, alphazurine, indigo blue, methylene green, and mixtures thereof.

Many antimicrobial compounds can be suitable for use in the present invention, provided that they can be attached to a monomer or a polymer (forming an antimicrobial moiety) and retain their antioxidant activity. Suitable antimicrobial moieties include quaternary ammonium compounds, phenols, benzoic acid derivatives, and functionalized aminoglucosides. Suitable phenols include phenol and triclosan. Suitable quaternary ammonium compounds include benzalkonium chloride, benzethonium chloride, dimethyldidecylammonium chloride, or mixtures thereof.

Many compounds having antifouling properties can be suitable for use in the present invention, provided that they can be attached to a monomer or a polymer (forming an antifouling moiety) and retain their antifouling activity. Suitable compounds having antifouling properties include 4,5-dichloro-2-n-octyl-4-isothiazolin-3-one, 4-bromo-2-(4-chlorophenyl)-5-(trifluoromethyl)-1H-pyrrole-3-carbonitrile, pyridine triphenylborane, N,N-dimethyldichlorophenyl urea, 2,4,6-trichlorophenylmaleimide, 2-methylthio-4-tert-butylamino-6-cyclopropyl-S-triazine, (+/−)-4-[1-(2,3-dimethylphenyl)ethyl]-1H-imidazole, 2,4,5,6-tetrachloroisophthalonitrile, bisdimethyldithiocarbamoylzinc ethylenebisdithiocarbamate, chloromethyl-n-octyldisulfide, N,N'-dimethyl-N'-phenyl-(N-fluorodichloromethylthio) sulfamide, N,N'-tolyl-N'-tolyl-(N-fluorodichloromethylthio) sulfamide, tetraalkylthiuram disulfide, zinc dimethyldithiocarbamate, zinc ethylenebisdithiocarbamate, 2,3-dichloro-N-(2',6'-diethylphenyl)maleimide, 2,3-dichloro-N-(2'-ethyl-6'-methylphenyl)maleimide, or the like.

In one embodiment, monomer B comprises ion chelating moiety.

In another embodiment, monomer B comprises metal chelating moiety.

The cross-linking moiety is responsible for adhesion and stability of the cured coating. For the example of a photo-cross-linker, this would be photo-assisted adhesion and stability of the cured coating.

In one embodiment, the curable polymer is a photo-curable polymer. The photo-curable polymer comprises:
  one or more base acrylic monomeric units (monomer A);
  one or more monomeric units with bioactive functionality (monomer B); and
  one or more monomeric units containing a photo cross-linker (monomer C), wherein the one or more of monomers A, B, and C are linked together in any order.

In one embodiment, monomer C comprises a photo cross-linker.

Photo cross-linker is a cross-linker containing one or more photoreactive groups. Photoreactive groups are chemically inert compounds that become reactive and crosslink with neighboring groups when exposed to electromagnetic radiation of particular wavelength (corresponding to specific chemistry of individual photoreactive groups, and may be in the ultraviolet, visible, or other regions of the spectrum).

According to the present invention, groups that contain a cross-linking moiety include aryl azides, benzoylphenyl methacrylate (BPM), benzophenone, and type-II photo-initiators.

Suitable type II photo-initiators include benzophenone derivatives, anthraquinone, and anthraquinone derivatives. Type II photoinitiators that can be used in accordance with the present invention include benzophenone, 2,2-dimethoxy-1,2-diphenylethan-1-one, 2-hydroxy-2-methyl-1-phenylpropanone, 1-hydroxy-cyclohexylphenylketone, isopropyl thioxanthone, 2-ethylhexyl-(4-N,N-dimethyl amino) benzoate, and ethyl-4-(dimethylamino)benzoate.

Aryl azide can be used as the photo-cross-linker moiety for curing on surfaces rich in hydroxyl, amine, carboxylic acid, and chloro groups.

In one embodiment, the curable polymer further comprises:
  a structural filler mixed with monomers A, B, and C.

In another embodiment, the curable polymer further comprises a bioactive moiety, wherein the structural filler is connected to and positioned between the bioactive moiety and the polymer.

The structural filler is an inert polymer chain that connects the bioactive moiety and the polymer. Suitable structural fillers include hydrocarbon and/or ester chains.

In one embodiment, the curable polymer has the Formula (I):

wherein
  p is 1 or more;
  n is 1 or more;
  m is 1 or more; and
  wherein p+m+n is 20 or more.

The curable polymer of the present invention can have different amounts of monomer A, monomer B, and monomer C. Preferably, monomer A is present in an amount of from 30 to 90 mol %, monomer B is present in an amount of from 0.5 to 20 mol %, and monomer C is present in an amount of from 10 to 50 mol %. Preferably, monomer A is present in an amount of from 50 to 90 mol %, monomer B is present in an amount of from 0.5 to 5 mol %, and monomer C is present in an amount of from 10 to 30 mol %. Preferably, monomer A is present in an amount of from 65 to 85 mol %, monomer B is present in an amount of from 0.5 to 3 mol %, and monomer C is present in an amount of from 15 to 25 mol %. Preferably, monomer A is present in an amount of from 70 to 85 mol %, monomer B is present in an amount of from 1 to 3 mol %, and monomer C is present in an amount of from 15 to 25 mol %.

In one embodiment, the monomer A is present in an amount of 79 mol %, monomer B is present in an amount of 2 mol %, and monomer C is present in an amount of 19 mol %.

In another embodiment, the curable polymer has the Formula (Ia):

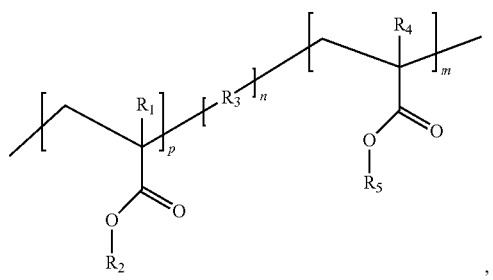

(Ia)

wherein $R_1$ is H or $CH_3$;

$R_2$ is a group having a functional bioactive moiety;

$R_3$ is a repeating unit of a base acrylic monomer in a polymerized form;

$R_4$ is H, or $CH_3$;

$R_5$ is group containing cross-linking moiety;

p is 1 or more;

n is 1 or more;

m is 1 or more; and wherein p+m+n is 20 or more.

According to the present invention, groups that have functional bioactive moiety and can be used as $R_2$ include chelating moieties, antioxidant moieties, antimicrobial moieties, and antifouling moieties.

Furthermore, hydrocarbon and ester chain can be incorporated between the functional bioactive moiety of $R_2$ group and the polymer of Formula (Ia).

In at least one embodiment, $R_2$ is selected from the group consisting of

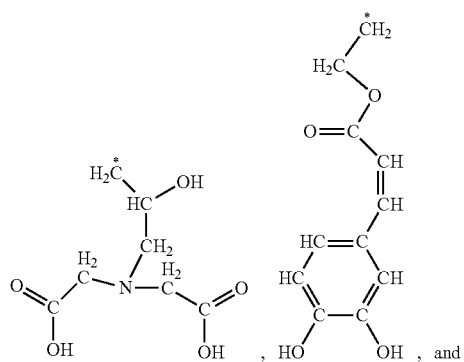

, and

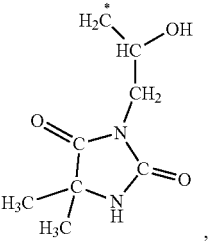

, wherein * is a point of attachment of $R_2$ to the polymer of Formula (Ia).

In at least one embodiment, $R_3$ is a moiety of formula:

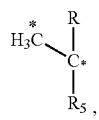

, wherein $R^6$ is selected from the group consisting of $C_{1-20}$ alkyl, substituted $C_{1-20}$ alkyl, $C_{3-20}$ cycloalkyl, substituted $C_{3-20}$ cycloalkyl, aryl, substituted aryl, arylalkyl, substituted arylalkyl, poly(ethylene glycol), and polypeptide, wherein $C_{1-20}$ alkyl, substituted $C_{1-20}$ alkyl, $C_{3-20}$ cycloalkyl, substituted $C_{3-20}$ cycloalkyl, aryl, substituted aryl, arylalkyl, and substituted arylalkyl can be optionally interrupted by one or more heteroatoms selected from the group consisting of oxygen, nitrogen, or sulfur;

* is a point of attachment of $R_3$ to the polymer of Formula (Ia).

In some embodiments, $R_6$ is selected from the group consisting of $C_{1-20}$ alkyl, substituted $C_{1-20}$ alkyl, phenoxy, substituted phenoxy, $C_{1-20}$ alkoxy, substituted $C_{1-20}$ alkoxy, $C_3$-$C_{20}$ cycloalkyl, substituted $C_3$-$C_{20}$ cycloalkyl, heterocyclyl, substituted heterocyclyl, aryl, substituted aryl, heteroaryl, substituted heteroaryl, poly(ethylene glycol), and peptide.

In some embodiments, $R_6$ is triazolyl or substituted triazolyl.

In some embodiments, $R_6$ is a polypeptide.

The polyethylene glycol (PEG) used herein may be commercially available, or prepared by methods known to one skilled in the art. Typical polyethylene glycol used has a molecular weight of less than 10,000 g/mol, less than 5,000, less than 1,000, less than 500, or ranging from 100 to 400 g/mol. Suitable polyethylene glycol has a formula of:

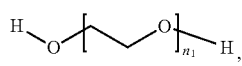

, wherein $n_1$ is an integer from 2 to 10, for instance, from 3 to 5. Exemplary polyethylene glycols are PEG200 (molecular weight of 200 g/mol) and PEG400 (molecular weight of 400 g/mol).

In at least one embodiment, $R_3$ is selected from the group consisting of

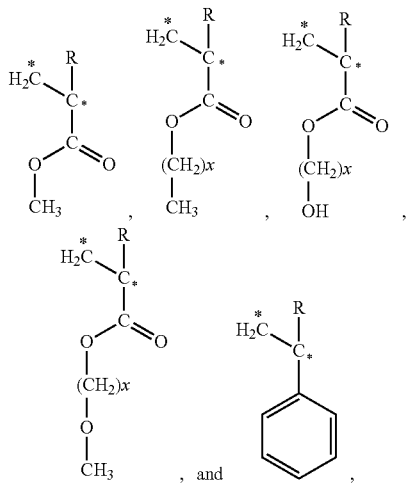

and wherein
R is H or $C_{1-20}$ alkyl;
x is 1 to 20;
* is a point of attachment of $R_3$ to the polymer of Formula (Ia).

In some embodiments, $R_5$ is selected from the group consisting of benzoylphenyl methacrylate (BPM), benzophenone, benzophenone derivative, anthraquinone, anthraquinone derivative, aryl azide, aryl azide derivative, and type-II photo-initiators.

Hydrocarbon and ester chain can be incorporated between the cross-linking moiety and the polymer.

In at least one embodiment, $R_5$ is a group containing a type II photo-initiator.

In one embodiment, the curable polymer has the formula:

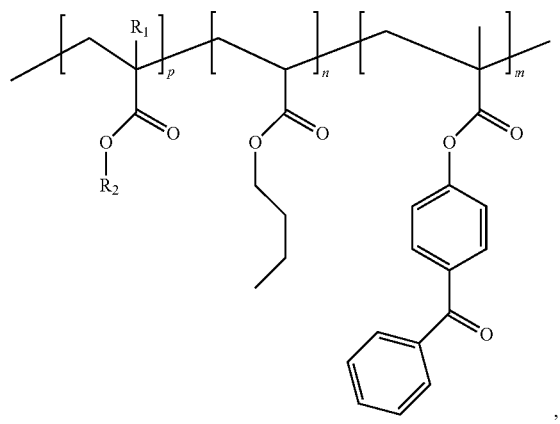

wherein
$R_1$ is H or $CH_3$;
$R_2$ is a group having a functional bioactive moiety;
p is 1 or more;
n is 1 or more;
m is 1 or more; and
wherein p+m+n is 20 or more.

In another embodiment, the curable polymer has the formula:

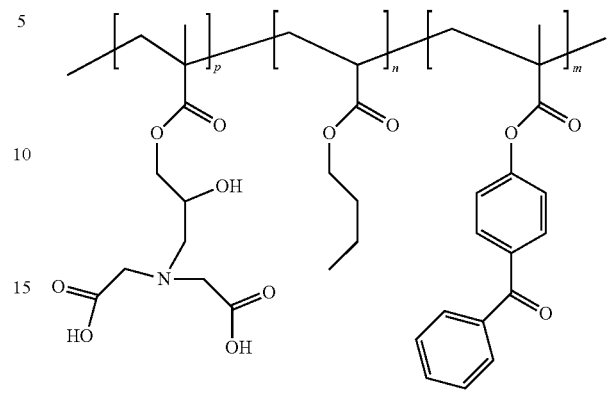

wherein
p is 1 or more;
n is 1 or more;
m is 1 or more; and
wherein p+m+n is 20 or more.

The curable polymer of the present invention can be of block co-polymer, random co-polymer, or a combination of block co-polymer and random co-polymer.

Any polymerization technique can be used to form the polymers of the present invention, such as emulsion polymerization, suspension polymerization, living radical polymerization, free radical polymerization, and the like.

In one embodiment, the polymer of the present invention is produced by emulsion polymerization. Emulsion polymerization is a free radical polymerization of vinyl monomers (oil phase) commonly conducted in water as a continuous phase.

In another embodiment, the polymer of the present invention is produced by aqueous emulsion polymerization techniques.

Monomer A, Monomer B, Monomer C, and surfactant can be dissolved in a suitable solvent in a reaction vessel. The initiator then can be added. The mixture is then can be allowed to polymerize.

In one embodiment, one or more surfactants are employed during emulsion polymerization.

In another embodiment, the polymer of the present invention is produced by surfactant-free emulsion polymerization.

Solution of Monomer B and initiator can be dissolved in a suitable solvent in a reaction vessel. The solution of Monomer A and Monomer C then can be added to the reaction vessel. After the addition is complete, the mixture can be purged with nitrogen (optional). The mixture is then can be allowed to polymerize.

The polymerization reaction is performed suitably at elevated temperatures, for example, about 50-100° C., preferably 60-80° C.

Suitable initiators and surfactants are well-known in the art of emulsion polymerization.

Suitable initiators include hydrogen peroxide, potassium or ammonium persulfate, dibenzoyl peroxide, lauryl peroxide, ditertiary butyl peroxide, 2,2'-azobisisobutyronitrile, t-butyl hydroperoxide, benzoyl peroxide, and the like.

Suitable surfactants include ionic and nonionic surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, triisopropyl phenol; alkali metal ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

Also, reactive anionic or nonionic surfactants possessing styrene or allyl groups may be utilized.

In another embodiment, the polymer of the present invention is produced by living radical polymerization, such as single-electron transfer living radical polymerization (SET-LRP).

Monomer A, Monomer D, and Monomer C can be dissolved in a suitable solvent in a reaction vessel. The mixture of the ligand, initiator, and metal salt catalyst (optional) then can be added portion-wise to the solution of monomers. After the addition is complete, the mixture could be degassed and the metal catalyst could be added. The mixture is then can be allowed to polymerize. The polymerization reaction can be stopped by opening the reaction vessel to air. After the polymerization is complete, the polymer could be precipitated using a suitable solvent.

The sequence for addition of the reagents can be modified. For example, Monomer A, Monomer D, and Monomer C can be added portion-wise to the mixture of the ligand, initiator, and metal salt catalyst (optional) prior to the deoxygenation step and addition of the metal catalyst. Alternatively, Monomer A, Monomer D, Monomer C, solvent, ligand, initiator, and metal salt catalyst (optional) can be added to the reaction vessel prior to the deoxygenation step and addition of the metal catalyst.

Suitable solvents include dipolar, protic, or aprotic solvents. Some preferred solvents include water, alcohol, natural or synthetic polymeric alcohols, dipolar aprotic solvents, ethylene carbonate, propylene carbonate, ionic liquid, or a mixture thereof. For example, such solvents may include: water, methanol, ethanol, ethylene glycol, diethylene glycol, triethylene glycol, 2-(2-ethoxyethoxy)ethanol, tetraethylene glycol, glycerine, HEMA, phenols, DMSO, DMF, DMAc, NMP, etc., ionic liquids, ethylene carbonate, and propylene carbonate. Suitable alcohols include methanol, ethanol, propanol, isopropanol, butanol, and tert butanol, glycerine, and other natural and synthetic polymers continuing OH groups. Desirably, the solvent or solvent blend chosen does not cause precipitation of the polymer product during the reaction.

The amount of solvent in the reaction polymerization medium is in the range 5-75 weight %, preferably in the range 5-30 weight % based on the total weight of the polymerization medium.

Suitable catalyst for the polymerization is generally a complex of a metal or metal salt with a ligand. Suitable metal is a transition metal which is part of the surface of the reactor vessel or the reactor vessel is made of such metal or metal salt. Suitable metals are transition metals such as, for example, Cu, Mn, Ni, Pt, Fe, Ru, V, Au, Ag, Hg, Rh, Co, Ir, Os, Re, Mn, Cr, Mo, W, Nb, Ta, Zn, and the like. Suitable salts of the above-noted metals are, for example, halides, acetate, oxide, sulfide and the like. A preferred metal is copper and a preferred salt is Cu(II) bromide.

Suitable ligands include, for example, a nitrogen-containing ligand, such as primary, secondary, and tertiary alkyl or aromatic amines, as well as polyamines which may be linear, branched, or dendritic polyamines and polyamides. Suitable ligands include ligands having one or more nitrogen, oxygen, phosphorus and/or sulfur atoms which can coordinate to the transition metal through a sigma-bond, and ligands containing two or more carbon atoms which can coordinate to the transition metal through a pi-bond. For example, suitable ligands may include tris(2-dimethylaminoethyl)amine (Me6-TREN), tris(2-aminoethyl)amine (TREN), 2,2-bipyridine (bpy), N,N,N,N,N-pentamethyldiethylenetriamine (PMDETA), and others.

Suitable initiators include, for example, halogen containing compounds. For example, the initiator may include: ethyl α-bromoisobutyrate (EBiB), diethyl meso-2,5-dibromoadipate; dimethyl 2,6-dibromoheptanedioate, ethylene glycol bis(2-bromopropionate); ethylene glycol mono-2-bromopropionate; trimethylolpropane tris(2-bromopropionate); pentaerythritol tetrakis(2-bromopropionate); 2,2-dichloacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate); 2-bromopropionitrile; dibromochloromethane; 2,2-dibromo-2-cyanoacetamide; α,α'-dibromo-ortho-xylene; α,α'-dibromo-meta-xylene; α,α'-dibromo-para-xylene; α,α'-dichloro-para-xylene; 2-bromopropionic acid; methyl trichloroacetate; para-toluenesulfonyl chloride; biphenyl-4,4'-disulfonyl chloride; diphenylether-4,4'-disulfonylchloride bromoform; iodoform carbon tetrachloride; and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly(vinyl)chloride), the chloromethyl group or polychloromethylsytrene) of the polymers and copolymers can also be used as initiators.

The polymerization reaction is performed suitably at temperatures near ambient temperatures, for example, about 20-30° C.

While it may be possible for the curable polymers to be used independently, it will often be preferable to present them as a part of a composition. Accordingly, another aspect of the present invention is a composition containing a curable polymer.

Another aspect of the present invention relates to a substrate comprising:
a solid support; and
the curable polymer according any aspect of the present invention applied to a surface of the solid support.

In one embodiment, the solid support is a packaging material coated with the curable polymer.

In another embodiment, the packaging material is a container whose interior is coated with the curable polymer.

In yet another embodiment, the curable polymer has been cured to form a cured polymer coating on the solid support.

Suitable solid supports that can be used according to the present invention include, but are not limited to, films, particles, spheres, fibers, multilaminates, packaging material, bioreactor packing material, bottles, cans, jars, closures (e.g. caps, lids), membranes, or filters.

In one embodiment, the curable polymer coating is applied onto a packaging material.

In another embodiment, the curable polymer coating is applied on at least one side of a packaging material.

If a packaging material has n sides, the curable polymer coating can be applied to from 1 to n sides of a packaging material.

The curable polymer coating can be applied to one side of a packaging material, two sides of a packaging material, three sides of a packaging material, five sides of a packaging material, or all sides of a packaging material.

Suitable solid support material that can be used according to the present invention include, but are not limited to, polymer, plastic, steel, glass, concreate aluminum, magnetic core particles, naturally derived fibers, and inorganic materials. Plastic solid supports include plastic substrates, such as petroleum based polyolefin plastics and polymer films, such as polypropylene films, heat-pressed polypropylene films.

In one embodiment the solid support is a polymer solid support.

Suitable polymers for solid support include thermoplastic polymers, such as polyethylene, polypropylene, polyester, polystyrene, nylon or vinyls. Polyester polymer is polyethylene Terephthalate or polylactic acid. Vinyl polymer is ethylene vinyl acetate, ethylene vinyl alcohol, polyvinyl chloride, or polyvinylidine chloride.

Suitable polymers for solid support also include hydrogel-forming polymer, such as hydroxyethylmethacrylate, chitosan, and polyethyleneglycol.

In one embodiment, the solid support is made from polydimethylsilexane.

Another aspect of the present invention relates to a method of making a curable polymer coating on a solid support. This method includes:
providing a solid support;
providing a composition comprising a curable polymer, wherein the curable polymer comprises:
one or more base acrylic monomeric units (monomer A);
one or more monomeric units with bioactive functionality (monomer B); and
one or more monomeric units containing a cross-linker (monomer C), wherein the one or more of monomers A, B, and C are linked together in any order; and
applying the composition comprising the curable polymer on at least one surface of the solid support.

Curable polymer coating on a solid support can be prepared by placing or spraying an aliquot of a composition comprising a curable polymer onto solid support. Following the evaporation of the solvent the coating is formed.

Curable polymer coating on a solid support can also be prepared using spin-coating. A curable polymer can be first dissolved in a suitable solvent. Suitable solvents that can be used include water, methanol, ethanol, isopropyl alcohol (IPA), glycerol, acetone, butanone, toluene, xylene, chloroform, chlorobenzene, dichlorobenzene, trichlorobenzene, diiodooctane, octanedithiol, and the mixture thereof. A small amount of a composition comprising a curable polymer can be then applied on the center of the solid support (using either static dispense or a dynamic dispense).

In a static dispense the solution is placed upon the substrate while it is stationary and usually the entire substrate is covered in the solution before rotation begins. The spin coater is then started and brought up to required speed as fast as possible.

In a dynamic dispense the substrate is first started spinning and allowed to reach the desired spin speed before the solution is dispensed into the center of the substrate. The centripetal force then rapidly pulls the solution from the middle of the substrate across the entire area before it dries.

The solid support can be then rotated at high speed in order to spread the composition by centrifugal force. The solid support can be rotated for up to ten minutes, preferably, for up to 5 minutes, more preferably, for up to 2 minutes. Suitable spin speeds that can be used are from 10 to 8000 pm, preferably from 100 to 6000 rpm; more preferably from 100 to 1000 rpm.

In one embodiment, the curable polymer coating is a bioactive curable polymer coating.

In another embodiment, the method further includes:
curing the polymer on the solid support under conditions effective to provide the cured polymer coating.

Any curing technique can be used to cure the polymers of the present invention on the solid support, such as radiation curing and thermal curing.

Radiation curing methods include gamma ray, x-ray, ultraviolet (UV), and accelerated electron beams. Thermal curing include radiation heating (infrared, laser, and microwave), convection and conduction heating (hot gas, flame, oven, and hot shoe), induction heating, ultrasonic heating, and resistance heating.

In one embodiment, UV curing is used to cure the polymer coatings of the present invention on the solid support. The UV reaction is activated by a suitable wavelength of light corresponding to the type of cross-linker used in monomer C.

The UV curing reaction can be conducted at a wavelength of 200 to 400 nm. Preferably, at a wavelength of 300 to 400 nm, more preferably at a wavelength of 350 to 400 nm, more preferably at a wavelength of 365 nm.

The progress and completion of the UV curing reaction can be monitored by following absorption spectrum of the crosslinking moiety. In case of the benzophenone crosslinking the progress of the reaction can be monitored by following absorption spectrum at 270-290 nm.

Suitable reaction times for UV curing reaction range from 10 s to 2 hours depending on the intensity of the UV light. Preferably, from 10 s to 1 hour, more preferably, from 10 s to 30 min, more preferably, from 10 s to 10 min, more preferably, from 10 s to 300 s.

During the UV curing reaction, some of the polymer coating can remain unattached. These unattached polymers can be removed by washing the cured polymer coating.

In one embodiment, the cured polymer coating is a bioactive cured polymer coating.

Another aspect of the present invention relates to a curable polymer comprising:
one or more base acrylic monomeric units (monomer A);
one or more monomeric units containing a reactive pendant group (monomer D); and one or more monomeric units containing a cross-linker (monomer C), wherein the one or more of monomers A, D, and C are linked together in any order.

In one embodiment, the curable polymer further includes a structural filler mixed with monomers A, C, and D.

In another embodiment, the curable polymer has the Formula (II):

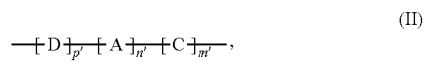

$$-[D]_{p'}-[A]_{n'}-[C]_{m'}-, \qquad (II)$$

wherein
p' is 1 or more;
n' is 1 or more;
m' is 1 or more; and
wherein p'+m'+n' is 20 or more.

The curable polymer of the present invention can have different amounts of monomer A, monomer D, and monomer C. Preferably, monomer A is present in an amount of from 30 to 90 mol %, monomer D is present in an amount of from 0.5 to 20 mol %, and monomer C is present in an amount of from 10 to 50 mol %. Preferably, monomer A is present in an amount of from 50 to 90 mol %, monomer D is present in an amount of from 0.5 to 5 mol %, and monomer C is present in an amount of from 10 to 30 mol %. Preferably, monomer A is present in an amount of from 65 to 85 mol %, monomer D is present in an amount of from 0.5 to 3 mol %, and monomer C is present in an amount of from 15 to 25 mol %. Preferably, monomer A is present in an amount of from 70 to 85 mol %, monomer D is present in an amount of from 1 to 3 mol %, and monomer C is present in an amount of from 15 to 25 mol %.

In one embodiment, the monomer A is present in an amount of 79 mol %, monomer D is present in an amount of 2 mol %, and monomer C is present in an amount of 19 mol %.

In another embodiment, the curable polymer has the Formula (IIa):

(IIa)

wherein
$R_1$ is H or $CH_3$;
$R_7$ is a group having a functional bioactive moiety;
$R_3$ is a repeating unit of a base acrylic monomer in a polymerized form;
$R_4$ is H or $CH_3$; and
$R_5$ is group containing cross-linking moiety;
p' is 1 or more;
n' is 1 or more;
m' is 1 or more; and
wherein p'+m'+n' is 20 or more.

Suitable reactive pendant group that can be on the monomer D are pendant groups containing hydroxyl, carboxyl, amino, biotin, protected (e.g. Boc), ketone, aldehyde, thiol, or epoxy groups.

In one embodiment, $R_7$ is selected from the group consisting of wherein
q is 0 to 6; and
X is $C_{1-6}$ alkyl,
wherein * is a point of attachment of $R_7$ the polymer of Formula (IIa).

In another embodiment, the curable polymer has the formula:

wherein
$R_1$ is H or $CH_3$;
$R_7$ is a group having a functional bioactive moiety;
p' is 1 or more;
n' is 1 or more;
m' is 1 or more; and
wherein p'+m'+n' is 20 or more.

In another embodiment, the curable polymer has the formula:

wherein
p' is 1 or more;
n' is 1 or more;
m' is 1 or more; and
wherein p'+m'+n' is 20 or more.

Another aspect of the present invention relates to a method of making a curable polymer coating on a solid support. This method includes:
providing a solid support;
providing a composition comprising a curable polymer, wherein the curable polymer comprises:
one or more base acrylic monomeric units (monomer A);
one or more monomeric units containing a reactive pendant group (monomer D); and
one or more monomeric units containing a cross-linker (monomer C), wherein the one or more of monomers A, D, and C are linked together in any order;

applying the composition comprising the curable polymer on a surface of the solid support.

Curable polymer coating on a solid support can be prepared by placing an aliquot of a composition comprising a curable polymer onto solid support. Following the evaporation of the solvent the coating can be formed.

Curable polymer coating on a solid support can also be prepared using spin-coating. A curable polymer can be first dissolved in a suitable solvent. Suitable solvents that can be used include water, methanol, ethanol, isopropyl alcohol (IPA), glycerol, acetone, butanone, toluene, xylene, chloroform, chlorobenzene, dichlorobenzene, trichlorobenzene, diiodooctane, octanedithiol, and the mixture thereof. A small amount of a composition comprising a curable polymer can be then applied on the center of the solid support (using either static dispense or a dynamic dispense).

In a static dispense the solution is placed upon the substrate while it is stationary and usually the entire substrate is covered in the solution before rotation begins. The spin coater is then started and brought up to required speed as fast as possible.

In a dynamic dispense the substrate is first started spinning and allowed to reach the desired spin speed before the solution is dispensed into the center of the substrate. The centripetal force then rapidly pulls the solution from the middle of the substrate across the entire area before it dries.

The solid support can be then rotated at high speed in order to spread the composition by centrifugal force. The solid support can be rotated for up to ten minutes, preferably, for up to 5 minutes, more preferably, for up to 2 minutes. Suitable spin speeds that can be used are from 10 to 8000 pm, preferably from 100 to 6000 rpm; more preferably from 100 to 1000 rpm.

In one embodiment, the method further includes:
curing the polymer on the solid support under conditions effective to provide the cured polymer coating.

Any curing technique can be used to cure the polymers of the present invention to the solid support, such as radiation curing and thermal curing.

In one embodiment, UV curing is used to cure the polymer coatings of the present invention on the solid support. The UV reaction is activated by a suitable wavelength of light corresponding to the type of cross-linker used in monomer C.

In another embodiment, the method further includes:
providing a compound containing a bioactive moiety; and
reacting the cured polymer coating with the compound containing a bioactive moiety under conditions effective to provide the bioactive cured polymer coating.

Suitable compound containing a bioactive moiety are described above and include, but are not limited to chelating compounds, antioxidant compounds, antimicrobial compounds, compounds with antifouling properties, odor absorbing compounds, gas scavenging (e.g. oxygen, ethylene) compounds, or compounds containing reactive group amenable to subsequent functionalization (e.g. biotinylated, epoxy, carboxylic acid, amine, protected group, etc).

A compound containing a bioactive moiety is reacted with the reactive pendant group to covalently bond the compound containing a bioactive moiety to the pendant group.

The compound containing a bioactive moiety can be first dissolved in a suitable solvent. Suitable solvents that can be used include water, methanol, ethanol, isopropyl alcohol (IPA), dimethylsulfoxide (DMSO), dimethyl formamide (DMF), tetrahydrofuran (THF), and the mixture thereof. The cured polymer coating on a solid support can than be reacted with the solution of the compound containing a bioactive moiety. Reaction can be carried out with or without stirring. Reaction can be carried out at room temperature or at elevated temperatures;

preferably, the temperature is from 20° C. to 200° C., from 40° C. to 150° C., from 60° C. to 100° C. Reaction time can range from several minutes to days. Preferably, the reaction time is from 10 min to 10 day, from 1 hour to 5 days, from 5 hours to 2 days, from 5 hours to 1 day.

Another aspect of the present invention relates to a method of preserving a product. This method includes:
providing a product to be preserved;
providing a packaging material according to any aspect of the present invention;
placing the product in contact with the packaging material; and
storing said product in the packaging material under conditions to preserve said product.

Suitable products that can be used in accordance with the present invention include food, potable water, beverages, pharmaceuticals, neutraceuticals, consumer products, paints, and chemicals.

Suitable consumer products include face creams, lotions, shampoos, conditioners, and cosmetics.

Oxidation is responsible for a number of degradative reactions in biological products, resulting in shortened shelf life, loss in color intensity, generation of unpleasant flavors and odors, loss in nutritional quality, and changes in physical characteristics. Such oxidation can also affect the bioactivity of natural components in consumer products such as anti-aging skin creams. The key components involved in oxidation of packaged products include free radicals to initiate the oxidative process, trace metals to catalyze the reaction, and oxygen to propagate the reaction, inhibition of any of these components reduces the potential for oxidation and resulting product loss. The presence of trace ions can also influence odor and taste of potable drinking water.

When the packaging material of the present invention contains chelating moieties, they sequester ions in order to prevent them from being available to promote oxidation and degradative reactions in biological or chemical products. Trace metals (ubiquitous in the environment) in the product are chelated by the packaging material of the present invention, preventing the trace metals from initiating a number of oxidative processes (e.g. lipid oxidation and resulting oil rancidity, micronutrient degradation) that ultimately result in product spoilage and loss.

In one embodiment, the packaging material of the present invention inhibits lipid oxidation in food, beverages, paints or consumer products, such as face creams, lotions, shampoos, conditioners and cosmetics.

In another embodiment, the packaging material of the present invention inhibits loss of nutrients in packaged products.

In yet another embodiment, the packaging material of the present invention inhibits color loss in packaged products.

In yet another embodiment, the packaging material of the present invention improves the odor and taste quality of potable water in drinking water containers.

The polymer and polymer coatings descried in the present application can be used in active packaging, as materials for food packaging and cosmetic packaging, as materials for drinking water bottles, and surfaces for food processing and biomedical devices. For example, the invention can potentially be utilized in functional coating preparation for food packaging. For plastic bottles, there could be an added step in bottle process that spray the coating into the bottle followed by UV-curing. For flexible film materials, the coating can potentially be conducted in a roll-to-roll process. The coating may also be applied to large surfaces such as walls, floors and surfaces for food processing using simple spray/coat/cure processes.

The copolymer coating can be applied onto plastic films and bottles via industrially scalable coat/cure processes for the manufacture of metal chelating active packaging.

If polymer coating according to the present invention are used to coat the interior of food, beverage, or consumer products packages, when packages are filled, trace metals (ubiquitous in the environment) in the product are chelated to coating that has been applied to the surface of the package, preventing the trace metals from initiating a number of oxidative processes (e.g. lipid oxidation and resulting oil rancidity, micronutrient degradation) that ultimately result in product spoilage and loss. Incorporating the active agent into the polymer structure renders it 'immobilized', thus less likely to migrate from the polymer.

The polymer and polymer coatings descried in the present application can be used for heavy metal removal in water treatment, protein separation, and catalytic chemistry.

The polymer and polymer coatings descried in the present application can also be used for UV-shielding, corrosion protection, oxygen scavenging and as antimicrobial or semiconductive materials.

EXAMPLES

The examples below are intended to exemplify the practice of embodiments of the disclosure but are by no means intended to limit the scope thereof.

Example 1—Materials

Polypropylene pellets (isotactic) were purchased from Scientific Polymer Products (Ontario, N.Y.). L-ascorbic acid, EDTA (disodium salt dihydrate), imidazole (99%), glycidyl methacrylate (97%), zincon monosodium salt, 3-(2-pyridyl)-5,6-diphenyl-1,2,4-triazine-p,p'-disulfonic acid disodium salt hydrate (ferrozine, 98%+), toluidine blue O (TBO), n-butyl acrylate (99+%), methacryloyl chloride (97%), 4-hydroxybenzophenone (98%), and potassium persulfate (99+%) were purchased from Sigma-Aldrich (St. Louis, Mo.). Isopropanol, acetone, methanol, sodium hydroxide, glacial acetic acid, hydrochloric acid (trace metal grade), trichloroacetic acid (TCA), oxalic acid dihydrate, sodium acetate trihydrate, 4-(2-hydroxyethyl)-1-piperazineethanesul-fonic acid (HEPES), sodium phosphate monobasic monohydrate, sodium carbonate anhydrous, sodium bicarbonate, ferric chloride hexahydrate, and 2,6-dichloroindophenol were purchased from Fisher Scientific (Fair Lawn, N.J.). Iminodiacetic acid (IDA) (98+%) was purchased from Acros Organics (Morris Plains, N.J.). Absolute ethanol was purchased from Pharmco-Aaper (Brookfield, Conn.). Nitric acid (trace metal grade) was purchased from VWR Chemicals (Radnor, Pa.). All chemicals and reagents were used as received without further purification. 2-Propenoic acid,2-methyl-,3-[bis-(carboxymethyl) amino]-2-hydroxypropyl ester (GMA-IDA) and 4-benzoyphenyl methacrylate (BPM) were synthesized according to the reported procedures (Schlemmer et al., "The Design of Thin Polymer Membranes Filled With Magnetic Particles on a Microstructured Silicon Surface," *Nanotechnology* 20(25): 255301 (2009); Chen et al., "Stability Constants of Polymer-Bound Iminodiacetate-Type Chelating Agents With Some Transition-Metal Ions," *J. Appl. Polym. Sci.* 86(8):1986-1994 (2002), which are hereby incorporated by reference in their entirety).

Example 2—Synthesis of GMA-IDA

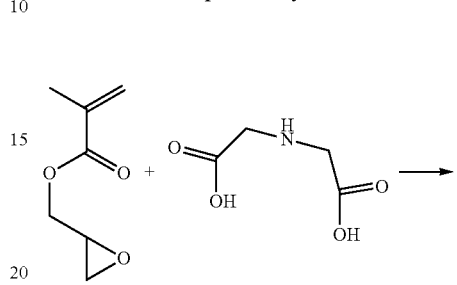

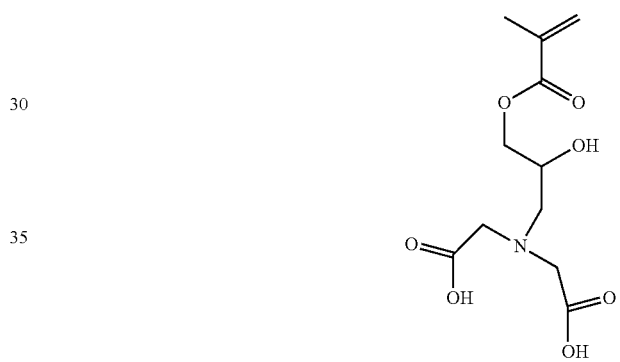

Figure 3:
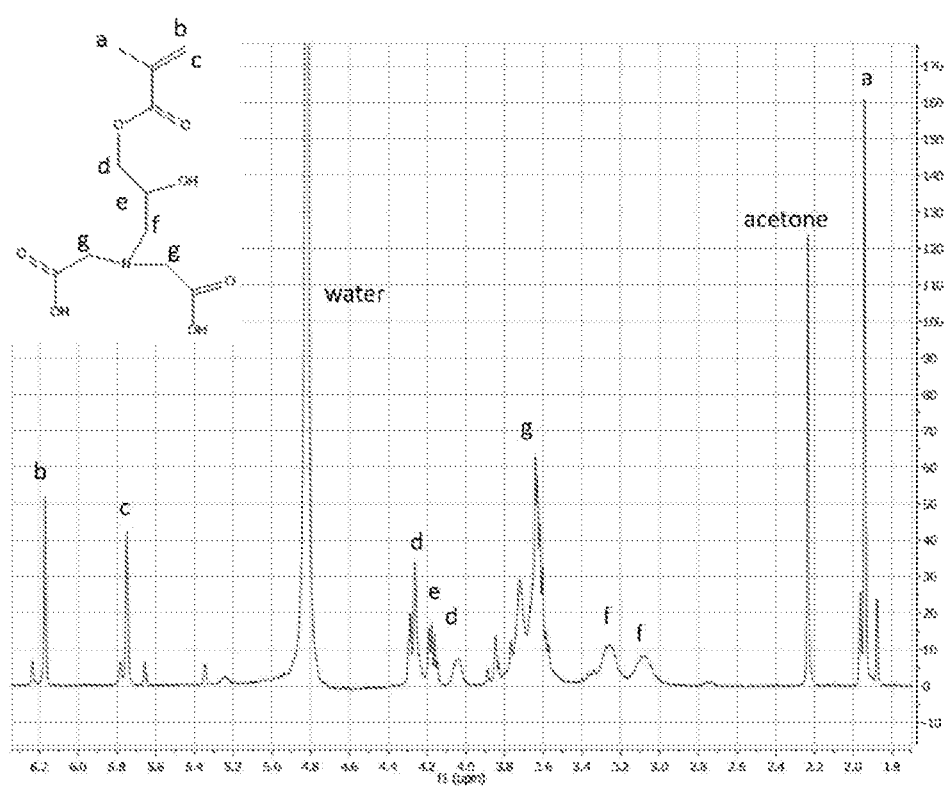
FIG. 3 shows a proton NMR spectrum of 2-propenoic acid,2-methyl-,3-[bis-(carboxymethyl) amino]-2-hydroxypropyl ester (GMA-IDA) in $D_2O$ (400 MHZ).

The metal chelating vinyl monomer, 2-propenoic acid,2-methyl-,3-[bis-(carboxymethyl) amino]-2-hydroxypropyl ester (GMA-IDA) was synthesized via an epoxy ring opening reaction between glycidyl methacrylate (GMA) and iminodiacetic acid (IDA) according to a reported procedure (Chen et al., "Stability Constants of Polymer-Bound Iminodiacetate-Type Chelating Agents With Some Transition-Metal Ions," *J. Appl. Polym. Sci.* 86(8): 1986-1994 (2002), which is hereby incorporated by reference in its entirety) with modifications. Briefly, IDA (6.655 g, 0.05 mol) was dissolved in 50 mL of 2M sodium hydroxide solution in a 250 mL round bottom flask, to which GMA (6.821 mL, 0.05 mol) was slowly added. The reaction continued at 65° C. in an oil bath for 1 hour with stirring under reflux. The solution was neutralized with 2 mL of concentrated hydrochloric acid. The solution was cleaned in 300 mL of acetone in a separation funnel three times to collect the bottom aqueous phase, containing the GMA-IDA monomer. The aqueous phase was stored in a vacuum chamber for 20 min to remove an excess amount of acetone. The final solution contained 48 w/w % of GMA-IDA monomer in water (determined using NMR spectroscopy (FIG. 3)). The GMA-IDA solution was stored in a refrigerator until further usage.

Example 3—Synthesis of BPM

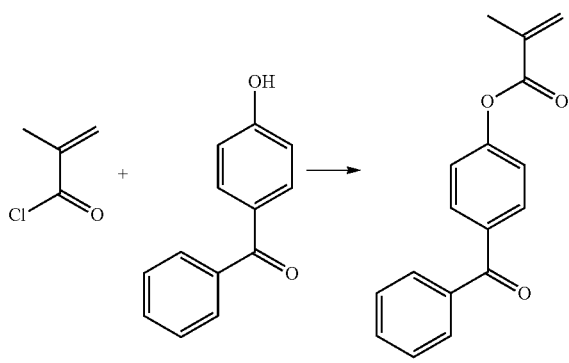

Figure 4:
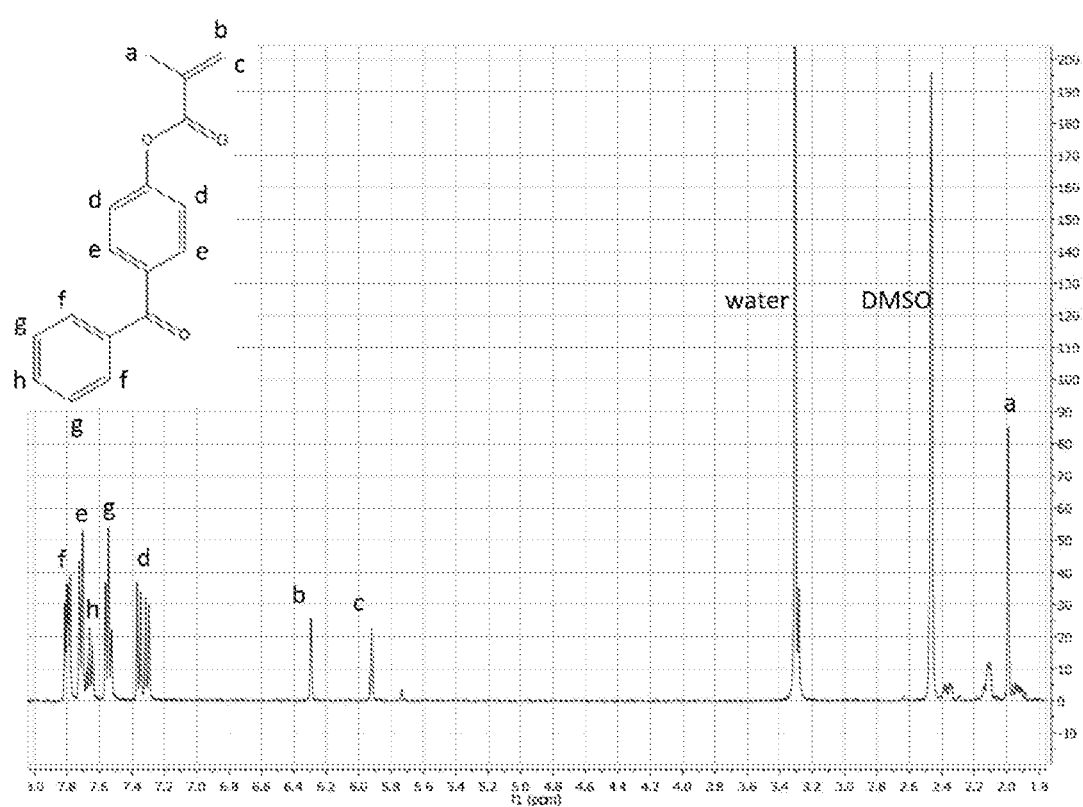
FIG. 4 shows a proton NMR spectrum of 4-benzoylphenyl methacrylate (BPM) in DMSO-$d_6$ (400 MHZ).

The photocurable vinyl monomer, 4-benzoylphenyl methacrylate (BPM), was synthesized according to a reported procedure (Schlemmer et al., "The Design of Thin Polymer Membranes Filled With Magnetic Particles on a Microstructured Silicon Surface," *Nanotechnology* 20(25):255301 (2009), which is hereby incorporated by reference in its entirety) with modifications. Briefly, a 300 mL reaction vessel equipped with an overhead stirrer and a dropping funnel was placed on an ice bath. 4-Hydroxybenzophenone (10.32 g, 0.052 mol) in diethyl ether (150 mL) was added into the reaction vessel. While stirring, trimethylamine (7.985 mL, 0.0575 mol) was slowly added into the above mixture. While degassing with nitrogen, methacryloyl chloride (5 mL, 0.052 mol) in diethyl ether (25 mL) was added dropwise into the reaction vessel through a pressure equilibrated dropping funnel. The reaction continued at room temperature in the dark for 18 hours. The precipitated triethylammonium hydrochloride salt was filtered using a filter paper and the filtrate was washed using DI water then 0.1% NaOH sequentially in a separation funnel until no yellow color was observed in the organic phase. An excess amount of magnesium sulfate was added into the organic phase to remove water. The organic phase was evaporated in a fume hood to remove diethyl ether and was dried in a vacuumed desiccator for three days to collect BPM. The yield of the reaction was 56.5%. Proton NMR spectrum in DMSO-$d_6$ is reported in FIG. 4. BPM was stored in a refrigerator until further usage.

Example 4—Preparation of Photocurable Metal Chelating Copolymer

Figure 2:
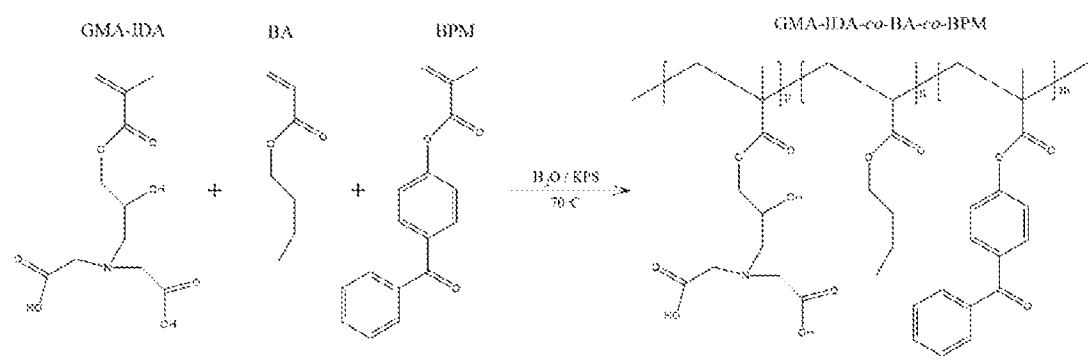
FIG. 2 is a scheme showing synthesis of poly(2-propenoic acid,2-methyl-,3-[bis-(carboxymethyl) amino]-2-hydroxypropyl ester-co-n-butyl acrylate-co-4-benzoylphenyl methacrylate) (GMA-IDA-co-BA-co-BPM) by emulsion polymerization of 2-propenoic acid, 2-methyl-,3-[bis-(carboxymethyl) amino]-2-hydroxypropyl ester (GMA-IDA), n-butyl acrylate (BA), and 4-benzoylphenyl methacrylate (BPM).
Figures 5A, 5B:
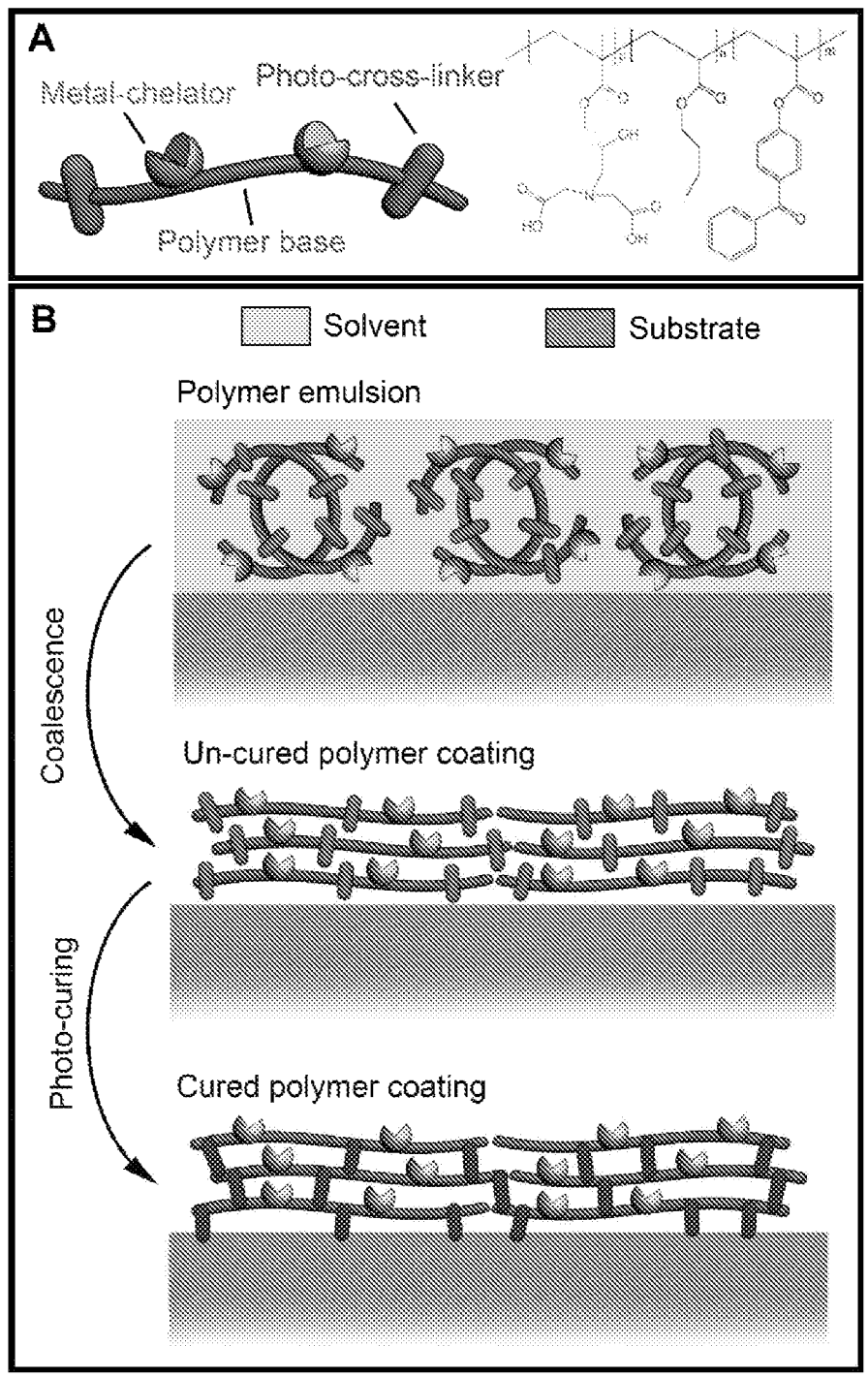
FIGS. 5A-5B show a conceptual illustration of the photocurable metal chelating polymer (FIG. 5A) and the process of preparing metal chelating films using the photocurable metal chelating coating (FIG. 5B).

The photocurable metal chelating polymer, poly (2-propenoic acid,2-methyl-,3-[bis-(carboxymethyl) amino]-2-hydroxypropyl ester-co-n-butyl acrylate-co-4-benzoylphenyl methacrylate) (GMA-IDA-co-BA-co-BPM) was synthesized by emulsion copolymerization of GMA-IDA, n-butyl acrylate, and BPM monomers (FIGS. 2, 5A). Emulsion polymerization is a free radical polymerization of vinyl monomers (oil phase) commonly conducted in water as a continuous phase. In this application, the amphiphilic nature of the GMA-IDA monomer permitted surfactant-free emulsion polymerization. Briefly, in a 300 mL reaction vessel equipped with an overhead mixer and a condenser, GMA-IDA (2.7 g, 48 w/w % monomer in water) and potassium persulfate (0.39 g) were dissolved in deionized (DI) water (126 mL). BPM (2.4 g) was dissolved in n-butyl acrylate (9.66 g) and the mixture was added into the reaction vessel. The mixture in the reaction vessel was purged with nitrogen gas for 20 min with stirring and was brought to 70° C. using an oil bath. The reaction continued at 70° C. for 20 hours in the dark with stirring. The crude copolymer emulsion was centrifuged at 3000 g force for 15 min to remove polymer precipitates. The supernatant was dialyzed in DI water using a 20 kDa regenerated cellulose dialysis membrane to remove unreacted GMA-IDA. The retentate was further purified by dialysis in methanol to remove unreacted n-butyl acrylate and BPM, and to introduce methanol as a co-solvent. The retentate was centrifuged at 3000 g force for 15 min to remove polymer precipitates. The supernatant containing the purified copolymer was collected and stored in a refrigerator until coating application (FIG. 5B). The yield of the reaction was 47.6%. The dispersed phase of the copolymer emulsion contained 42.4 mg/mL of copolymer, and the continuous phase contained 75 v/v % of methanol as co-solvent. The particle size distribution and the electrical charge of polymer emulsion were analyzed using a Zetasizer Nano ZS (Malvem Instruments, Ltd., Worcestershire, U.K.). To conduct NMR analysis, the polymer emulsion was dialyzed in DI water and lyophilized to collect dried GMA-co-BA-co-BPM copolymer. Nuclear Magnetic Resonance (NMR) spectrum of the copolymer was collected in DMSO-$d_6$ at 130° C. in a Varian INOVA-600 spectrometer (Palo Alto, Calif.).

Example 5—Preparation of Metal Chelating Film

Metal chelating films were prepared by coating GMA-IDA-co-BA-co-BPM copolymer onto heat-pressed polypropylene films followed by photocuring (FIG. 5B). Polypropylene films were prepared by pressing polypropylene pellets into polypropylene films according to previous reports (Lin et al., "Synthesis of Iminodiacetate Functionalized Polypropylene Films and Their Efficacy as Antioxidant Active-Packaging Materials," *J. Agric. Food. Chem.* 64(22):4606-4617 (2016); Lin et al., "Photo-Curable Metal-Chelating Coatings Offer a Scalable Approach to Production of Antioxidant Active Packaging," *J. Food Sci.* 83(2):367-376 (2018), which are hereby incorporated by reference in their entirety). To prepare the metal chelating films, an aliquot of GMA-IDA-co-BA-co-BPM copolymer emulsion was applied onto polypropylene films (20 µL/cm² of copolymer coating unless otherwise noted). As the solvent evaporated and the copolymer coalesced, a clear and glossy polymer coating was formed. The coating was crosslinked and bound to the polypropylene film by exposure to UV irradiation (365 nm, 225 mW/cm² flux) for 180 s. The completion of the benzophenone photocrosslinking reaction was monitored by following absorption spectrum at 270-290 nm (Dhende et al., "One-Step Photochemical Synthesis of Permanent, Nonleaching, Ultrathin Antimicrobial Coatings for Textiles and Plastics," *ACS Appl. Mater. Interfaces* 3(8):2830-2837 (2011); Baek et al., "Fine Neurite Patterns From Photocrosslinking of Cell-Repellent Benzophenone Copolymer," *J Neurosci. Methods* 210(2):161-168 (2012), which are hereby incorporated by reference in their entirety) during the photocuring process (0-200 s UV exposure time) using a Synergy Neo2 Hybrid Multi-Mode Reader (BioTek Instruments, Winooski, Vt.). The photocured metal chelating coating on polypropylene was further washed in hot DI water at 60° C. three times (30 min each) to remove any unattached polymers.

Example 6—Surface Characterization

Surface chemistry of the coated materials was characterized using attenuated total reflectance Fourier transform infrared (ATR-FTIR) spectroscopy and X-ray photoelectron spectroscopy (XPS). ATR-FTIR spectra were collected on an IRTracer-100 FTIR spectrometer (Shimadzu Scientific Instruments, Kyoto, Japan) equipped with an ATR crystal. Spectra were collected at a resolution of 4 cm$^{-1}$ (32 scans) using Happ-Genzel apodization, with air as background spectra. XPS spectra were collected on a SSX-100 (Surface Science Instruments) with operation pressure at around $2 \times 10^{-9}$ Torr. Photoelectrons were collected at a 55° emission angle using a monochromatic Al Kα X-ray (1486.6 eV) with 1 mm diameter beam size. Electron kinetic energy was determined using a hemispherical analyzer with a pass energy of 150 V for wide/survey scans. Surface morphology and coating thickness were characterized using scanning electron microscopy (SEM). Surfaces and cross-sections were sputter-coated with gold (Cressington Scientific, Watford, UK) and imaged at 10 kV in a JEOL 6000 FXV SEM (JEOL Ltd. Akishima, Tokyo, Japan). Surface wettability and surface energy of the materials were analyzed using contact angle analysis using an Attension Theta Optical Tensiometer (Biolin Scientific, Stockholm, Sweden). Advancing and receding water contact angles were measured according to a reported protocol (Korhonen et al., "Reliable Measurement of the Receding Contact Angle," *Langmuir* 29(12):3858-3863 (2013), which is hereby incorporated by reference in its entirety). Briefly, advancing water contact angles were measured by depositing DI water onto substrate surfaces at rate of 0.5 μL/s and receding contact angles were measured after advancing angle measurement by withdrawing water at a rate of 0.5 μL/s. Surface energy of the materials was determined using a Zisman plot method (Kabza et al., "Contact Angle Goniometry as a Tool for Surface Tension Measurements of Solids, Using Zisman Plot Method. A Physical Chemistry Experiment," *J. Chem. Educ.* 77(1):63 (2000), which is hereby incorporated by reference in its entirety). Advancing contact angles were collected using water, acetone, ethylene glycol and glycerol as probe fluids to calculate the surface energy. Carboxylic acid densities of the materials were quantified using a TBO dye assay (Uchida et al, "Sorption of Low-Molecular-Weight Anions Into Thin Polycation Layers Grafted Onto a Film," *Langmuir* 9(4): 1121-1124 (1993), which is hereby incorporated by reference in its entirety). The materials were stored in 0.5 mM TBO dye solutions at pH 10.0 for 24 hours to absorb TBO dye, followed by rinsing in water adjusted to pH 10.0 by sodium hydroxide to remove loosely bound dye. The complexed TBO dye was then desorbed by storing the materials in 50 v/v % acetic acid in water solutions. The amount of dye released to acetic acid solution was quantified by measuring absorbance at 633 nm, and compared to a standard curve of TBO dye in acetic acid solution. The carboxylic acid density was determined by assuming a 1:1 stoichiometric ratio between absorbed dye and carboxylic acid.

Example 7—Metal Chelating Analysis

Iron chelating capacity of materials was analyzed using inductively coupled plasma-mass spectrometry (ICP-MS) and a colorimetric ferrozine assay according to previous protocols (Tian et al., "Controlling Lipid Oxidation via a Biomimetic Iron Chelating Active Packaging Material," *J. Agric. Food. Chem.* 61(50): 12397-12404 (2013); Dawson et al., "Spectrophotometric Determination of Iron and Cobalt with Ferrozine and Dithizone," *Talanta* 37(12): 1189-1191 (1990), which are hereby incorporated by reference in their entirety). To conduct ICP-MS analysis, materials were stored in 0.06 mM ferric chloride in 50 mM sodium acetate/imidazole buffer (pH 3.0, 4.0 and pH 5.0) in the dark for 72 hours. The materials were rinsed with absolute ethanol and dried in a desiccator. The materials (approximately 140 mg) were digested in 5 mL of nitric acid (trace metal grade) in a microwave oven (Milestone Srl, Milan, Italy) (ramp to 210° C. for 20 min, hold at 210° C. for 20 min and cool for 10 min). Digested samples were diluted with DI water and were stored in a refrigerator until analysis. ICP-MS analysis was conducted on an Agilent 7500 series ICP-MS equipped with an Agilent ASX-500 auto sampler (Agilent, Waltham, Mass.). Calibration standards were prepared with iron solutions (1000 ppm ICP-MS Standard, Sigma-Aldrich, St. Louis, Mo.). To conduct the ferrozine assay, materials were incubated in 0.08 mM ferric chloride in 50 mM sodium acetate/imidazole buffer (pH 4.0, 72 hours, room temperature, dark) to chelate ferric ions. Ferric ion concentration in the buffered solution remaining after storage was quantified by adding a reducing agent (5 wt % hydroxylamine chloride and 10 wt % TCA) and ferrozine solution (18 mM ferrozine in 50 mM HEPES (pH 7.0)). The absorbance of the mixture was measured at 562 nm after 1 hour incubation and the ferric ion concentration was calculated by comparison to a standard curve prepared using ferric chloride.

Example 8—Antioxidant Efficacy

The performance of the metal chelating films was evaluated by analyzing the antioxidant efficacy against ascorbic acid degradation according to previous protocols (Lin et al., "Synthesis of Iminodiacetate Functionalized Polypropylene Films and Their Efficacy as Antioxidant Active-Packaging Materials," *J. Agric. Food. Chem.* 64(22):4606-4617 (2016); Lin et al., "Photo-Curable Metal-Chelating Coatings Offer a Scalable Approach to Production of Antioxidant Active Packaging," *J. Food Sci.* 83(2):367-376 (2018), which are hereby incorporated by reference in their entirety). Metal chelating films (1×1 cm$^2$ coupons) were stored in 1 mL of ascorbic acid solution (20 mM ascorbic acid in 10 mM sodium acetate/imidazole buffer, at both pH 3.0 and pH 5.0) at 37° C. in 10 mL glass vials sealed with septum caps. Blank ascorbic acid solutions, ascorbic acid solutions incubated with polypropylene, and ascorbic acid solutions with 0.08 mM EDTA (23.4 ppm equivalent, molecular weight 292.2 g/mol) were used as controls. The ascorbic acid content during the storage was analyzed using a modified Association of Official Analytical Chemists (AOAC) official method 967.21 (Horwitz, *Official Methods of Analysis of the Association of Official Analytical Chemists,* 11th Ed., Washington, D.C.: Association of Official Analytical Chemists (1970), which is hereby incorporated by reference in its entirety). Briefly, 0.2 mL of the ascorbic acid solution was mixed with 4.8 mL 0.04 wt % oxalic acid in water, followed by adding 0.3 mL of this ascorbic acid/oxalic acid mixture into 4.7 mL of 0.2 mM dichloroindophenol in water solution. The absorbance was measured immediately at 520 nm and ascorbic acid content was calculated by comparing to ascorbic acid standards. The changes in ascorbic acid contents during storage were fitted to a first order degradation rate equation to determine degradation half-lives and rate coefficients.

Example 9—Graft Stability

Coating stability was assessed by incubating metal chelating films in food simulants in accordance with a reported FDA guideline for premarket approval of food contact substances. Metal chelating films (1×1 cm$^2$ coupons) were stored in 1.55 mL of DI water, 3 wt % acetic acid, 10 v/v % ethanol and corn oil, simulating aqueous, acidic, alcoholic, and fatty food systems, respectively, for 10 days at 40° C. After storage, films were rinsed with absolute ethanol and DI water, and were dried in a desiccator. The surface chemistry and surface morphology of the metal chelating films were analyzed using ATR-FTIR and SEM and compared to spectra and micrographs of freshly coated films to assess for stability.

Example 10—Statistics

GMA-IDA-co-BA-co-BPM copolymer emulsion was prepared at least three times, with uniformity in surface chemistry, metal-chelating activity and antioxidant efficacy, indicating reproducibility of the coating formulation. Surface analysis, metal chelating assays, and ascorbic acid degradation study were performed using quadruplicate samples of metal chelating films prepared by a single representative batch of copolymer emulsion. The reported ATR-FTIR spectra are representative of four spectra collected across quadruplicate separately prepared samples. Reported scanning electron micrographs are representative of images acquired at random locations on quadruplicate samples. Results of surface wettability and surface energy, carboxylic acid density, metal chelating analysis, and ascorbic acid degradation experiments are representative of at least two experiments repeated independently. Results of coating thickness, carboxylic acid density, and metal chelating capacity were subjected to analysis of variance (ANOVA) to compare difference using Fisher's least significant difference (p<0.05) in GraphPad Prism 6.0 (La Jolla, Calif.).

Example 11—Photocurable Metal Chelating Copolymer

Metal chelating materials have been used in many applications such as heavy metal removal, protein purification, chromatography, and biosensors. The potential use of metal chelating materials as active packaging materials or coatings was first demonstrated in 2012, by the Goddard Research Group. Initial proof of concept research synthesized metal chelating films and tested the chelating and antioxidant performances in simulated food systems. The antioxidant efficacy of metal chelating materials was initially demonstrated in emulsified oil systems using carboxylic acid functionalized polypropylene films (PP-g-PAA). Because carboxylic acid ligands had low specificity to transition metals, the resulting material had limited chelating and antioxidant efficacy in complex matrices (e.g. environment with competing ions). Then hydroxamic acid functionalized material (PP-g-PHA) was developed. The hydroxamic acid ligand is known to have high specificity to iron comparing to carboxylic acid ligand, and, as a result, PP-g-PHA films had improved chelating and antioxidant performance in high acid conditions. However, the synthesis of PP-g-PHA material was quite complicated. Briefly, to synthesize PP-g-PHA, native polypropylene coupons must be first initiated using benzophenone in a degassed environment using UV-light. The benzophenone functionalized coupons were placed in methyl acrylate solutions, degassed, and then exposed to UV-light to graft poly(methyl acrylate) from the coupons. The poly(methyl acrylate) functionalized coupons were washed overnight in a Soxhlet apparatus using acetone. The following day, the washed coupons were reacted in a hydroxylamine solution for 4 hours to convert the methyl ester to hydroxamic acid. The whole process took around 2 days, and was simply too complicated for scaling up. Next, new synthesis techniques were developed that would improve the scalability of the materials.

It is not easy to synthesize metal chelating materials. In fact, the majority of metal chelating ligands are hydrophilic, and it seems that the more specific the ligands are to transition metals, the more hydrophilic they are. Tethering a hydrophilic ligand onto an inert solid support material with retained performance and the requirement that they not to come off in aqueous environments are not trivial. Many people had also reported synthesis of metal chelating materials in literature articles and industry patents. However, scalability has not been a priority, with much published and patented literature following similar complex, time-consuming processes.

There were two major hurdles in the preparation process of PP-g-PAA and PP-g-PHA materials. The first one was the degassing prior to the UV-exposure, and the second one was the solution reaction during the post-graft modification. Indeed, photo-assisted graft polymerization of vinyl monomers is prone to oxygen inhibition, and many graft-from reactions had been conducted in degassed environments. However, it is possible to skip the degassing process, and, instead, conduct the reaction by sandwiching the vinyl monomers within two films. Therefore, the laminated photografting technique was adopted to replace the degassing process. The laminated photografting technique enabled potential roll-to-roll preparation of photo-functionalized materials and was a huge improvement comparing to previous process.

Iminodiacetic acid (IDA) was explored as a metal chelating ligand for active packaging applications. Compared to other metal chelating ligands (i.e. carboxylic acid, hydroxamic acid, catechol), IDA has several advantages of 1) high specificity to metals, 2) high commercial availability, 3) high stability and robustness, 4) ease of chemical modification. To prove the efficacy of IDA functionalized materials for active food packaging application, a reactive chloride functionalized propylene film was prepared using laminated photografting and tethered IDA ligand onto the surface using a 10-hour chemical reaction. The resulting IDA functionalized materials were as effective as EDTA at controlling lipid oxidation in emulsified oil systems at pH 3.0. The IDA functionalized material was also capable of controlling transition metal-induced ascorbic acid degradation. Performance-wise, the IDA functionalized materials had better antioxidant efficacy than materials functionalized with either carboxylic acid, hydroxamic acid, or catechol. For example, carboxylic acid functionalized materials did not control lipid oxidation at pH 3.0, hydroxamic acid functionalized material did not control lipid oxidation as well as EDTA and it did not control ascorbic acid degradation, and catechol functionalized material had stability issues at pH 3.0.

Despite the promise of laminated photografting technique and the IDA functionalized materials, the several-hour-long solution reaction still presented a major hurdle. To remove the solution modification process, the metal chelating ligands should be pre-attached to some anchoring system and then the anchoring system should be applied to the solid support using a speed chemistry. With this idea in mind, IDA functionalized vinyl monomer (GMA-IDA) was synthesized and the GMA-IDA monomer was attached onto support materials using laminated photografting. The use of GMA-IDA and laminated photografting enabled potential scalable production of metal chelating materials without degassing or batch reaction in solution. However, the material was hydrophilic and swellable, which may not be ideal for food packaging application. Although the surface grafts were chemically bound to the surface, there remained the potential to migrate into the food system. In addition, migration of monomeric GMA-IDA may also present a safety concern.

An alternative plan was to tether the metal chelating ligand onto polymeric anchoring system instead of monomeric anchoring system, and to develop a metal chelating polymer. Metal chelating polymers are known in the literature. In the biomedical field, metal chelating polymers were synthesized for heavy metal chelation therapy. In the biology field, metal chelating polymers secreted by natural organisms that they used to combat iron deficient conditions were extracted. In fact, metal chelating polymers, such as polyethyleneimine, are directly available from commercial suppliers. However, most of the metal chelating polymers are soluble in water, and they have to be somehow immobilized onto the substrates. Therefore, crosslinkers have to be incorporated into these polymers to enable surface attachment.

Photocuring is widely used in printing and coating industry as a speed curing process, and benzophenone has often been used as a photocrosslinker in many photocurable polymeric coating formulations. Benzophenone also has several advantages of being used in food active packaging application. First of all, benzophenone is inexpensive and has already been widely used many ink formulations in food package labels. Secondly, benzophenone is chemically robust and does not degrade easily by heat. Thirdly, benzophenone crosslinks with substrates rich in alkyl groups (e.g. common plastic materials for food packaging). Fourthly, the photocrosslinking reaction take place in atmospheric environment and the reaction is irreversible. Therefore, a photocurable metal chelating polymer with IDA as metal chelator and benzophenone as photocrosslinker was developed. A poly(n-butyl acrylate) copolymer with IDA and benzophenone moieties was synthesized. The copolymer was synthesized by emulsion copolymerization of n-butyl acrylate, GMA-IDA (the IDA functionalized vinyl monomer), and 4-benzoyphenyl methacrylate (BPM, a benzophenone functionalized vinyl monomer). With emulsion polymerization, the reaction took place in water and the resulting polymer was insoluble in water but formed stable micelles. The polymer latex can be cast onto plastic substrates as a coating and photocured to immobilize the coating to the surface. The photocurable metal chelating copolymer technology enables scalable coat/cure preparation of metal chelating materials without the need of inert gas environment or batch solution reaction.

Preparation

A metal-chelating polymer based on polyethylene amine (PEI) was prepared (Scheme 1). The amine groups on PEI ware converted to IDA groups by reacting PEI with bromoacetic acids. The resulting modified PEI showed metal-chelating activity, as was confirmed by adding the polymer into $Fe^{3+}$ solutions followed by analyzing the remaining $Fe^{3+}$ content after removal of polymer by centrifugal membranes. However, upon application of the polymer onto polypropylene surface as a coating, the coating was swellable and was soluble in aqueous solutions.

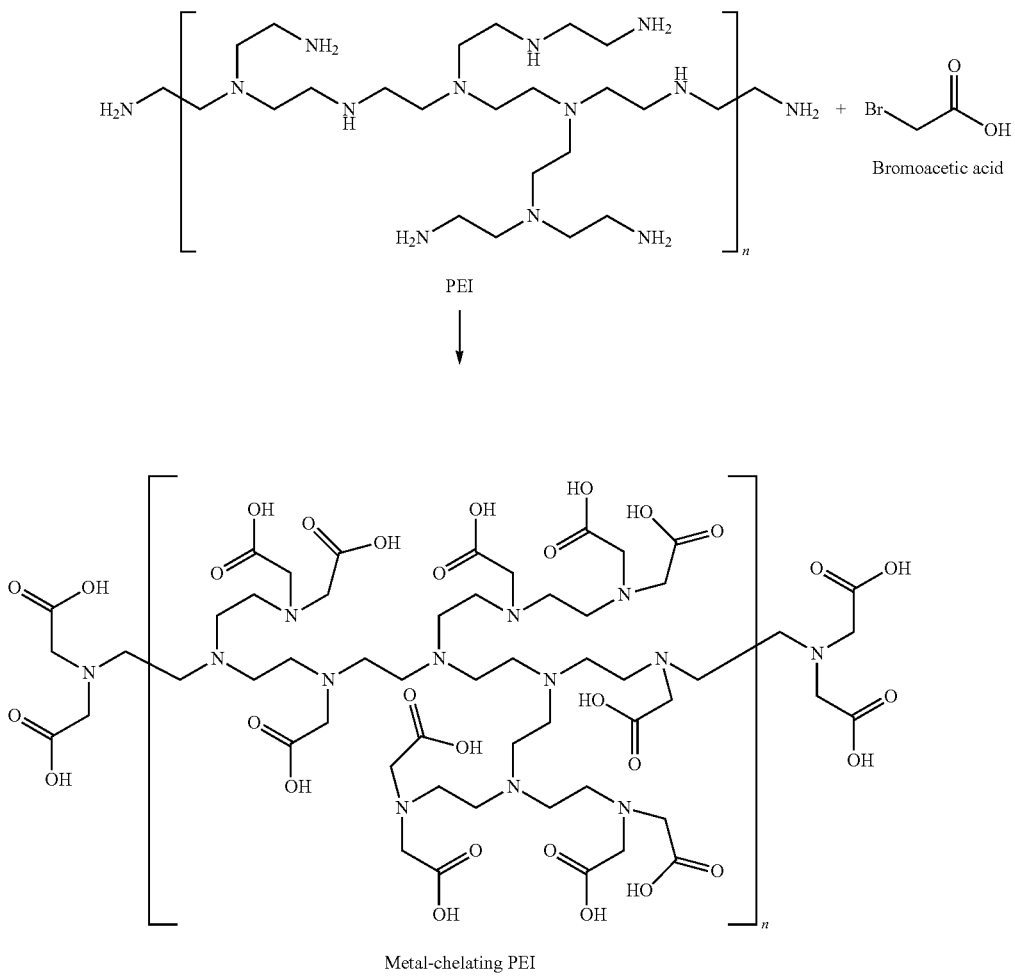

Scheme 1

PEI

Bromoacetic acid

Metal-chelating PEI

In order to control the solubility of the metal chelating polymer and to prepare polymers that were insoluble in water, a poly(n-butyl acrylate) based copolymer with IDA functionality was synthesized by emulsion polymerization of n-butyl acrylate and GMA-IDA in water (Scheme 2). The resulting polymer was insoluble in water but formed a stable colloid dispersion. Upon casting the polymer latex onto polypropylene surface, the polymer formed a clear coating after drying. However, upon contacting water, the polymer delaminated and reverted to its latex form. The instability of the polymer coating in aqueous environment was potentially caused by the hydrophilic IDA groups. It became apparent that crosslinking moieties had to be incorporated into the polymer, in order to immobilize the polymer coating to a substrate.

Scheme 2

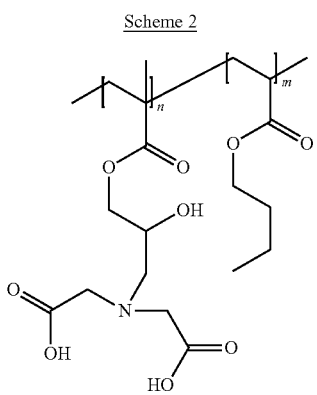

An epoxy group was incorporated into the copolymer to give a poly(n-butyl acrylate) based copolymer with GMA-IDA and glycidyl methacrylate moieties (Scheme 3). The polymer was again synthesized by emulsion copolymerization. The polymer latex was coated on polypropylene-graft-maleic anhydride (PP-g-MAA) surface and cured the coating by heat to allow cross-linking reaction between epoxy and maleic anhydride groups. However, the cured coating was still unstable in aqueous environment like the one in Scheme 2. Although some polymers might have been fixed to the PP-g-MAA surface, the polymers that were not in direct contact with PP-g-MAA surface might have not. The epoxy groups were able to have a cross-linking reactions with primary and secondary amines, which were not present in the polymer. It became apparent that the crosslinker has to not only crosslink with the substrate, but also crosslink with the polymer to improve the coating stability.

Scheme 3

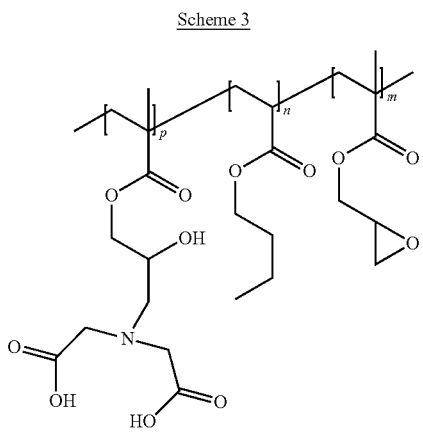

The epoxy group was replaced by a photocrosslinker, 4-benzoyl-3-hydroxyphenyl methacrylate (BHMA). BHMA was purchased from a commercial supplier, and it contained a benzophenone derivative as a photocrosslinker. Benzophenone is known to photocrosslink with alkyl groups rich in both the polymer and polypropylene substrate. The GMA-IDA-co-BA-co-BHMA copolymer was synthesized by emulsion copolymerization (Scheme 4). The polymer latex was casted onto polypropylene surface and formed a clear coating upon solvent evaporation. The coating was exposed to UV-light to photocure the coating. However, the photocured coating was unstable in water and could be washed away by water. The instability was hypothesized to be the inefficiency of the photocrosslinker. However, it may also be that the polymer contained too much GMA-IDA or too little BHMA.

Scheme 4

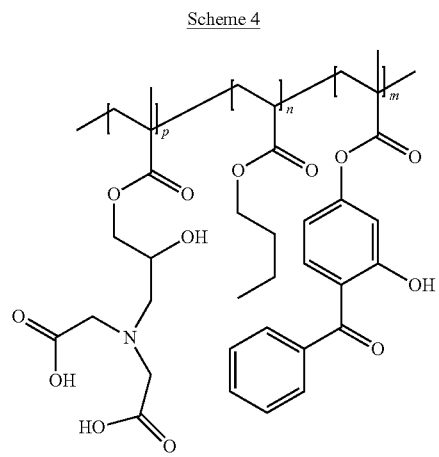

The BHMA monomer was then replaced by a 4-benzoylphenyl methacrylate (BPM). The GMA-co-BA-co-BPM copolymer was again synthesized by emulsion copolymerization (Scheme 5). The photocured polymer coated formed on polypropylene surface was stable in water and could not be washed away by water. The content of the GMA-IDA and BPM were further adjusted in the formulation. However, too much GMA-IDA or too little BPM both led to the instability of the photocured coating.

Scheme 5

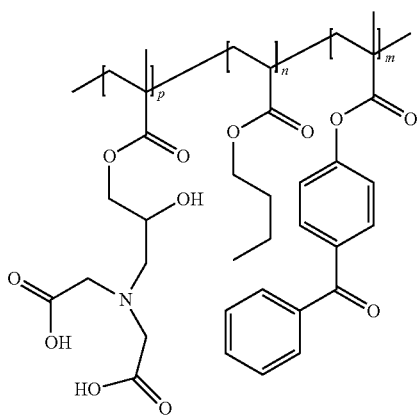

In addition, the poly(n-butyl acrylate) polymer base was replaced by polystyrene. The GMA-IDA-co-St-co-BPM was synthesized by emulsion copolymerization (Scheme 6). The polymer latex was casted onto polypropylene surface, however, upon drying, the coating became some white powdery aggregates. Polystyrene has high glass transition temperature and may not be suitable for coating application.

Scheme 6

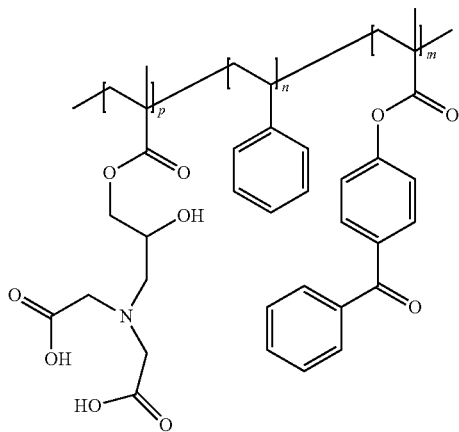

Alternative synthesis routes were attempted to synthesize the photocurable metal chelating polymer, GMA-IDA-co-BA-co-BPM illustrated in Scheme 5. An epoxy functionalized precursor polymer, GMA-co-BA-co-BPM, was synthesized by single electron transfer—living radical polymerization (SET-LRP) in DMSO. The precursor polymer was then reacted with IDA to tether the metal chelating ligand (Scheme 7). However, the proposed reaction was unsuccessful because a solvent system that would dissolve both the precursor polymer and the IDA could not be found. Reaction was attempted in DMSO, DMSO/water, DMF/water, however, reaction was unsuccessful in these solvents.

Scheme 7

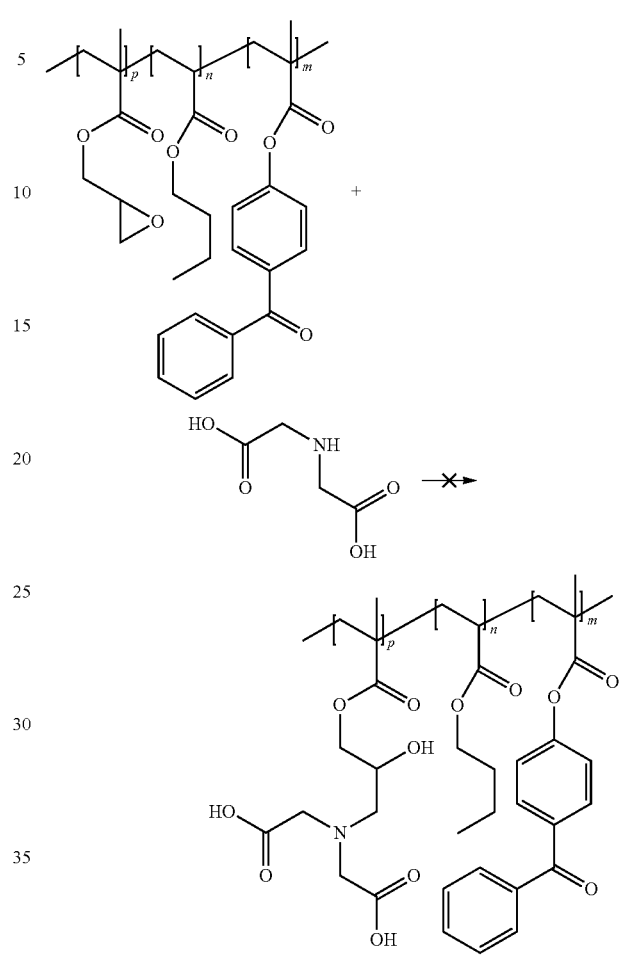

Ethylenediamine (EDA) is soluble in water and many organic solvent including DMSO and DMF. EDA and precursor polymer were dissolved in DMF and reacted at 30° C. or 70° C. for 24 hours to allow ring opening reaction (Scheme 8). However, the resulting polymer lost benzophenone moieties as suggested by proton NMR spectroscopy. It was assumed that EDA might have cleaved the ester bond on the BPM moieties.

Scheme 8

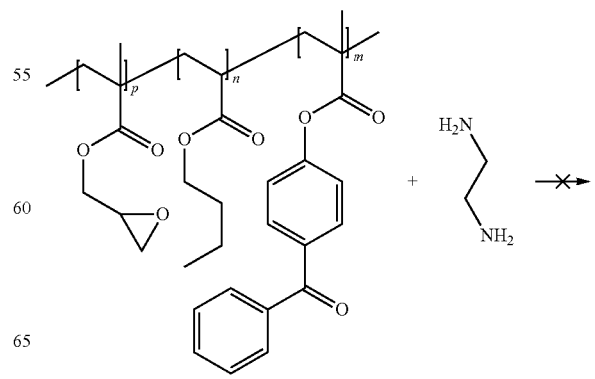

-continued

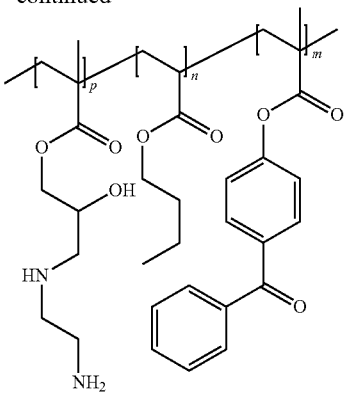

Example 12—Copolymer Characterization

Figure 6:
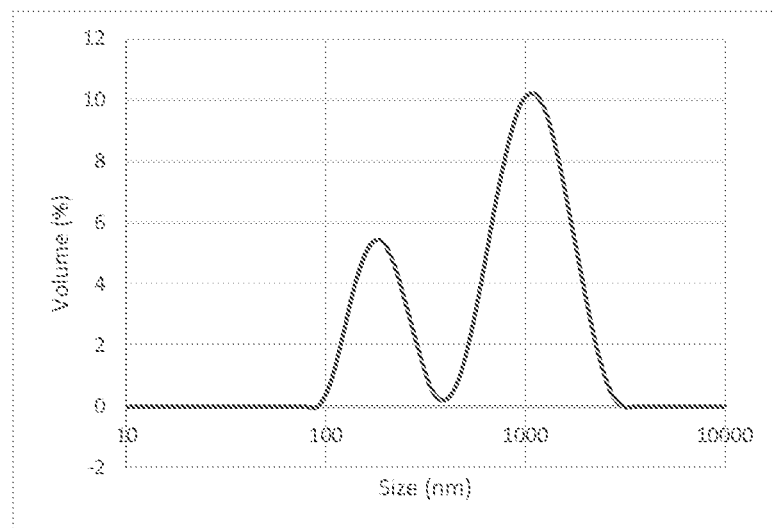
FIG. 6 is a graph showing zeta-sizer size distribution of GMA-IDA-co-BA-co-BPM copolymer emulsion.
Figure 7:
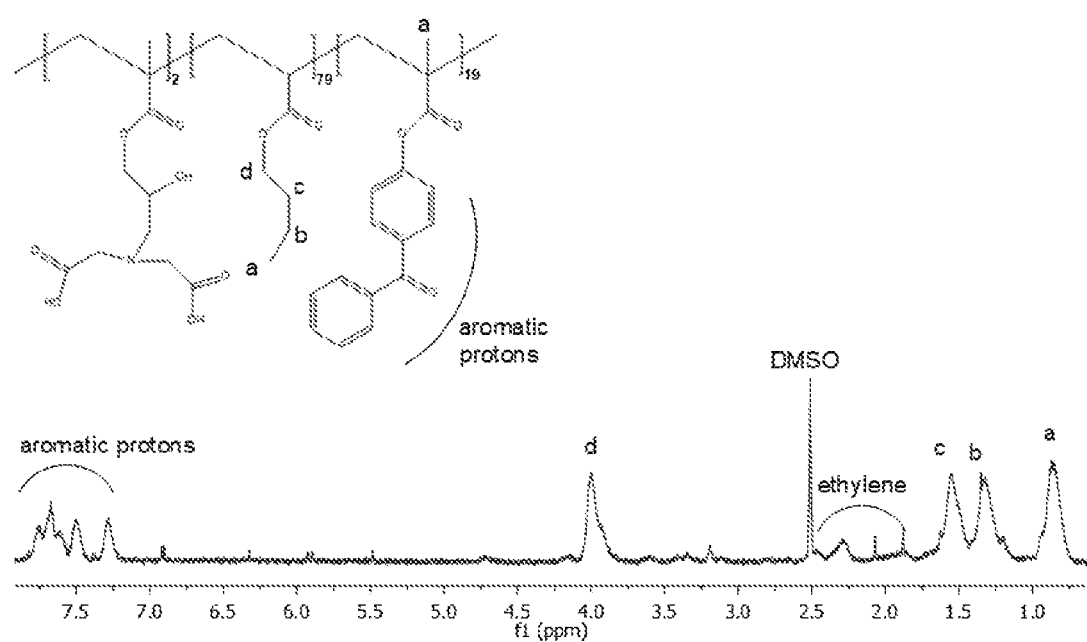
FIG. 7 shows a proton NMR spectrum of GMA-IDA-co-BA-co-BPM polymer collected in DMSO-$d_6$ (130° C., 600 MHZ).

The photocurable metal chelating copolymer, GMA-IDA-co-BA-co-BPM, was synthesized by surfactant-free emulsion polymerization. GMA-IDA-co-BA-co-BPM is a poly(n-butyl acrylate) based copolymer with IDA and benzophenone moieties (FIG. 2), where IDA serves as a metal chelator and benzophenone serves as a photocrosslinker (FIGS. 5A-5B). The copolymer latex was stable as polymer emulsion in water and in aqueous environment with methanol as a co-solvent without the need for surfactants, likely due to the amphiphilic nature of the GMA-IDA moieties, in agreement with other reports (Chen et al., "Formation of Silver Nanoparticles on a Chelating Copolymer Film Containing Iminodiacetic Acid," Thin Solid Films 484(1-2):68-72 (2005); Wang et al., "Facilitated Transport of Molecular Oxygen in Cobalt-Chelated Copolymer Membranes Prepared by Soap-Free Emulsion Polymerization," J. Membr. Sci. 208(1-2):133-145 (2002); Chu et al., "A New Approach to Hybrid CdS Nanoparticles in Poly(BA-co-GMA-co-GMA-IDA) Copolymer Membranes," J. Membr. Sci. 247(1-2):201-209 (2005), which are hereby incorporated by reference in their entirety). The mean diameter of the resulting copolymer latex was determined to be 470.9±5.2 nm (FIG. 6). The copolymer latex had a slightly negative surface charge of −1.67±0.26 mV, which was likely from the partially deprotonated IDA moieties that served to stabilize the copolymer latex. The proton NMR spectrum of the copolymer was collected in DMSO-$d_6$ at 130° C. (FIG. 7). Chemical shifts at 0.86 ppm, 1.50 ppm, 1.55 ppm, 4.00 ppm were assigned to the butyl acrylate moieties. Chemical shifts at 7.28 ppm, 7.50 ppm, 7.76 ppm were assigned to the aromatic protons from BPM moieties. The GMA-IDA moieties did not show apparent NMR signals, suggesting a low molar composition of GMA-IDA in the copolymer. The molar composition of BA and BPM was determined to be 79% and 19%, respectively, using NMR spectroscopy. The composition of GMA-IDA moieties in the copolymer was determined to be 2% by measuring the carboxylic acid content in the copolymer coating. The determination of molar composition of each monomeric moiety is described in detail in Example 13.

Figures 8A, 8B:
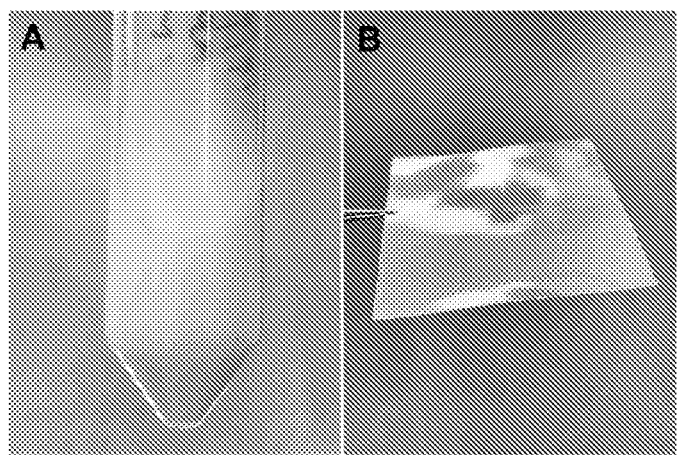
FIGS. 8A-8B are images showing GMA-IDA-co-BA-co-BPM copolymer emulsion (FIG. 8A) and photocured coating (glossy, transparent) on polypropylene (FIG. 8B).
Figures 9A, 9B:
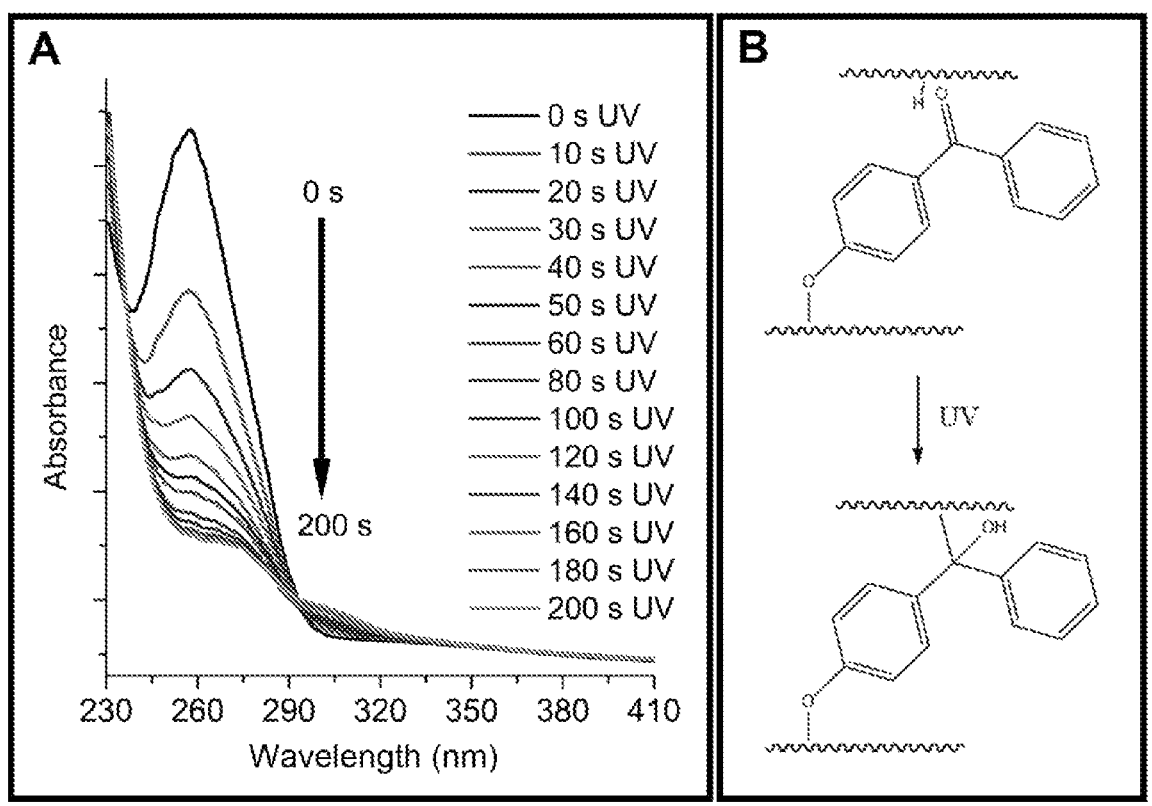
FIGS. 9A-9B show a benzophenone absorption spectra during UV-curing (FIG. 9A) and cross-linking reaction of the benzophenone moiety during UV-curing (FIG. 9B).

The copolymer coating was applied onto polypropylene surface to form a clear and glossy uncured coating (FIGS. 8A-8B), which was further photocured by exposure to UV-light. The photocuring capability of the GMA-IDA-co-BA-co-BPM copolymer was analyzed by monitoring the absorption spectrum at 270-290 nm, which decreases in intensity with increased crosslinking of benzophenone (Dhende et al., "One-Step Photochemical Synthesis of Permanent, Nonleaching, Ultrathin Antimicrobial Coatings for Textiles and Plastics," ACS Appl. Mater. Interfaces 3(8): 2830-2837 (2011); Baek et al., "Fine Neurite Patterns From Photocrosslinking of Cell-Repellent Benzophenone Copolymer," J Neurosci. Methods 210(2):161-168 (2012), which are hereby incorporated by reference in their entirety). The uncured coating had a strong absorption maximum at 270 nm. As the coating was exposed to UV-light (365 nm, 225 mW/cm$^2$), the absorption band at 270 nm decreased (FIGS. 9A-9B), suggesting successful benzophenone crosslinking. The mechanism of this crosslinking reaction was explained by Dorman et al., "Benzophenone Photophores in Biochemistry," Biochemistry 33(19):5661-5673 (1994), which is hereby incorporated by reference in its entirety. As benzophenone absorbs photons at 365 nm, the carbonyl group is induced to a biradical triplet state, which abstracts a hydrogen from a neighboring C—H bond and forms two free radicals. The two free radicals then form a new C—C bond and create a crosslink. Since alkyl groups are abundant on the surface of polypropylene and on the poly(n-butyl acrylate) based copolymer, the benzophenone moieties were believed to crosslink to the surface of polypropylene substrate and within the polymer coating, making the coating stable against delamination from the polypropylene after photocuring. Contrary to this result, poly(n-butyl acrylate) based copolymer coatings with IDA moieties but without benzophenone moieties failed to form stable coatings on polypropylene after exposure to UV-light.

Example 13—Determination of Molar Composition of Monomeric Components in the Copolymer The molar composition of each monomeric component in the GMA-IDA-co-BA-co-BPM copolymer was determined using a combination of chemical assay and NMR spectroscopy. The content of GMA-IDA monomer was determined using the total amount of carboxylic acids in the polymer coating. The carboxylic acid content was determined using TBO dye assay (assuming TBO dye binds only with carboxylic acids in the polymer in a 1:1 molar ratio) (Uchida et al, "Sorption of Low-Molecular-Weight Anions Into Thin Polycation Layers Grafted Onto a Film," Langmuir 9(4): 1121-1124 (1993), which is hereby incorporated by reference in its entirety). When the 20 μL/cm$^2$ of polymer coating was applied and cured, the coating averaged 221.7 nmol/cm$^2$ carboxylic acids (FIGS. 10A-10B), which was equivalent to 0.0305 mg/cm$^2$, factoring in the molar mass of GMA-IDA (275.26 g/mol). The concentration of polymer in the emulsion was 42.4 mg/mL, therefore, the total amount of polymer was 20 μL/cm$^2$×42.4 mg/mL=0.848 mg/cm$^2$. The weight fraction of GMA-IDA in the polymer was 0.0305/ 0.848=3.6%. The ratio between BA and BPM in the polymer was determined using proton NMR spectroscopy (FIG. 7). The ratio between peaks assigned to b, c and peaks assigned to the aromatic protons was determined as 8.73 (b, c): 4.8 (aromatic protons). Factoring in the number of protons, the molar ratio of BA and BPM in the polymer was determined to be 2.183:0.533. Factoring in the molar mass of BA (128.17 g/mol) and BPM (266.29 g/mol), the weight fraction of BA and BPM was determined as 279.80:141.93. Since, the weight fraction of BA and BPM in the polymer totaled a 96.4%, the weight fraction of BA and BPM was determined to be 63.6% and 32.8% respectively. The weight fraction of GMA-IDA, BA and BPM was then converted to molar fraction using the molar mass of each monomer. The mole percent of GMA-IDA, BA and BPM in the final GMA-IDA-co-BA-co-BPM copolymer was determined to be 2 mol %, 79 mol % and 19 mol %, respectively.

Example 14—Surface Characterization

Figures 11A, 11B:
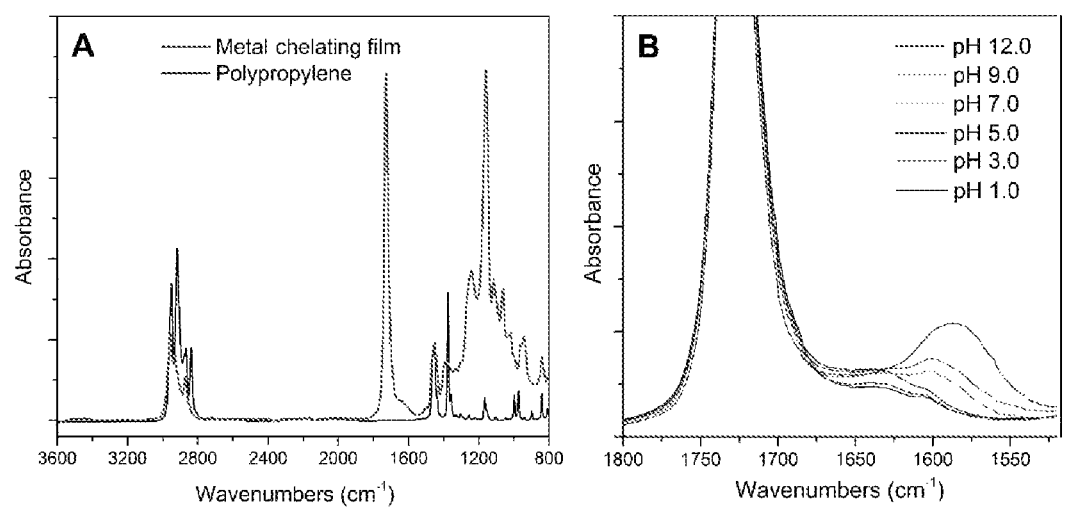
FIGS. 11A-11B show an ATR-FTIR spectrum of metal chelating film and polypropylene (FIG. 11A) and an ATR-FTIR spectrum of the carbonyl stretching vibration region of metal chelating films under different pH conditions (FIG. 11B).

The surface chemistry of metal chelating film was characterized using ATR-FTIR spectroscopy, with polypropylene film as control (FIG. 11A). Polypropylene had characteristic absorption bands at 3000-2800 cm$^{-1}$ (C—H stretch), and at 1450 cm$^{-1}$ and 1370 cm$^{-1}$ (C—H bend). Metal chelating film had an absorption band at 3000-2800 cm$^{-1}$ (C—H stretch), a strong absorption band at 1710 cm$^{-1}$, a small shoulder at 1620 cm$^{-1}$ (C=O stretch), and absorption bands at 1260-1160 cm$^{-1}$ (C—O—C stretch). These absorption bands are characteristic for poly(n-butyl acrylate) based materials (Suma et al., "Studies on the Effect of Nano-TiO2 on Vinyl Acetate-Butyl Acrylate Latex-Based Surface Coating," *Mater. Sci. Eng., B* 168(1-3):254-258 (2010); Chen et al., "Formation of Silver Nanoparticles on a Chelating Copolymer Film Containing Iminodiacetic Acid," *Thin Solid Films* 484(1-2):68-72 (2005), which are hereby incorporated by reference in their entirety). The small shoulder at 1620 cm$^{-1}$ suggests the presence of IDA ligands, as deprotonated IDA ligands are known to absorb at this wavenumber (Lin et al., "Synthesis of Iminodiacetate Functionalized Polypropylene Films and Their Efficacy as Antioxidant Active-Packaging Materials," *J. Agric. Food. Chem.* 64(22):4606-4617 (2016); Chen et al., "Stability Constants of Polymer-Bound Iminodiacetate-Type Chelating Agents With Some Transition-Metal Ions," *J. Appl. Polym. Sci.* 86(8):1986-1994 (2002), which are hereby incorporated by reference in their entirety). The dissociation behavior of the coating was further investigated by monitoring the C=O stretch region (1800-1520 cm$^{-1}$) after storing the metal chelating film in aqueous solutions of pH values ranging from 1.0 to 12.0 (FIG. 11B). As the pH increased from pH 1.0 to pH 5.0, the absorption band at 1620 cm$^{-1}$ increased as a result of deprotonation of carboxylic acid groups on IDA. The absorption band further shifted from 1620 cm$^{-1}$ to 1570 cm$^{-1}$ as the pH increased from pH 5.0 to pH 12.0, potentially due to further deprotonation of tertiary amine group on IDA. The change in FTIR spectrum in different pH conditions was in agreement with the ligand dissociation behavior studied in (Lin et al., "Synthesis of Iminodiacetate Functionalized Polypropylene Films and Their Efficacy as Antioxidant Active-Packaging Materials," *J. Agric. Food. Chem.* 64(22): 4606-4617 (2016), which is hereby incorporated by reference in its entirety). The ATR-FTIR results suggested successful coating of GMA-IDA-co-BA-co-BPM copolymer on polypropylene with absorbance bands and dissociation behavior typical of immobilized IDA ligands.

Figure 12:
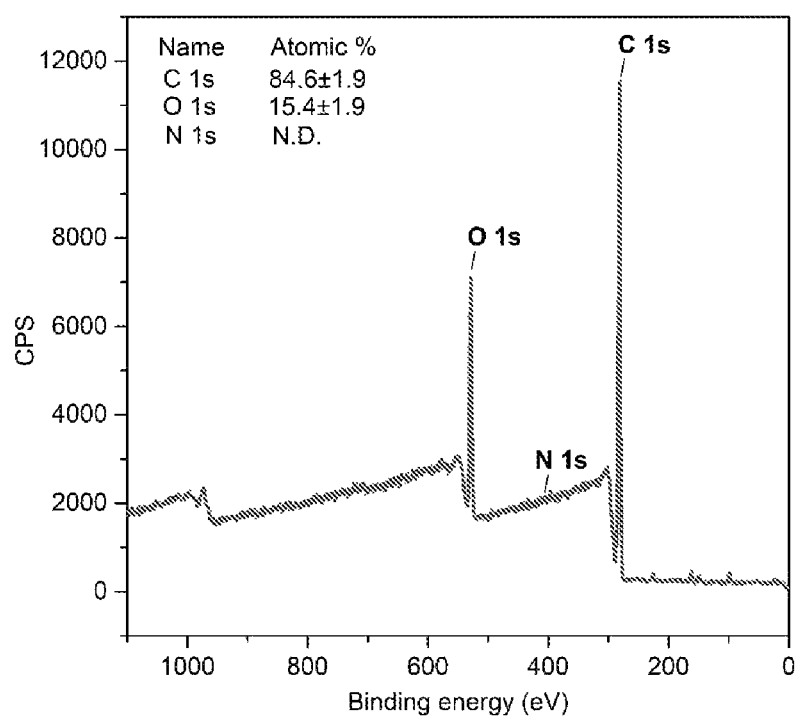
FIG. 12 is a graph showing XPS survey scan of the metal chelating film prepared using the GMA-IDA-co-BA-co-BPM copolymer coating.

The surface chemistry of the metal chelating films was further characterized by analyzing the atomic percentage of the coating surface using XPS (FIG. 12). The surface of the metal chelating film contained 84.6±1.9% of carbon and 15.4±1.9% of oxygen, while the nitrogen content was under the limit of detection. The low nitrogen content on the surface agreed with the low content of IDA moieties (2 mol %) in the copolymer. This analyzed atomic percentage was also in agreement with the theoretical 79% of carbon, 20% of oxygen, and 1% of nitrogen based on the composition of the copolymer coating as determined by NMR and dye assays for functional groups.

Figure 13:
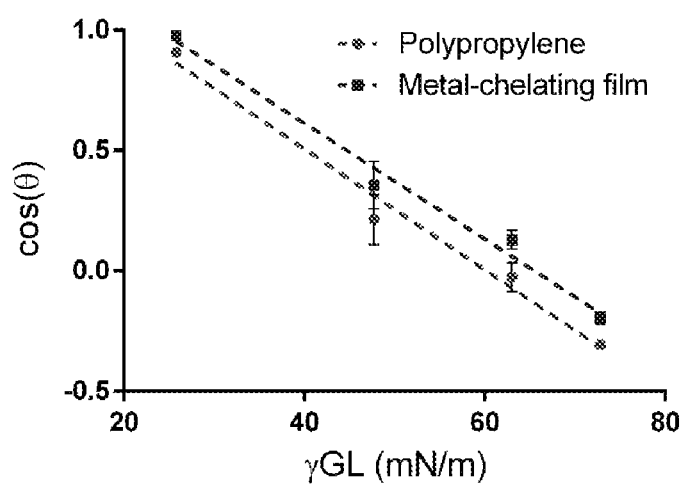
FIG. 13 is a graph showing surface energy measurement using Zisman plot method, with acetone ($\gamma GL$=25.8 mN/m), ethylene glycol ($\gamma GL$=47.7 mN/m), glycerol ($\gamma GL$=63 mN/m), and water ($\gamma GL$=72.8 mN/m) as probe fluids.

The surface wettability and surface energy of the metal chelating film was analyzed using contact angle analysis, with native polypropylene film as control (Table 1). Surface energy was calculated using a Zisman plot method (FIG. 13) (Kabza et al., "Contact Angle Goniometry as a Tool for Surface Tension Measurements of Solids, Using Zisman Plot Method. A Physical Chemistry Experiment," *J Chem. Educ.* 77(1):63 (2000), which is hereby incorporated by reference in its entirety). The native polypropylene surface had an advancing water contact angle and a receding water contact angle of 108.0±1.4° and 82.9±2.1°, respectively, and a surface energy of 20.4 mN/m, in agreement with previous reports (Lin et al., "Photo-Curable Metal-Chelating Coatings Offer a Scalable Approach to Production of Antioxidant Active Packaging," *J. Food Sci.* 83(2):367-376 (2018); Lin et al., "Preparation of Metal Chelating Active Packaging Materials by Laminated Photografting," *J. Coat. Technol. Res.* 13(2):395-404 (2016); Bastarrachea et al., "Antimicrobial Coatings with Dual Cationic and N-Halamine Character: Characterization and Biocidal Efficacy," *J. Agric. Food. Chem.* 63(16):4243-4251 (2015), which are hereby incorporated by reference in their entirety). The metal chelating film had an advancing water contact angle of 102.4±0.30. The high advancing water contact angle was in agreement with the reported hydrophobicity of poly(n-butyl acrylate) based materials (Letey, "Measurement of Contact Angle, Water Drop Penetration Time, and Critical Surface Tension," Proceedings of a Symposium on Water-Repellent Soils, May 6-10, 1968, *University of California, Riverside*, 43-47 (1969), which is hereby incorporated by reference in its entirety). The advancing water contact angle of metal chelating film prepared using the copolymer coating was more hydrophobic than materials prepared by grafting-from techniques in previous studies (Lin et al., "Synthesis of Iminodiacetate Functionalized Polypropylene Films and Their Efficacy as Antioxidant Active-Packaging Materials," *J. Agric. Food. Chem.* 64(22):4606-4617 (2016); Lin et al., "Photo-Curable Metal-Chelating Coatings Offer a Scalable Approach to Production of Antioxidant Active Packaging," *J. Food Sci.* 83(2):367-376 (2018); Lin et al., "Preparation of Metal Chelating Active Packaging Materials by Laminated Photografting," *J. Coat. Technol. Res.* 13(2):395-404 (2016), which are hereby incorporated by reference in their entirety). The metal chelating film had a low receding water contact angle of 19.1±1.6°, and a high hysteresis degree (83.4±1.7°), indicative of strong interactions between the water and the surface (Gao et al., "Wetting 101°†," *Langmuir* 25(24): 14105-14115 (2009), which is hereby incorporated by reference in its entirety). The surface energy of the metal chelating film was determined to be 24.0 mN/m, which was higher than the 20.4 mN/m of uncoated polypropylene, but importantly lower than the 30 mN/m surface energy limit to be considered non-fouling materials (Kota et al., "The Design and Applications of Superomniphobic Surfaces," *NPG Asia Materials* 6(7): e109 (2014), which is hereby incorporated by reference in its entirety). The low surface energy of this coating is important for product release in packaging applications.

TABLE 1

Water Contact Angle and Surface Energy Measurements

| | Adv. Contact angle (θ) | Rec. Contact Angle (θ) | Hysteresis (θ) | Surface energy (mN/m) |
|---|---|---|---|---|
| Polypropylene | 108.0 ± 1.4 | 82.9 ± 2.1 | 25.0 ± 3.2 | 20.4 |
| Metal chelating film | 102.4 ± 0.3 | 19.1 ± 1.6 | 83.4 ± 1.7 | 24.0 |

Figures 14A, 14B, 14C, 14D, 14E, 14F:
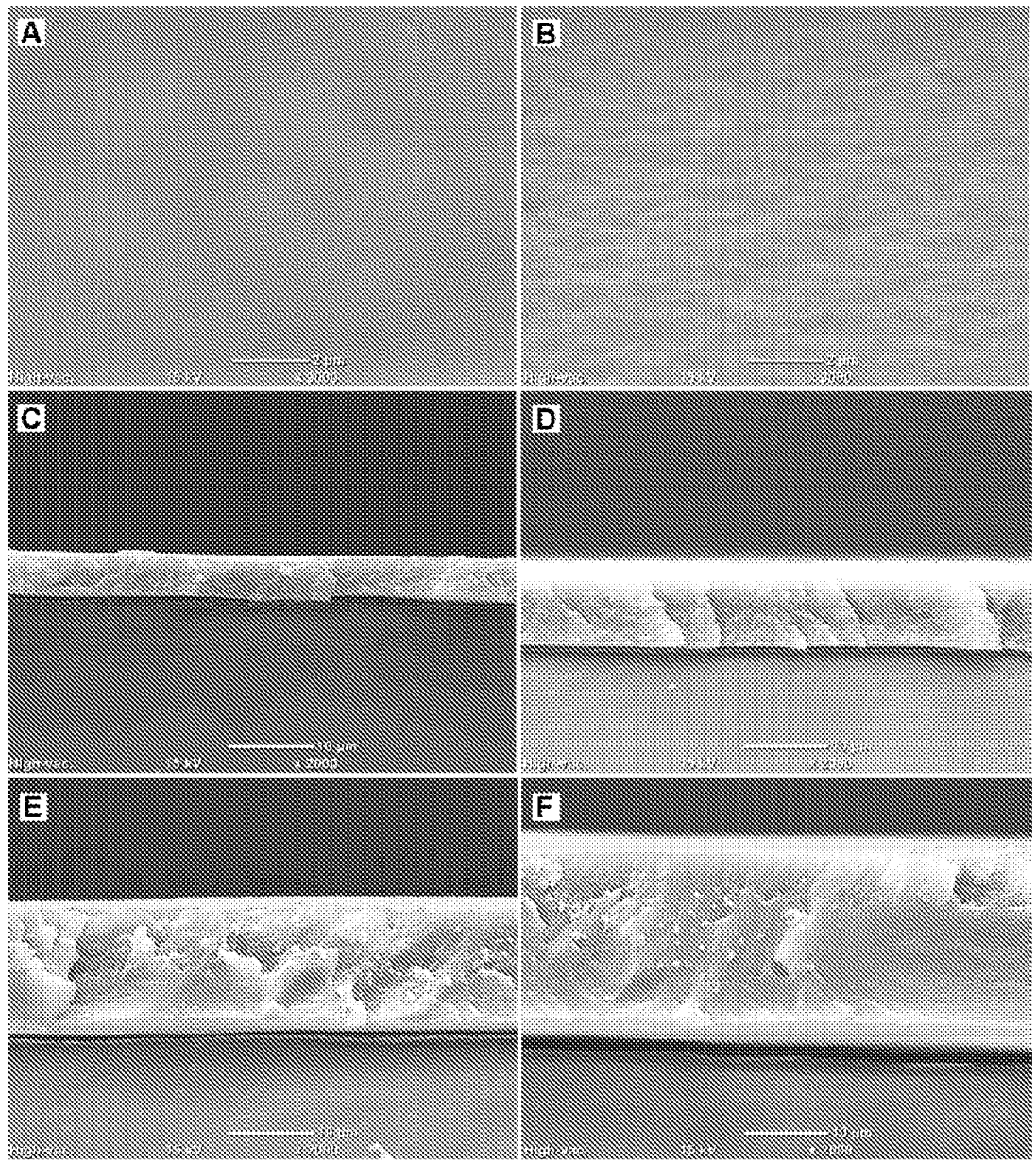
FIGS. 14A-14F are images showing representative surface micrographs of polypropylene (FIG. 14A) and metal chelating film (FIG. 14B); cross-sectional micrographs of metal chelating film prepared using 10 μL/$cm^2$ (FIG. 14C), 20 μL/$cm^2$ (FIG. 14D), 40 μL/$cm^2$ (FIG. 14E), and 80 μL/$cm^2$ (FIG. 14F) of coating.
Figures 15A, 15B:
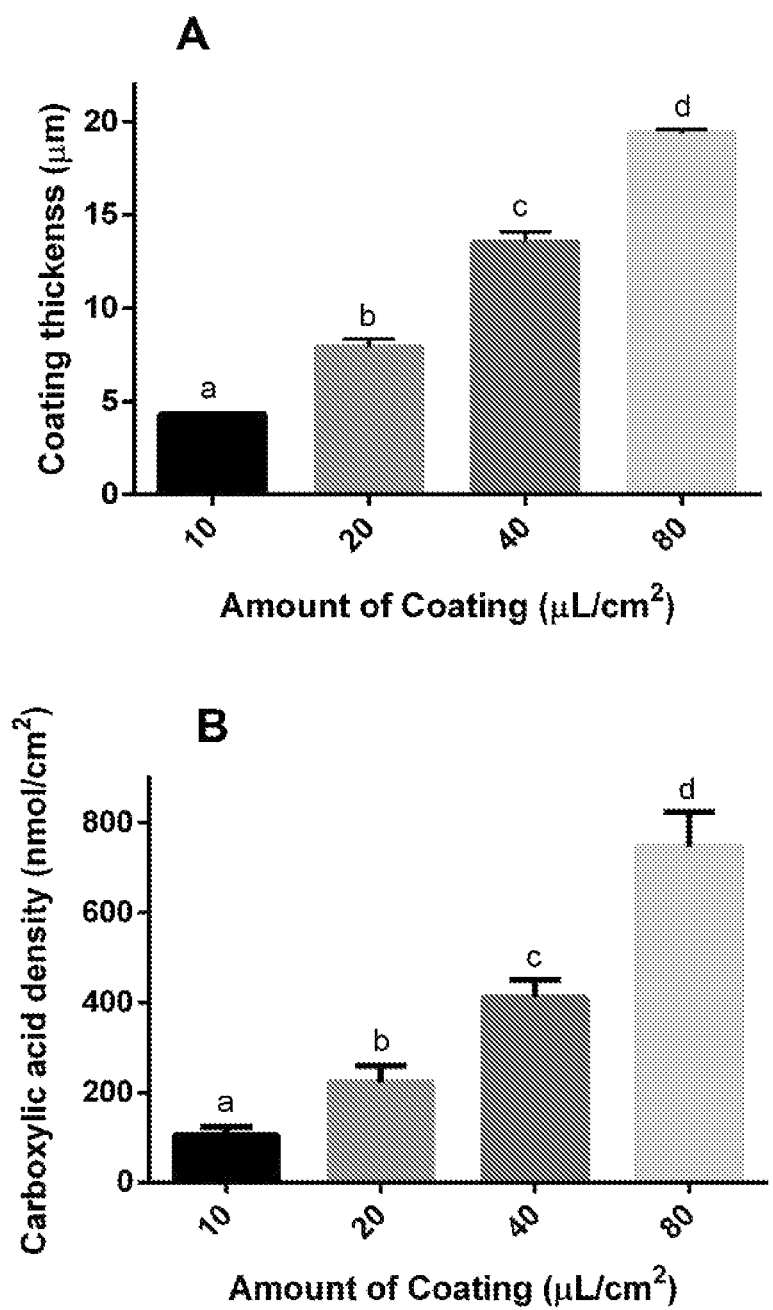
FIGS. 15A-15B are graphs showing the effect of the amount of coating on the coating thickness (FIG. 15A) and carboxylic acid density (FIG. 15B). Means are significantly different (Fisher's least significant difference, P<0.05) if they share different superscript in the same chart.

The surface morphologies of the native polypropylene and metal chelating film were imaged using SEM (FIGS. 14A-14B). Native polypropylene had a relatively smooth surface while the application and curing of the copolymer coating introduced a uniform surface with a slight increase in surface roughness. The cross-section of the copolymer coating was imaged under SEM to observe the thickness of coatings prepared using different amounts of copolymers (FIGS. 14C-14F). The thickness of copolymer coating increased as the amount of coating increased. The effect of the amount of coating on coating thickness was quantified (FIG. 15A). The metal chelating film prepared using 10 μl/cm$^2$ of copolymer coating had a coating thickness of 4.3±0.1 μm, while the thickness increased to 19.4±0.2 μm when 80 μl/cm$^2$ of coating was used. The carboxylic acid density of the metal chelating film with increasing coating thickness was quantified using a TBO dye assay (FIG. 15B). The carboxylic acid density increased as the amount of coating increased. The metal chelating film prepared using 10 μl/cm$^2$ of copolymer coating had a carboxylic acid density of 96.2±6.6 nmol/cm$^2$, and increased to 753.9±91.7 nmol/cm$^2$ when 80 μl/cm$^2$ of coating was used. These results suggest that the IDA ligands were present and available for metal chelation throughout the coating, again supporting the observed high hysteresis value. At a preparation in which 20 μl/cm$^2$ coating was applied to the polypropylene film, the thickness was measured to be 7.9±0.5 μm, with a measured carboxylic acid density of 221.7±37.3 nmol/cm$^2$ carboxylic acids. This density of carboxylic acids is equivalent to approximately 110 nmol/cm$^2$ of IDA ligand. For a half-liter package with approximately 600 cm$^2$, 110 nmol/cm$^2$ available IDA ligands corresponds to approximately 19.4 ppm EDTA (molecular weight 292.2 g/mol), above the minimum concentration of EDTA (0.75 ppm) to give a significant antioxidant effect in emulsified oil systems (Alamed et al., "Influence of Heat Processing and Calcium Ions on the Ability of EDTA to Inhibit Lipid Oxidation in Oil-In-Water Emulsions Containing Omega-3 Fatty Acids," *Food Chem.* 95(4):585-590 (2006), which is hereby incorporated by reference in its entirety). These results suggest that both the coating thickness and resulting chelating capacity can be tailored by application of different amount of copolymer coating, therefore, manufacturers have the ability to control the chelating capacity and antioxidant efficacy for target applications (e.g. active packaging).

Example 15—Metal Chelation

Figures 10A, 10B:
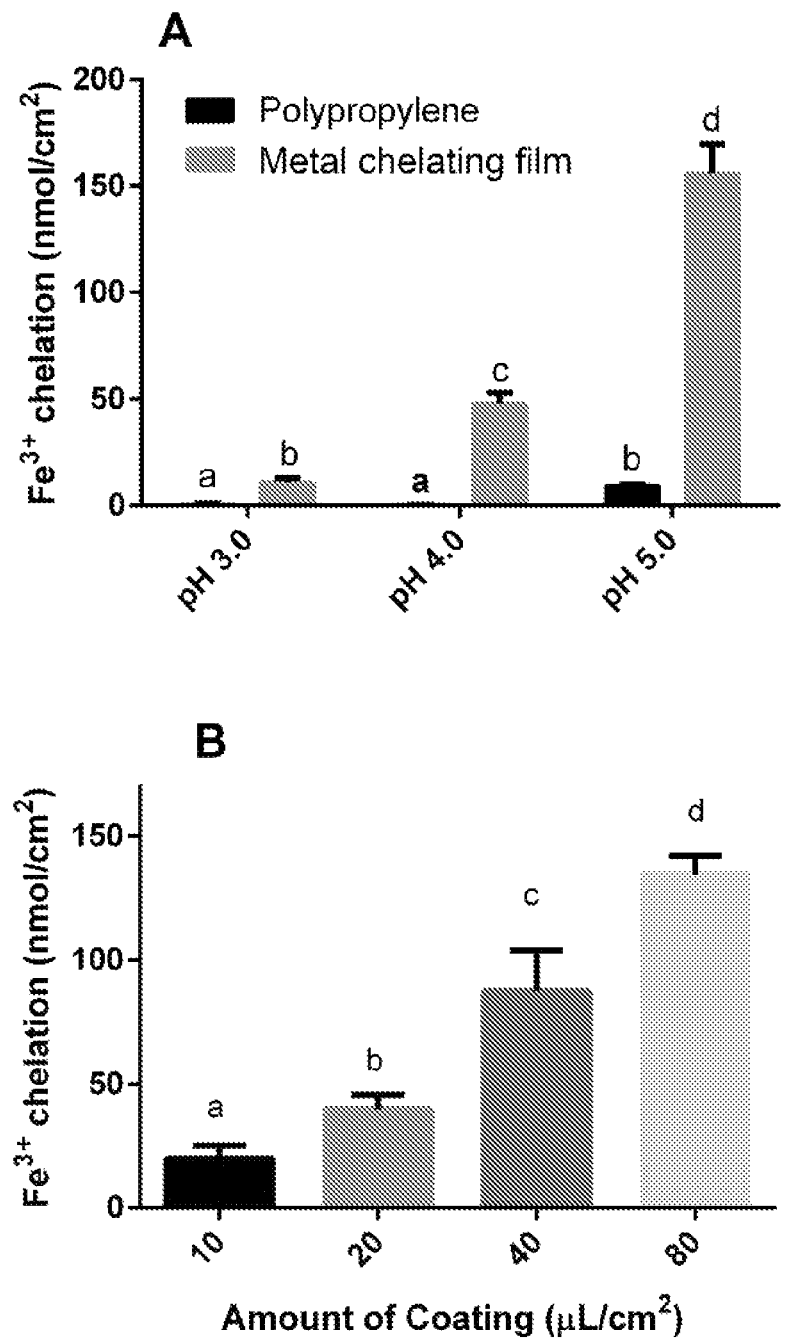
FIGS. 10A-10B are graphs showing the measurement of $Fe^{3+}$ chelating capacity of metal chelating films (prepared using 20 μL/$cm^2$ of coating) in 0.06 mM ferric chloride solutions (pH 3.0-5.0) after 72 hours of storage (FIG. 10A) and the effect of the amount of coating on $Fe^{3+}$ chelation analyzed at pH 4.0 (FIG. 10B). Means are significantly different (Fisher's least significant difference, P<0.05) if they share different superscript in the same chart.

The metal chelating capacity of the film coated by the GMA-IDA-co-BA-co-BPM copolymer emulsion was quantified by storing the materials in 0.06 mM Fe$^{3+}$ buffered solutions (pH 3.0-5.0) for 72 hours. The materials were acid digested and the Fe$^{3+}$ content in the digest was analyzed using ICP-MS (FIG. 10A). Metal chelating films prepared using 20 μL/cm$^2$ of coating had a ferric ion chelating capacity of 10.9±1.9 nmol/cm$^2$, 47.9±5.3 nmol/cm$^2$ and 156.0±13.8 nmol/cm$^2$, at pH 3.0, pH 4.0 and pH 5.0, respectively, with minimal ferric ion chelation by the uncoated polypropylene, suggesting that the observed metal chelation was a result of ligand specific interactions and not precipitation or adsorption. The chelating capacity of the metal chelating film increased with increasing pH value, in agreement with prior studies on the effect of pH on chelating activities of IDA ligands (Yamada et al., "Adsorption and Desorption Properties of the Chelating Membranes Prepared From the PE Films," *J. Appl. Polym. Sci.* 99(4): 1895-1902 (2006); Dinu et al., "Heavy Metals Adsorption on Some Iminodiacetate Chelating Resins as a Function of the Adsorption Parameters," *React. Funct. Polym.* 68(9):1346-1354 (2008); Ling et al., "An Integrative Technique Based on Synergistic Coremoval and Sequential Recovery of Copper and Tetracycline With Dual-Functional Chelating Resin: Roles of Amine and Carboxyl Groups," *ACS Appl. Mater. Interfaces* 5(22): 11808-11817 (2013), which are hereby incorporated by reference in their entirety). The effect of the amount of coating on the metal chelating activity at pH 4.0 was analyzed (FIG. 10B). The amount of Fe$^{3+}$ chelation increased as the amount of coating increased, in agreement with the observed increase in carboxylic density with increasing coating thickness. The metal chelating film prepared using 10 μl/cm$^2$ of coating chelated 19.8±5.2 nmol/cm$^2$ of Fe$^{3+}$, which increased to 134.3±7.7 nmol/cm$^2$ of Fe$^{3+}$ when 80 l/cm$^2$ of coating was applied. These results suggested that the IDA ligands present within the coating interior were able to chelate Fe$^{3+}$, and that the metal chelating capability of the materials can be readily tailored by adjusting the thickness of copolymer coating.

Example 16—Antioxidant Efficacy

Figure 16A:
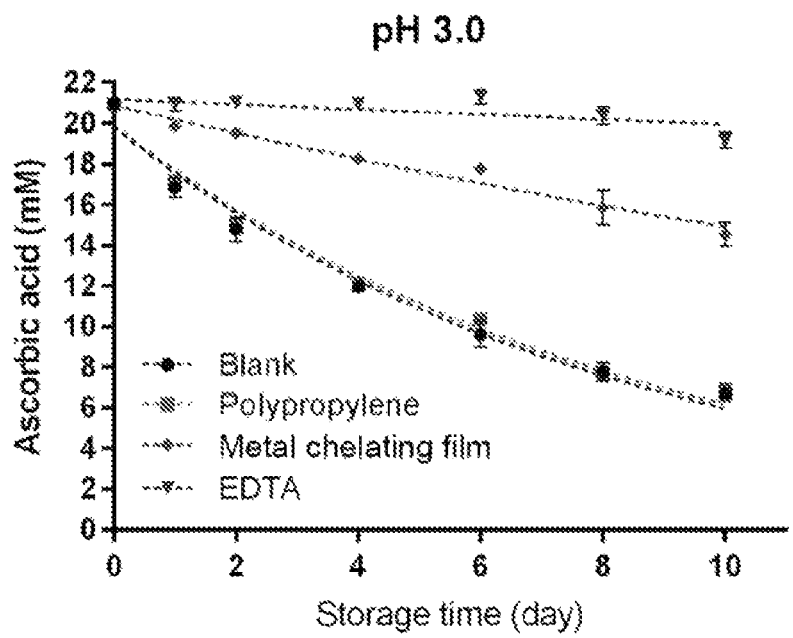
FIGS. 16A-16B are graphs showing control of ascorbic acid degradation using the metal chelating film (prepared using 20 μL/$cm^2$ of coating) at pH 3.0 (FIG. 16A) and pH 5.0 (FIG. 16B) (stored at 37° C.).
Figure 16B:
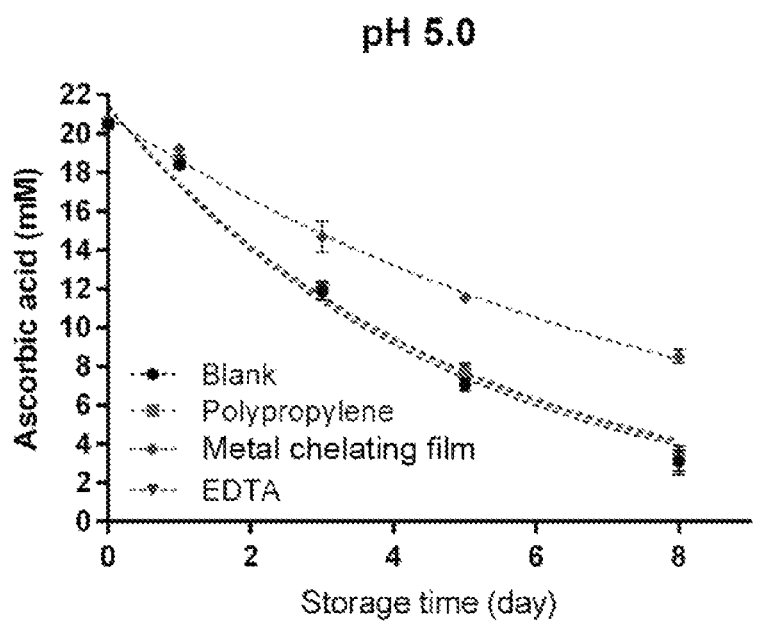

The antioxidant efficacy of the metal chelating film was characterized by analyzing its ability to control ascorbic acid degradation. It has been well established that transition metals promote oxidative degradation of labile components of packaged goods; in food systems, ascorbic acid degradation can occur by metal promoted oxidation of ascorbic acid to dehydroascorbic acid (Bradshaw et al., "Ascorbic Acid: A Review of its Chemistry and Reactivity in Relation to a Wine Environment," *Crit. Rev. Food Sci. Nutr.* 51(6):479-498 (2011), which is hereby incorporated by reference in its entirety). Dehydroascorbic acid is relatively unstable and can undergo further degradation reactions. Previous studies suggested that metal chelating materials controlled ascorbic acid degradation in aqueous solutions by a hypothesized mechanism of scavenging transition metals from the system (Lin et al., "Synthesis of Iminodiacetate Functionalized Polypropylene Films and Their Efficacy as Antioxidant Active-Packaging Materials," *J Agric. Food. Chem.* 64(22): 4606-4617 (2016); Lin et al., "Photo-Curable Metal-Chelating Coatings Offer a Scalable Approach to Production of Antioxidant Active Packaging," *J. Food Sci.* 83(2):367-376 (2018), which are hereby incorporated by reference in their entirety). Metal chelating films prepared by coating and curing the copolymer emulsion described above were stored in ascorbic acid solutions at pH 3.0 and pH 5.0 at 37° C., with blank ascorbic acid solution (no film), ascorbic acid solution with clean polypropylene films, and ascorbic acid solution containing EDTA as controls (FIGS. 16A-16B). Ascorbic acid degradation was observed to follow a first order degradation kinetic in agreement with other reports (Burdurlu et al., "Degradation of Vitamin C in Citrus Juice Concentrates During Storage," *Journal of Food Engineering* 74(2):211-216 (2006), which is hereby incorporated by reference in its entirety); degradation half-life and rate coefficients (Table 2). At pH 3.0, the ascorbic acid in blank and polypropylene treatments degraded the fastest, with a shortest degradation half-life of 6 days. In contrast, introduction of the metal chelating coating slowed ascorbic acid degradation and extended the degradation half-life to 20 days. EDTA was the most effective against ascorbic acid degradation at pH 3.0 and had the highest ascorbic acid retention at the end of the storage period. At pH 5.0, the blank, polypropylene and EDTA treatments showed similar ascorbic acid degradation kinetics with a degradation half-life of around 3 days. The loss in antioxidant efficacy of EDTA against ascorbic acid degradation at slightly acidic pH was in agreement with (Lin et al., "Photo-Curable Metal-Chelating Coatings Offer a Scalable Approach to Production of Antioxidant Active Packaging," *J. Food Sci.* 83(2):367-376 (2018), which is hereby incorporated by reference in its entirety) which suggested that EDTA loses antioxidant efficacy as transition metal solubility increases. The metal chelating films controlled ascorbic acid degradation and improved the degradation half-life to 6 days at pH 3.0. The metal chelating film showed antioxidant efficacy against ascorbic acid degradation at both pH conditions tested, outperforming EDTA at pH 3.0. The results suggested the metal chelating film could potentially serve as an antioxidant active packaging material to control transition metal induced oxidative degradation.

TABLE 2

Half-life, Degradation Rate Coefficient (k) and $R^2$ of Ascorbic Acid Degradation

| pH conditions | Treatments | half-life (day) | k ± S.E. | $R^2$ |
|---|---|---|---|---|
| pH 3.0 | Blank | 5.80 | 0.1196 ± 0.0044 | 0.9744 |
| | Polypropylene | 5.94 | 0.1166 ± 0.0038 | 0.9795 |
| | Metal chelating film | 20.56 | 0.0337 ± 0.0016 | 0.9461 |
| | EDTA | 116.9 | 0.0059 ± 0.0016 | 0.3571 |
| pH 5.0 | Blank | 3.27 | 0.2122 ± 0.0087 | 0.9837 |
| | Polypropylene | 3.42 | 0.2024 ± 0.0077 | 0.9853 |
| | Metal chelating film | 6.06 | 0.1143 ± 0.0034 | 0.9881 |
| | EDTA | 3.36 | 0.2060 ± 0.0089 | 0.9818 |

S.E: standard error.
Each value represents mean ± standard deviation of n = 4 determinations on quadruplicate treatments.

Example 17—Coating Stability Study

Figure 17:
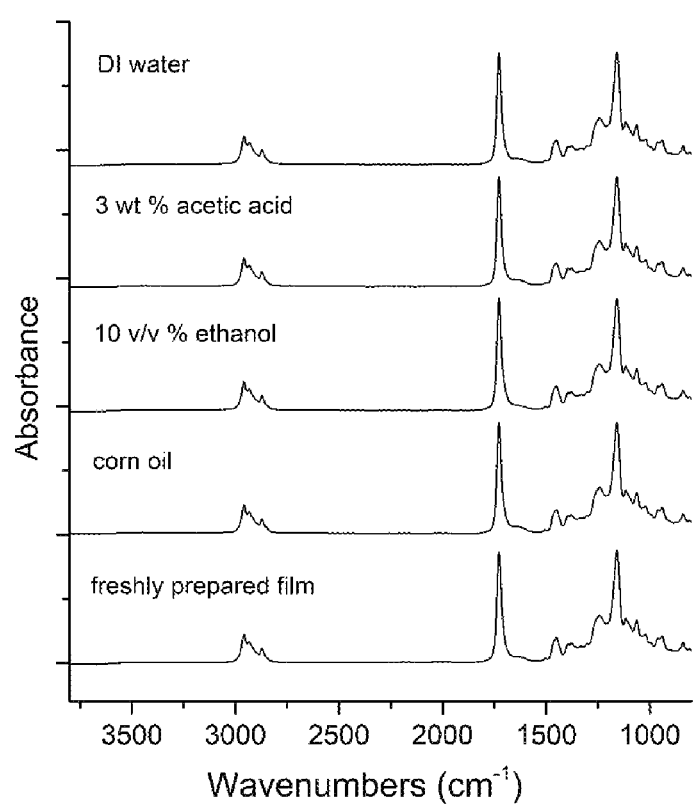
FIG. 17 is a graph showing ATR-FTIR spectra of the metal chelating films after storage in food simulants for 10 days at 40° C., compared to spectra of freshly prepared film. Each spectrum is representative of a total of four spectra collected on quadruplicate samples.
Figures 18A, 18B, 18C, 18D:
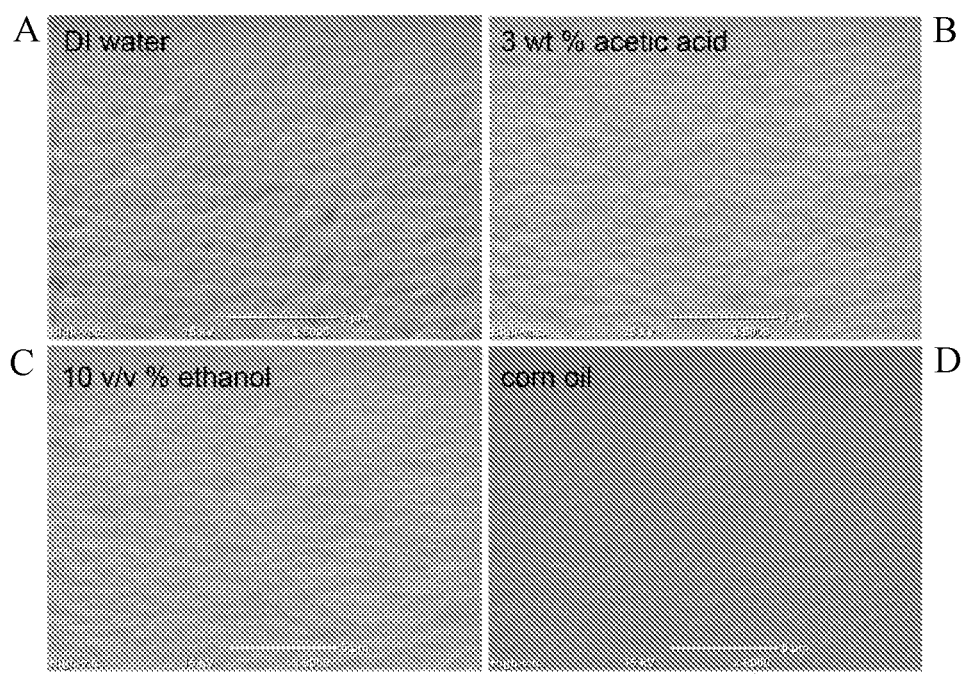
FIGS. 18A-18D show SEM surface micrographs of metal chelating films after storage in food simulants for 10 days at 40° C. Each micrograph is representative of a total of eight spectra acquired at random locations on quadruplicate samples.

To demonstrate the stability of the photocured metal chelating polymer coating on polypropylene against delamination under conditions typical of packaged goods, the metal chelating films were stored in food simulants of water, 3% acetic acid, 10% alcohol, and corn oil, representing aqueous, acidic, alcoholic, and fatty foods, respectively. After 10 days of storage at 40° C., surface chemistry and morphology were analyzed and compared to that of freshly coated and cured films to assess potential change in surface chemistry and delamination of the coating. Representative ATR-FTIR spectra and SEM micrographs are shown in FIGS. 17, 18A-18D. The metal chelating films stored in water, 10% alcohol, and corn oil had similar ATR-FTIR spectra as freshly prepared metal chelating materials (FIG. 17). Metal chelating film stored in 3% acetic acid had a slight decrease in the absorption band at 1650 cm$^{-1}$, which is characteristic for IDA functionalized materials in acidic environment due to protonation of IDA, and not indicative of delamination or hydrolysis (FIGS. 11A-B). The ATR-FTIR analysis showed no change in surface chemistry, suggesting the chemical stability of the metal chelating film after prolonged exposure to a range of conditions typical of food, beverage, and packaged consumer product systems. Scanning electron micrographs showed no signs of delamination or flaking, suggesting the physical stability of the metal chelating film (FIGS. 18A-18D). These coating stability studies suggest that the metal chelating films were stable against delamination or decomposition after prolonged exposure to acidic, alcoholic, or fatty systems.

Example 18—Terpolymer Presenting Photocurable, Low Surface Energy, and Epoxy Functionality Epoxy functionalized surfaces enabled tethering of bioactive compounds via facile ring opening reactions. Epoxy functionalized surfaces were prepared using photocurable epoxy copolymer coatings. The copolymers contained glycidyl methacrylate (GMA) moieties to provide epoxy groups and benzophenone moieties as photocrosslinker. The copolymer coatings were photocured onto plastic substrates and photocured coatings were further modified via ring opening reactions to tether bioactive groups. Herein, the tethering of iminodiacetic acid (IDA) groups to prepare metal chelating surfaces was demonstrated.

Figures 19A, 19B:
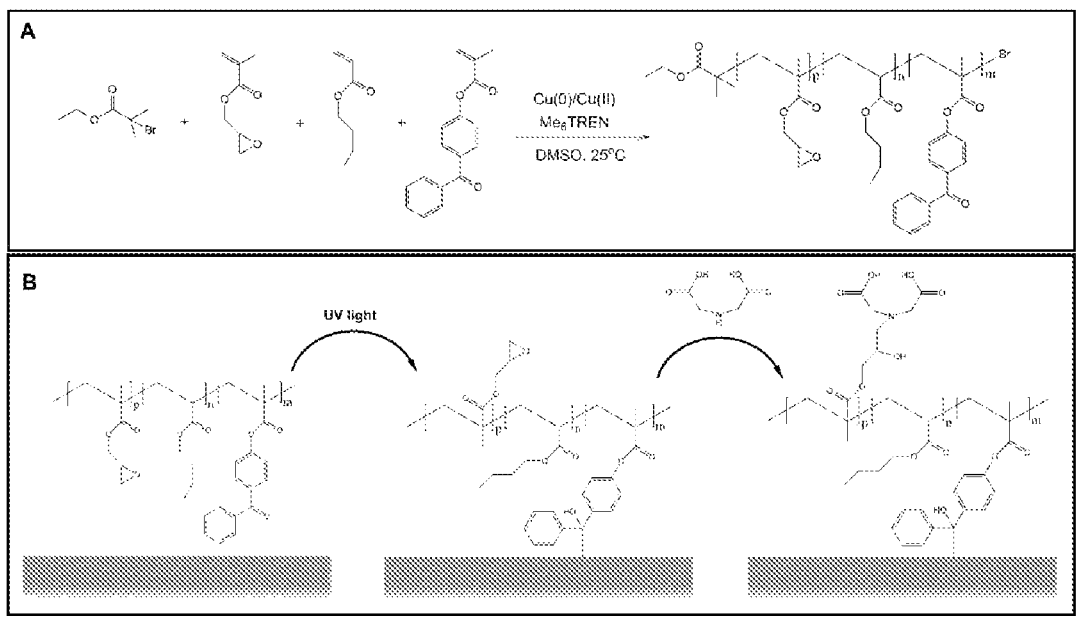
FIGS. 19A-19B show synthesis of poly(glycidyl methacrylate-co-butyl acrylate-co-4-benzoylphenyl methacrylate) (GBB) copolymer via single electron transfer-living radical polymerization (SET-LRP) (FIG. 19A) and schematic preparation of IDA functionalized surface (FIG. 19B).

Example 19—Poly(glycidyl methacrylate-co-butyl acrylate-co-4-benzoyphenyl methacrylate) (GBB) Copolymer Synthesis The poly(glycidyl methacrylate-co-butyl acrylate-co-4-benzoyphenyl methacrylate) (GBB) copolymer was synthesized via single-electron transfer living radical polymerization (SET-LRP) (FIG. 19A). Briefly, glycidyl methacrylate (GMA) (2.50 mmol to 8.50 mmol), butyl acrylate (BA) (0 mmol to 6.00 mmol), 4-benzoyphenyl methacrylate (BPM) (1.50 mmol) were dissolved in 3 mL of DMSO in a Schlenk tube. Aliquots of tris[2-(dimethylamino)ethyl]amine (Me$_6$TREN) (4.81 µL, 18 µmol), ethyl α-bromoisobutyrate (EBiB) (14.66 µL, 100 µmol), and copper bromide (2.23 mg, 10 µmol) were added as catalysts. The mixture was degassed using nitrogen gas for 30 min. A copper wire was then added into the mixture under nitrogen protection. The mixture was allowed to polymerize at 25° C. for 18 hours in dark and was then precipitated in methanol. The polymer was cleaned in methanol 2 times and was dried in a fume hood for 48 hours. Nuclear Magnetic Resonance (NMR) spectra of the copolymers were collected in DMSO-d6 in a Varian INOVA-400 spectrometer (Palo Alto, Calif.). Gel permeation chromatography (GPC) analysis was conducted in a Waters GPC system (Milford, Mass.).

Example 20—Surface Functionalization

The photocurable epoxy functionalized GBB copolymers were coated onto PP films by spin coating followed by UV-curing (FIG. 19B). Briefly, GBB copolymers were dissolved in THF at a concentration of 50 mg/mL. An aliquot of 1 mL copolymer in THF was casted onto PP film (5×5 cm$^2$) by spin coating (30 s at 100 rpm, 30 s at 200 rpm, 30 s at 500 rpm, and 30 s at 1000 rpm). The coated films were exposed to UV-light (365 nm, 225 mW/cm$^2$ flux) for 180 s to cure the coatings. The photocrosslinking reaction of benzophenone moieties was monitored by following absorption spectrum at 270-290 nm (Asioli et al., "Making Sense of the "Clean Label" Trends: A Review of Consumer Food Choice Behavior and Discussion of Industry Implications," *Food Res. Int.* 99:58-71 (2017); Tian et al., "Control of Lipid Oxidation by Nonmigratory Active Packaging Films Prepared by Photoinitiated Graft Polymerization," *J Agric. Food. Chem.* 60(31):7710-7718 (2012), which are hereby incorporated by reference in their entirety) during the photocuring process (0-240 s UV-exposure time) using a Synergy Neo2 Hybrid Multi-Mode Reader (BioTek Instruments, Winooski, Vt.). In a glass reactor equipped with a condenser and an overhead mixer, the GBB coated films were submerged in 0.45 M IDA in DMSO/water (1:1 v/v) solution to tether the IDA ligands. The reaction continued for 18 hours at 80° C. with vigorous stirring. The resulting IDA functionalized films (GBB-IDA) were rinsed in DI water and dried in a desiccator until further analysis.

Figure 20:
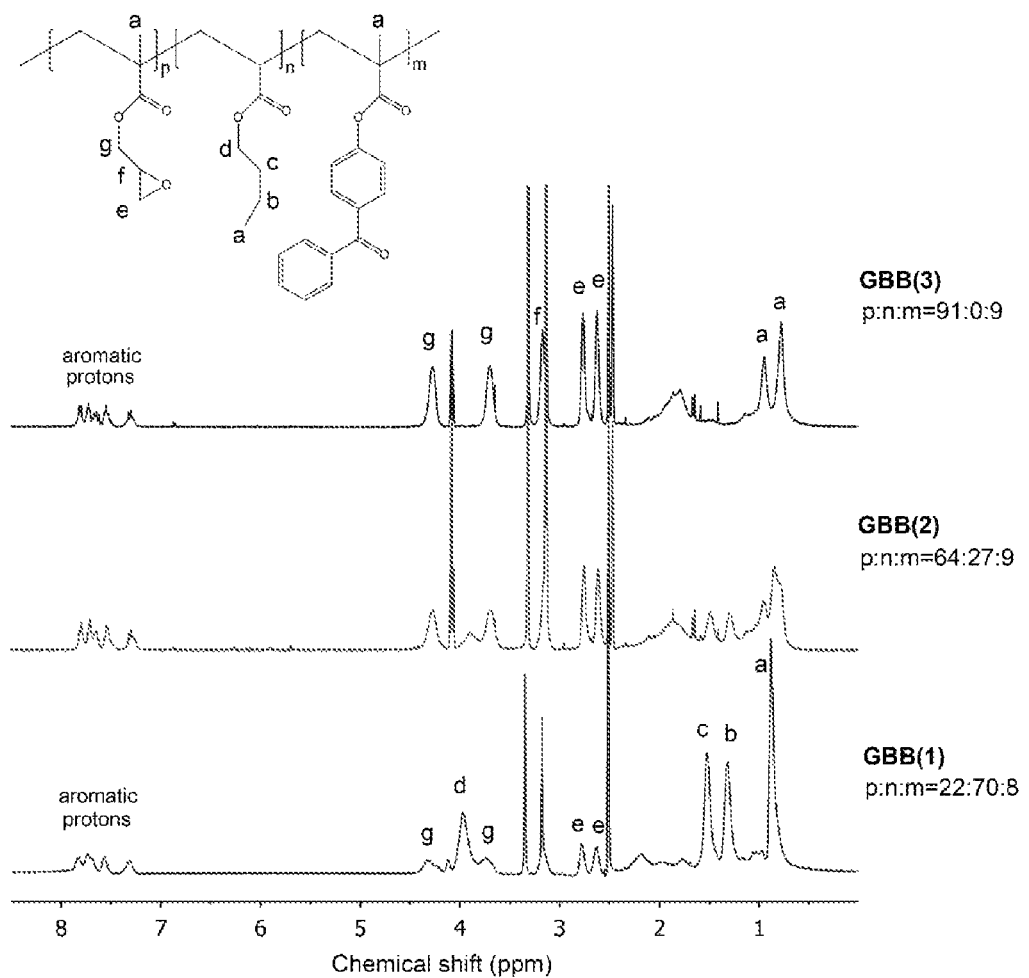
FIG. 20 shows a proton NMR spectra of GBB copolymers with varying glycidyl methacrylate: butyl acrylate ratios collected in DMSO-$d_6$ (400 MHz).

The photocurable epoxy functionalized copolymer, poly (glycidyl methacrylate-co-butyl acrylate-co-4-benzoyphenyl methacrylate) (GBB) was synthesized by SET-LRP polymerization (FIG. 19A). GMA contains epoxy group and serves as site for tethering of bioactive compounds through ring opening reactions. BPM contains benzophenone, which works as a photocrosslinker and enables photocuring. GBB polymers of varying content of epoxy groups were synthesized by adjusting the content of GMA and BA polymer chemistry. Proton NMR spectra of GBB copolymers were collected in DMSO-d6 (FIG. 20, Table 3). Chemical shifts at 0.76 ppm, 0.94 ppm were assigned to protons on the methyl groups on GMA, BA, and BPM. Chemical shifts at 1.31 ppm, 1.52 ppm, 3.96 ppm were assigned to BA moieties. Chemical shifts at 2.61 ppm, 2.77 ppm, 3.69 ppm, 4.26 ppm were assigned to GMA moieties. The chemical shifts at 7.31 ppm to 7.83 ppm were assigned to the aromatic protons on the BPM moieties. The composition of each GBB copolymer was determined using the integrated peak area under 2.61 ppm and 2.77 ppm (e), 1.31 ppm and 1.52 ppm (b and c), and the aromatic protons. GBB(1) contained 22 mol % of GMA, 70 mol % of BA, and 8 mol % of BPM. GBB(2) contained 64 mol % of GMA, 27 mol % of BA and 9 mol % of BPM. GBB(3) contained 91 mol % of GMA and 9 mol % of BPM. All the GBB copolymers had weight average molecular weight (Mw) at 16 kDa to 18 kDa and had a relatively low polydispersity index of around 1.2.

TABLE 3

Weight Average Molecular Weight (Mw) and Polydispersity Index (PDI) of Copolymers

|        | Mw (kDa)      | PDI           |
|--------|---------------|---------------|
| GBB(1) | 18.1 ± 0.1    | 1.17 ± 0.01   |
| GBB(2) | 16.0 ± 0.2    | 1.27 ± 0.00   |
| GBB(3) | 17.0 ± 0.3    | 1.21 ± 0.01   |

Figure 21:
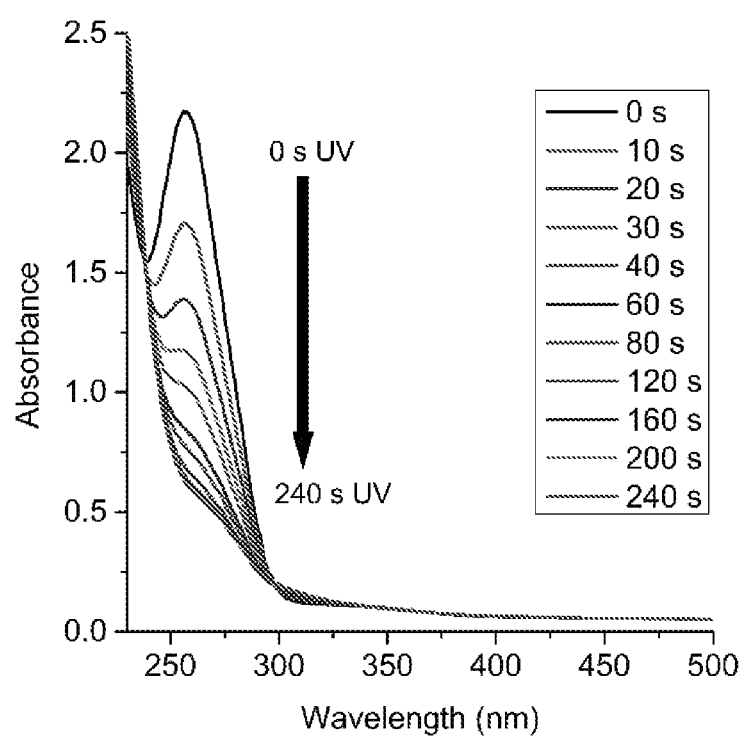
FIG. 21 is a graph showing representative benzophenone absorption spectra of a copolymer coating during UV curing process (collected using GBB(1) copolymer coating).

The photocuring capability of the GBB copolymer was analyzed by monitoring the absorption spectrum at 270-290 nm, which decreases in intensity with increased crosslinking of benzophenone (Asioli et al., "Making Sense of the "Clean Label" Trends: A Review of Consumer Food Choice Behavior and Discussion of Industry Implications," *Food Res. Int.* 99:58-71 (2017); Tian et al., "Control of Lipid Oxidation by Nonmigratory Active Packaging Films Prepared by Photoinitiated Graft Polymerization," *J. Agric. Food. Chem.* 60(31):7710-7718 (2012), which are hereby incorporated by reference in their entirety). The uncured coating had a strong absorption maximum at 270 nm. As the coating was exposed to UV-light (365 nm, 225 mW/cm$^2$), the absorption band at 270 nm decreased (FIG. 21), suggesting successful benzophenone crosslinking. The mechanism of this crosslinking reaction was explained by Dorman et al., "Benzophenone Photophores in Biochemistry," *Biochemistry* 33(19):5661-5673 (1994), which is hereby incorporated by reference in its entirety. As benzophenone absorbs photons at 365 nm, the carbonyl group is induced to a biradical triplet state, which abstracts a hydrogen from a neighboring C—H bond and forms two free radicals. The two free radicals then form a new C—C bond and create a crosslink. Since alkyl groups (C—H bonds) were abundant on the surface of polypropylene and on the vinyl copolymer, the benzophenone moieties were hypothesized to crosslink to the surface of polypropylene substrate and within the polymer coating, making the coating stable against delamination from the polypropylene after photocuring.

Figures 22A, 22B:
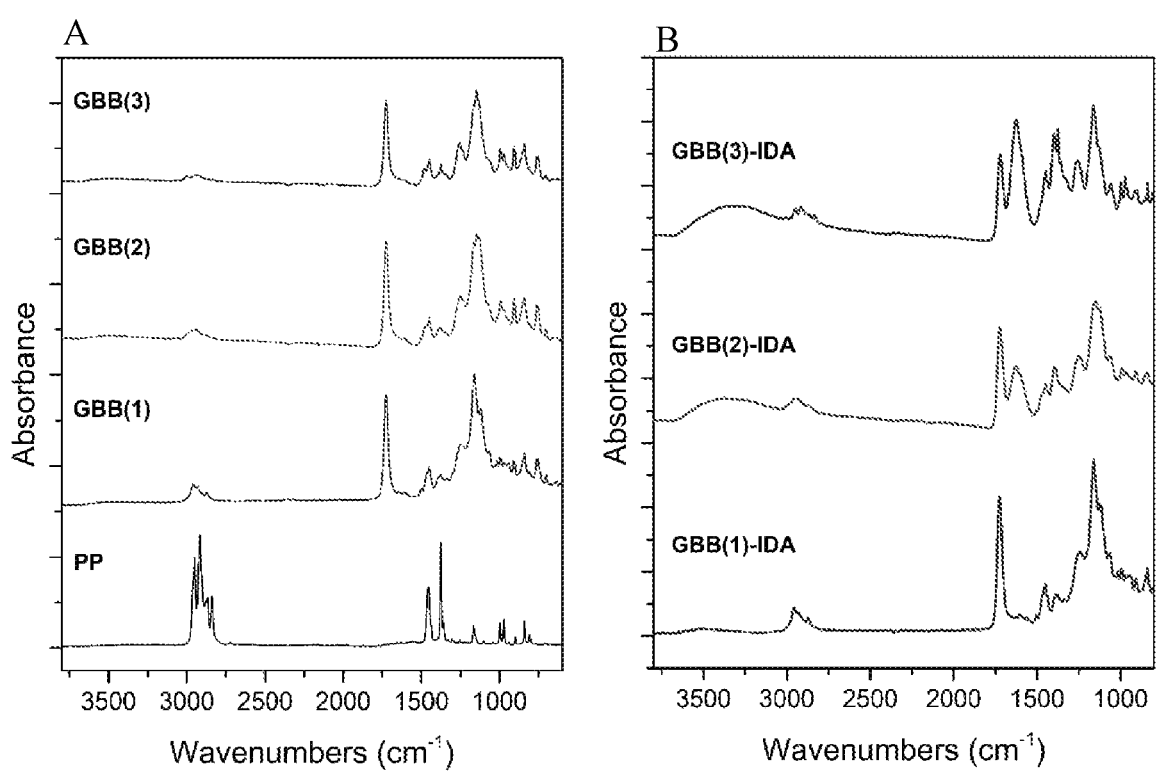
FIGS. 22A-22B show an FTIR spectra of copolymer coatings on polypropylene (PP) surfaces before (FIG. 22A) and after (FIG. 22B) IDA tethering.
Figures 23A, 23B, 23C, 23D, 23E, 23F:
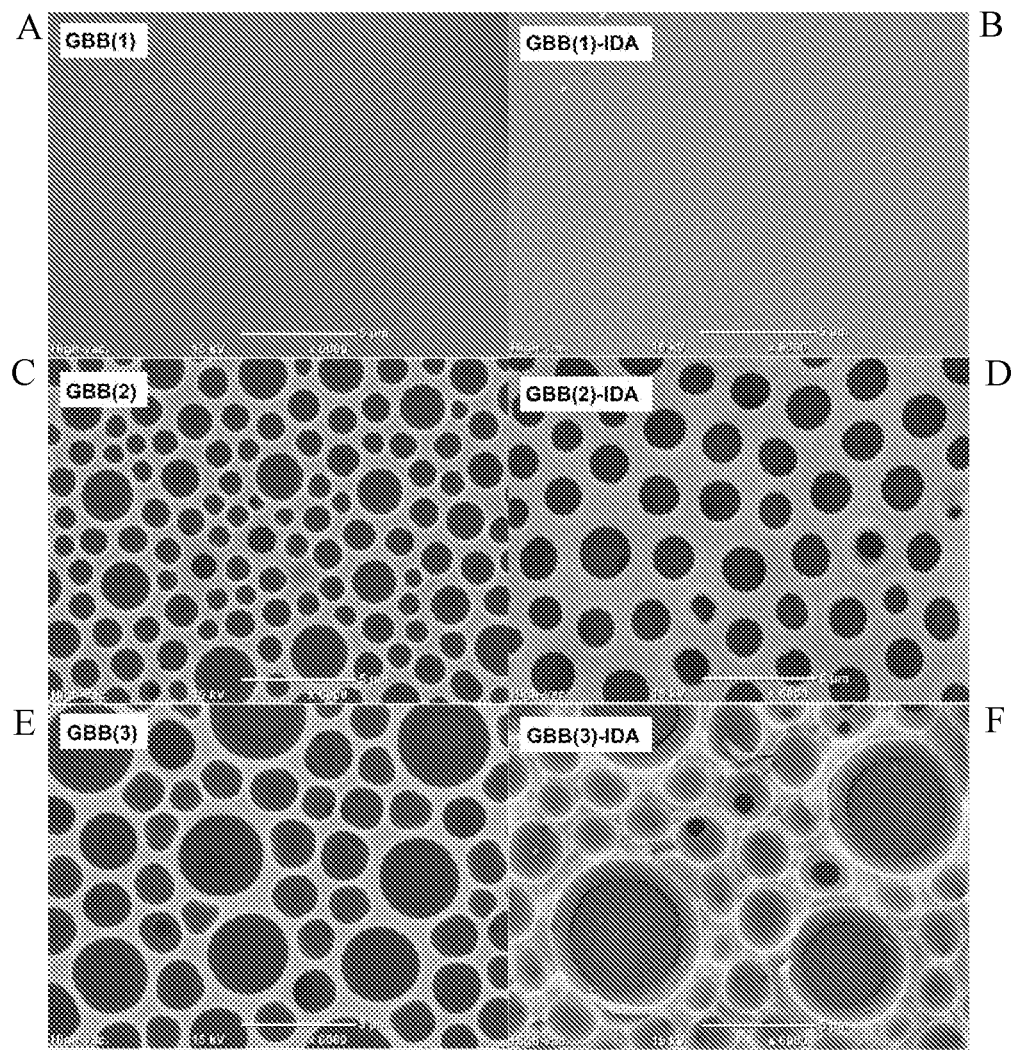
FIGS. 23A-23F show SEM micrographs of modified and unmodified copolymer coatings.

The surface chemistry of the materials characterized using ATR-FTIR spectroscopy (FIGS. 22A-22B). Polypropylene had characteristic absorption bands at 3000-2800 cm$^{-1}$ (C—H stretch), and at 1450 cm$^{-1}$ and 1370 cm$^{-1}$ (C—H bend). GBB coated films absorption bands at 3000-2800 cm$^{-1}$ (C—H stretch), a strong absorption band at 1710 cm$^{-1}$ (C=O stretch), and absorption bands at 1260-1160 cm$^{-1}$ (C—O—C stretch). These absorption bands are characteristic for poly(n-butyl acrylate) and poly(glycidyl methacrylate) based materials. The IDA functionalized GBB coatings had an increase in absorption bands at 3600-3200 cm-1 (O—H stretch) and 1620 cm$^{-1}$ (C=O stretch), both of which were characteristic for IDA functionalized surfaces. As the epoxy content increased, the intensity of both absorption bands increased, suggesting the amount of IDA tethered was dependent on the amount of epoxy groups. The ATR-FTIR results suggested successful coating of GBB copolymer on polypropylene and successful tethering of IDA ligands.

The surface wettability of the materials was analyzed using dynamic water contact angle analysis (Table 4). Native PP film had an advancing water contact angles of 105.20±2.7. GBB(1) had a similar water contact of 93.20±3.5, while GBB(2) and GBB(3) had higher water contact angles than native PP. However, the GBB coated materials had lower receding water contact angles compared to native polypropylene, suggesting high interaction between the water and the GBB coated surfaces. After tethering the IDA ligands via ring opening reactions, the GBB(1) and GBB(3) had a decrease in advancing water contact angles. The GBB(2)-IDA had the same water advancing water contact angle as GBB(2).

TABLE 4

Water Contact Angle Measurements of Modified and Unmodified Copolymer Coatings

|            | Adv. Angle (°)   | Rec. angle (°)  | Hysteresis (°)  |
|------------|------------------|-----------------|-----------------|
| PP         | 105.2 ± 2.7 e    | 85.7 ± 3.4 d    | 19.5 ± 6.0 a    |
| GBB(1)     | 93.2 ± 3.5 e     | 60.0 ± 3.3 c    | 33.2 ± 1.6 b    |
| GBB(2)     | 115.1 ± 4.0 f    | 32.5 ± 4.2 b    | 82.7 ± 7.9 de   |
| GBB(3)     | 126.9 ± 7.6 f    | 28.8 ± 1.7 b    | 98.2 ± 9.2 e    |
| GBB(1)-IDA | 83.4 ± 1.3 bc    | 18.9 ± 1.3 a    | 64.4 ± 2.0 d    |
| GBB(2)-IDA | 97.1 ± 9.5 cdef  | 16.6 ± 0.4 a    | 80.5 ± 9.2 cde  |
| GBB(3)-IDA | 64.8 ± 5.0 ab    | 16.9 ± 1.0a     | 47.9 ± 4.3 c    |

Means are significantly different (Tukey, $p<0.05$) if they share different letters in the same column.

Both GBB(1) and GBB(1)-IDA had smooth surfaces (FIGS. 23A-F). GBB(2) and GBB(3) had porous surfaces. The high porosity of the GBB(2) and GBB(3) might contribute to the high advancing water contact angles, as demonstrated in Table 4. The high porosity might also provide more surface area for ligand tethering. The IDA functionalized GBB(2)-IDA and GBB(3)-IDA surfaces were had similar pores as the GBB coated materials, but the modified surfaces seemed more like hydrogels.

Figure 24:
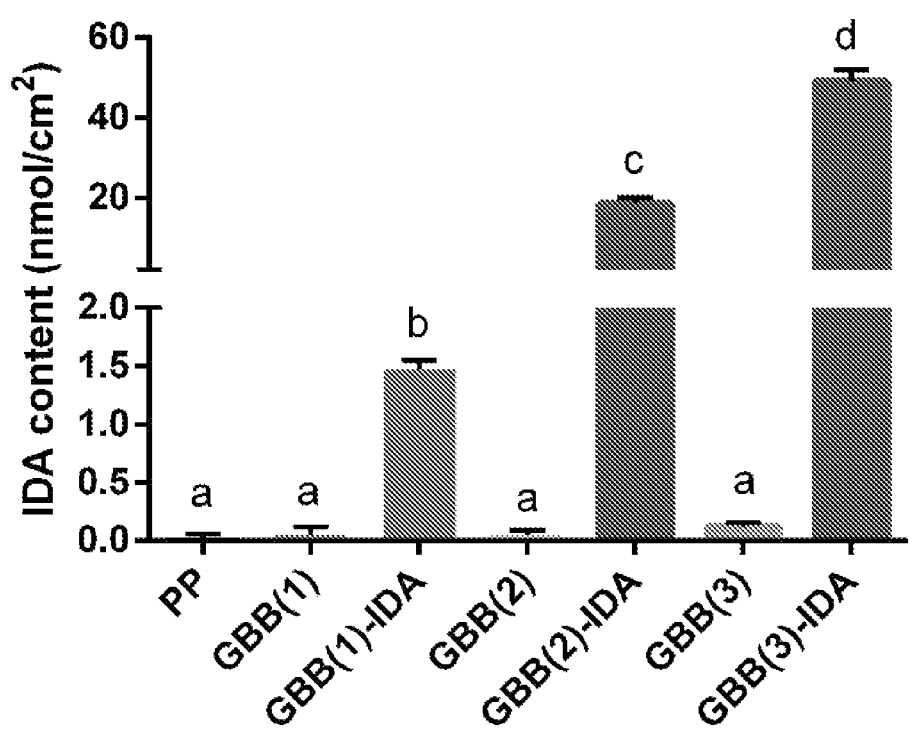
FIG. 24 is a graph showing an IDA content of modified and unmodified copolymer coatings. Means are significantly different (Tukey, p<0.05) if they share different letters in the same graph.

The IDA content of the materials were quantified using TBO dye assay, assuming 2:1 binding of the TBO dye and the IDA ligands (FIG. 24). The unmodified GBB coatings did not contain IDA ligand and had the same IDA content as native PP film. The IDA modified GBB coatings had higher IDA content than the corresponding unmodified GBB coatings. The IDA functionalized materials had IDA content of 1.47±0.08 nmol/cm$^2$, 18.67±1.46 nmol/cm$^2$, and 49.05±2.88 nmol/cm$^2$ for GBB(1)-IDA, GBB(2)-IDA, and GBB(3)-IDA, respectively. The amount of the IDA content increased as the epoxy content in the GBB coating increased.

Figure 25:
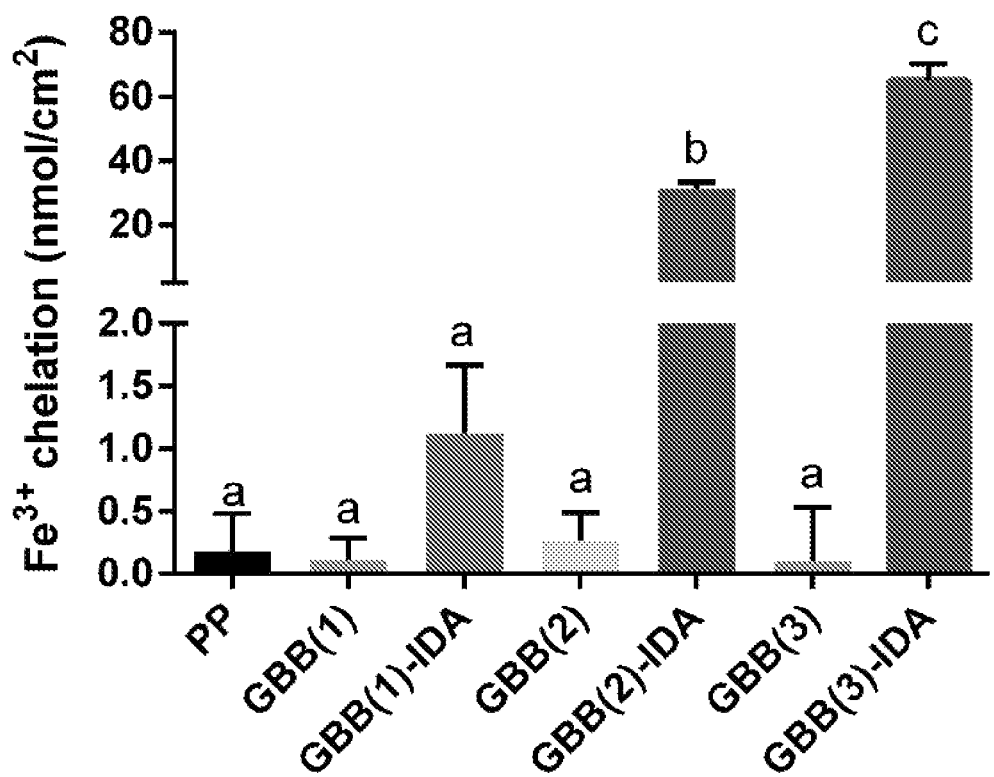
FIG. 25 is a graph showing $Fe^{3+}$ chelating activity at pH 4.0 of modified and unmodified copolymer coatings. Means are significantly different (Tukey, p<0.05) if they share different letters in the same graph.
Figure 26:
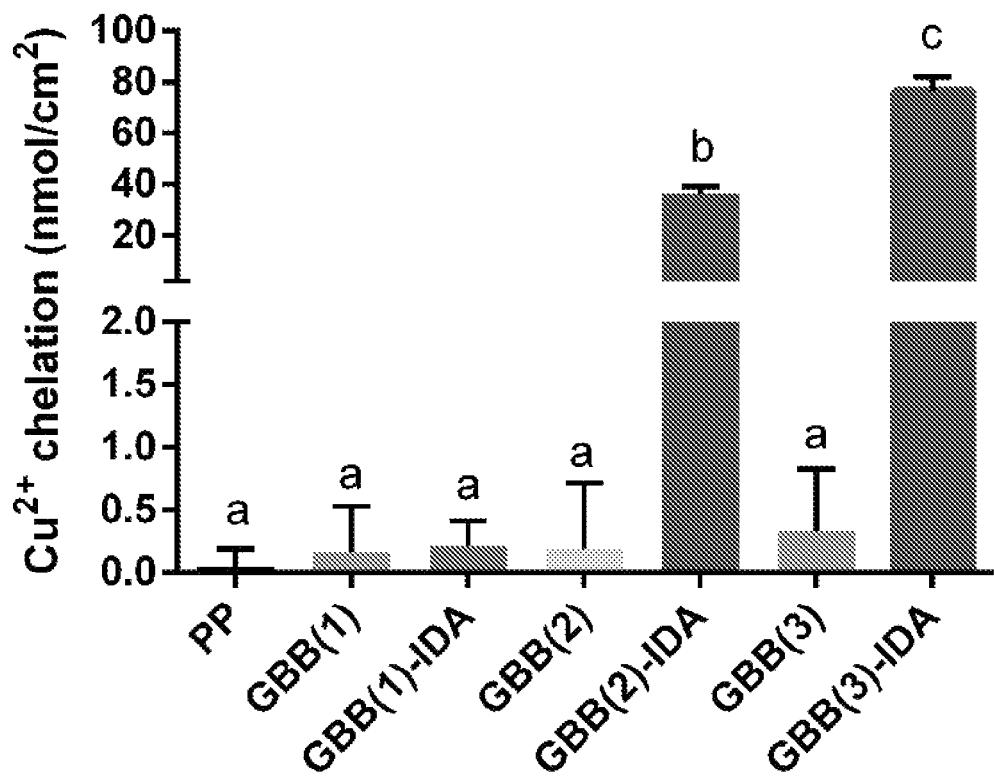
FIG. 26 is a graph showing $Cu^{2+}$ chelating activity at pH 4.0 of modified and unmodified copolymer coatings. Means are significantly different (Tukey, p<0.05) if they share different letters in the same graph.

The chelating activity of the materials towards chelating Fe$^{3+}$ and Cu$^{2+}$ were analyzed at pH 4.0 (FIGS. 25-26). The unmodified GBB coatings had no metal chelating activity towards Fe$^{3+}$ or Cu$^{2+}$, and had the same chelating activity with native PP film. Although GBB(1)-IDA had higher IDA content than GBB(1), GBB(1)-IDA did not chelate either Fe$^{3+}$ or Cu$^{2+}$ at pH 4.0. GBB(2)-IDA chelated 31.2±2.2 nmol/cm$^2$ of Fe$^{3+}$ and 36.5±2.5 nmol/cm$^2$ of Cu$^{2+}$, respectively. GBB(3)-IDA chelated 65.0±5.2 nmol/cm$^2$ of Fe$^{3+}$ and 76.5 nmol/cm$^2$ of Cu$^{2+}$, respectively.

Figure 27:
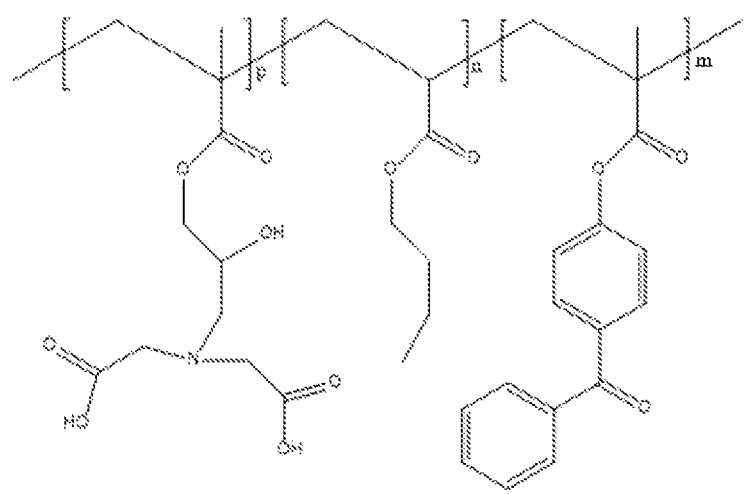
FIG. 27 shows the structure of poly(2-propenoic acid,2-methyl-,3-[bis-(carboxymethyl) amino]-2-hydroxypropyl ester-co-n-butyl acrylate-co-4-benzoylphenyl methacrylate) (GMA-IDA-co-BA-co-BPM) copolymer.

Example 21—Performance of Photo-Curable Metal-Chelating Coating in Complex Food Matrices The complex nature of many biological systems (food, wastewater, consumer packaged goods, serum) can influence performance of biologically functional materials. As such, in this set of experiments we sought to demonstrate the performance of one example of functional surface using a GMA-IDA-co-BA-co-BPM copolymer coating (FIG. 27), under a range of complex conditions, including variable pH value, presence of competing ions, and viscosity up to that of a soft gel. Both the retention of chelating capacity and efficacy of these materials in delaying oxidative degradation reactions under these complex conditions were characterized.

Figure 28:
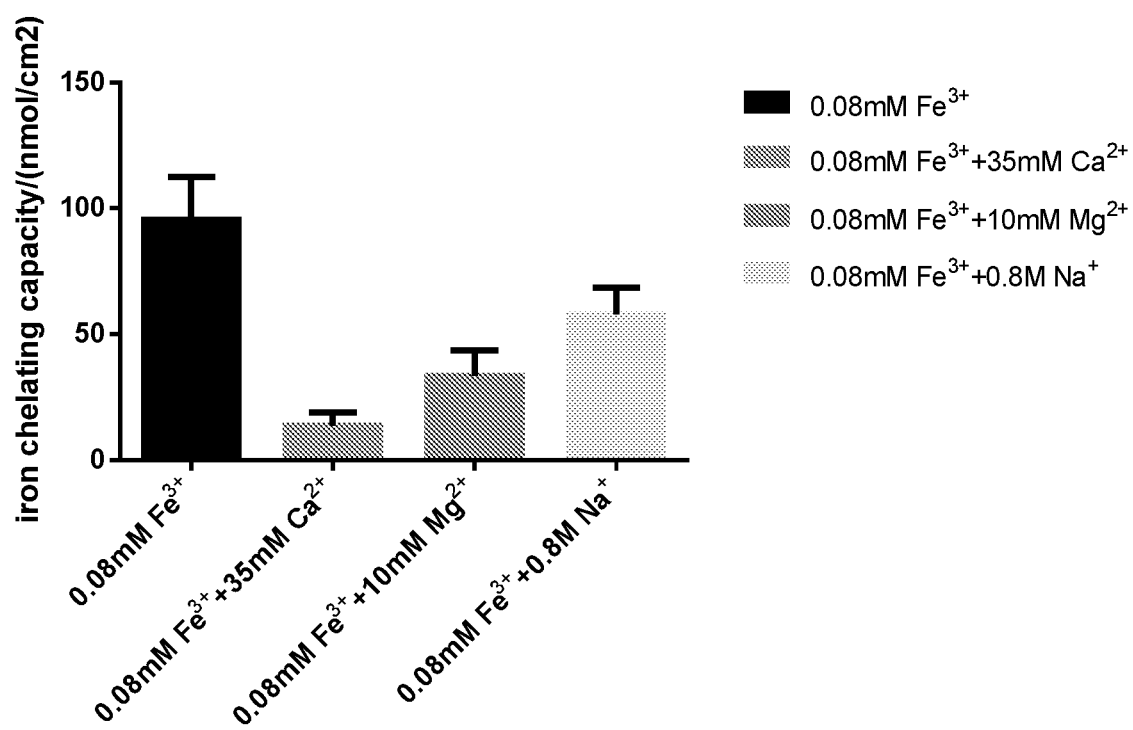
FIG. 28 is a graph showing that competing ions have variable influence on retention of chelating properties.

35 mM calcium, 10 mM magnesium, and 0.8 M sodium were chosen as typical concentrations of these ions in milk, hard water, and salad dressing, respectively. Under these conditions, calcium had the greatest influence on chelating capacity (FIG. 28). While magnesium and sodium both reduced the chelating capacity of the materials, they nevertheless retained sufficient iron chelating capacity compared to prior studies.

Figure 29:
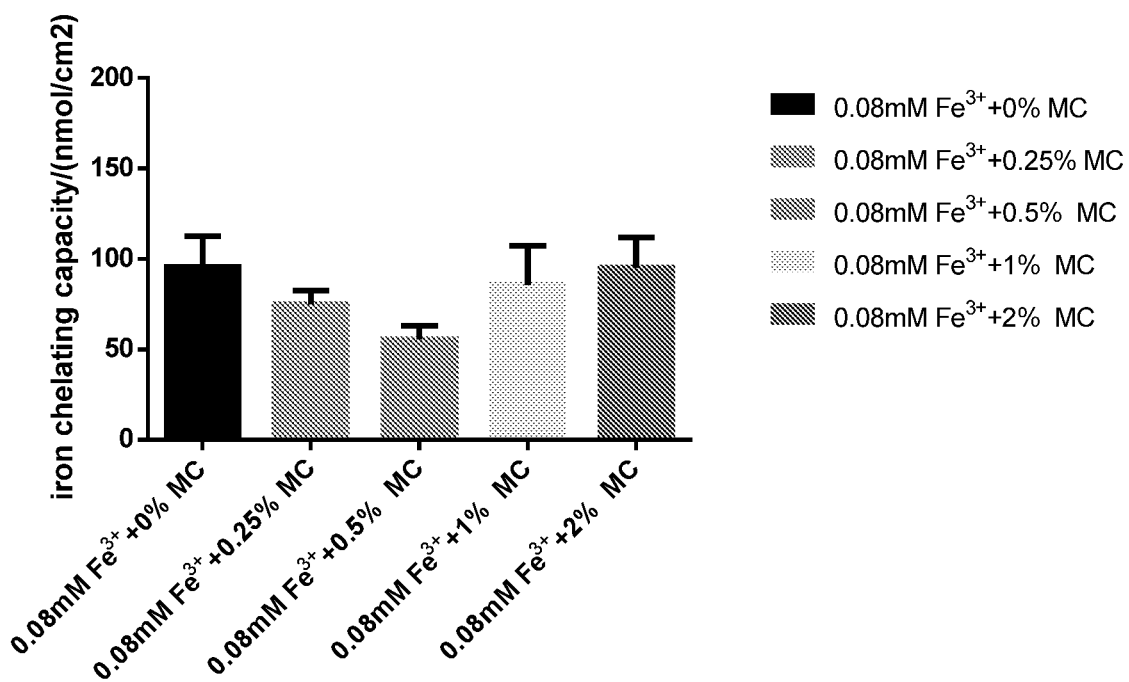
FIG. 29 is a graph showing that chelating films retain efficacy in solutions with viscosities up to 2700 cP, similar to that of a soft gel.

Methylcellulose (MC) was used to modulate the viscosity of the solution (FIG. 29). It was determined that even at viscosities up to 2700 cP (corresponding to 2% MC), the materials retained the ability to effectively chelate metal ions. This observation is significant, as it supports the performance of these materials even in viscous conditions typical of many consumer products (sauces, lotions, salad dressings, etc).

Figure 30:
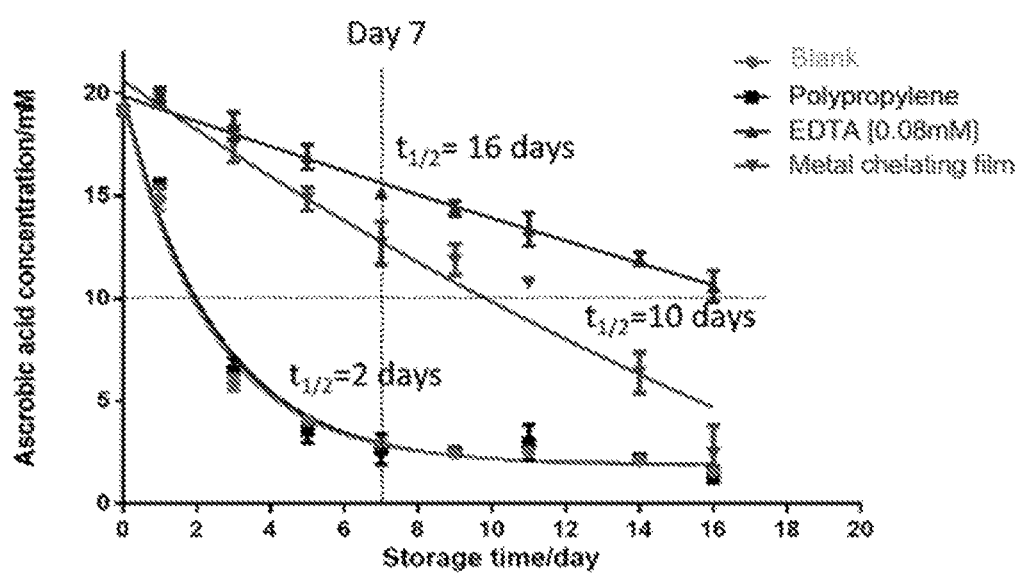
FIG. 30 is a graph showing that chelating materials control ascorbic acid degradation.

Metal chelating materials were incubated with buffered solutions (pH 4.0) containing ascorbic acid, under accelerated conditions (37° C.). Ascorbic acid contents were monitored over 16 days using a colorimetric assay. It was determined that while solutions containing the synthetic chelator ethylene diamine tetraacetic acid performed optimally (16 day half life), the metal chelating films preserved ascorbic acid well, (10 day half life), a significant improvement over the ascorbic acid retention under control (blank, polypropylene control) conditions, in which the half life was only 2 days (FIG. 30).

Figure 31:
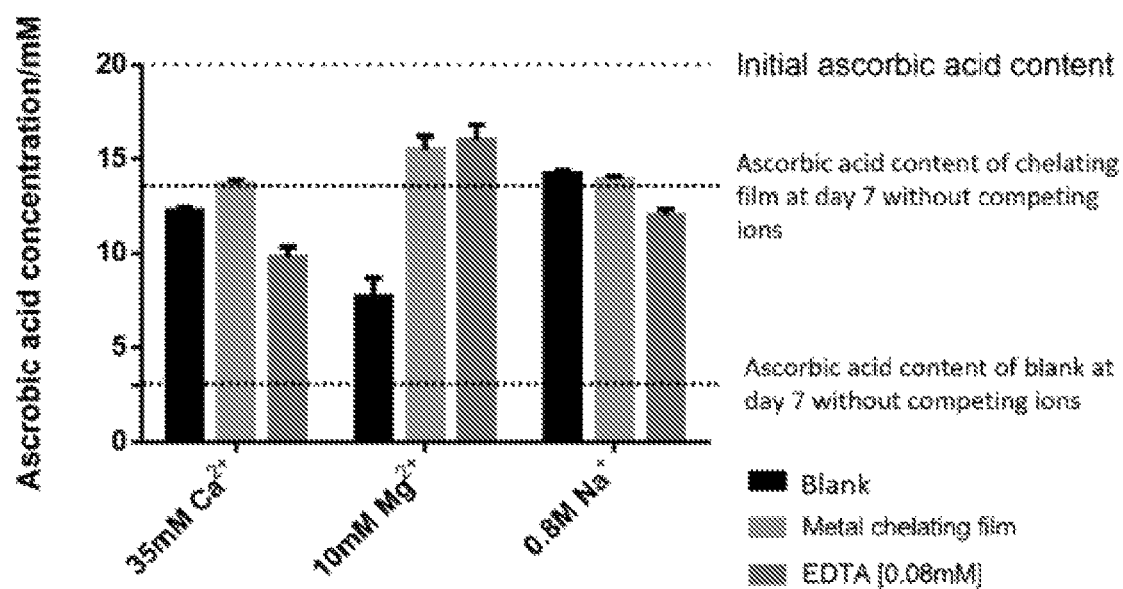
FIG. 31 is a graph showing that high concentrations of calcium and sodium protect ascorbic acid against degradation.

Initial experiments to characterize the performance of metal chelating films under conditions of competing ions revealed that even in the absence of the metal chelating film, elevated concentrations of calcium and sodium had an apparent protective effect, in which ascorbic acid did not degrade under kinetics observed in the absence of these ions (FIG. 31). Magnesium had less of a protective effect, and the performance of the chelating film was similar to that of EDTA in preserving ascorbic acid against oxidative degradation. On the basis of these results, the influence of competing ion concentration on performance of metal chelating films was further explored.

Figure 32:
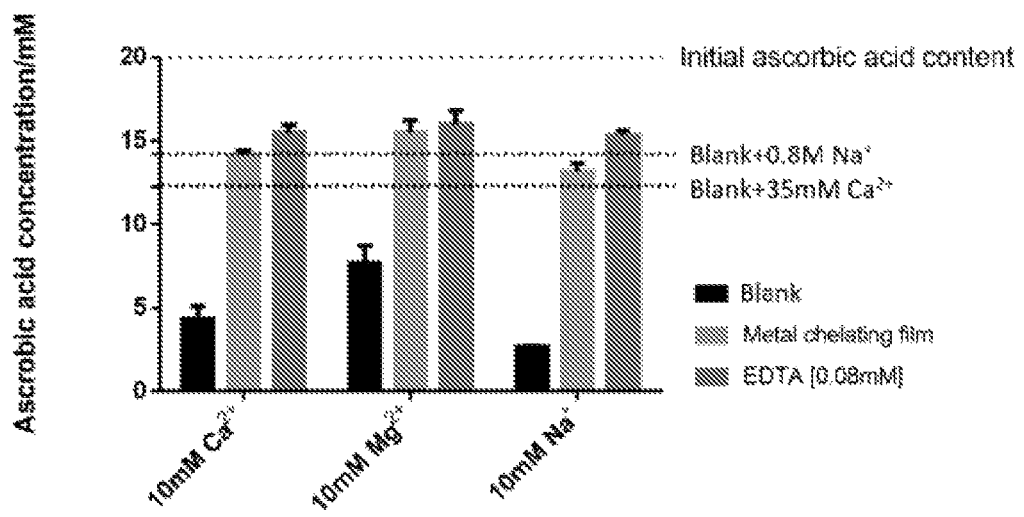
FIG. 32 is a graph showing that chelating films retain antioxidant efficacy under conditions of 10 mM competing ions.

At 10 mM concentration, calcium and sodium no longer exhibit a preservative effect towards ascorbic acid, displaying degradation kinetics observed under conditions of buffer alone (without competing ions) (FIG. 32). It was demonstrated that metal chelating films retain ability to not only chelate iron ions, but also to protect ascorbic acid against metal ion promoted oxidative degradation.

Figure 33:
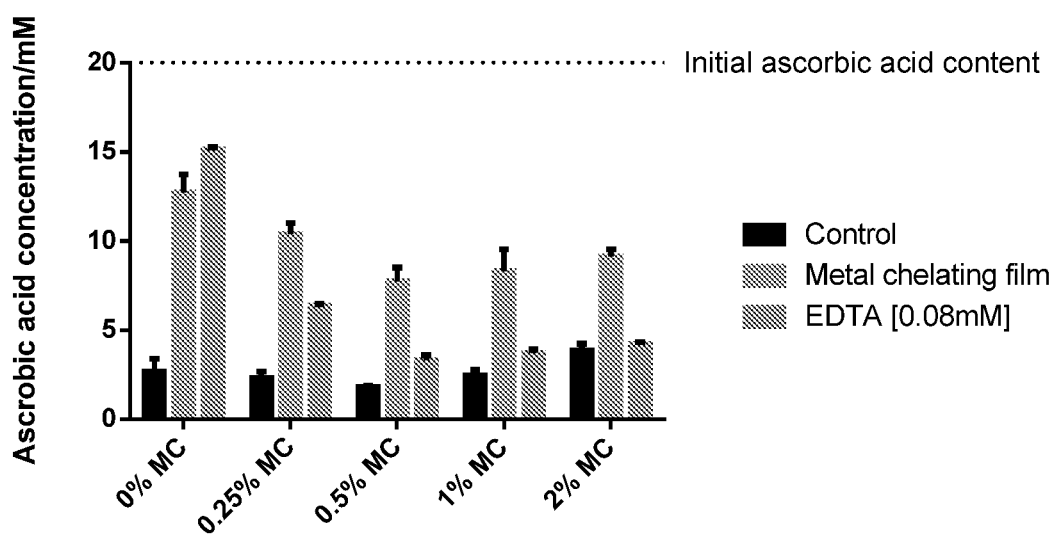
FIG. 33 is a graph showing that chelating films retain antioxidant efficacy at viscosities up to 2700 cP.

Prior experiments demonstrated that even under conditions of increasing viscosity up to 2% methylcellulose (corresponding to 2700 cP), metal chelating materials were capable of chelating iron ions. It was important to demonstrate whether that chelating capacity translated to effective control over oxidative degradation, using ascorbic acid degradation as a model system. These results demonstrate that while the materials perform optimally under aqueous, low viscosity conditions, they continue to effectively control ascorbic acid degradation at higher viscosity conditions. At conditions of 0.25% MC to 2.0% MC, the materials outperform the antioxidant effect of soluble EDTA (FIG. 33).

Example 22—Conclusion

A method to synthesize a GMA-IDA-co-BA-co-BPM copolymer via emulsion polymerization was described, which can be applied onto polymer films by a simple coat/cure preparation to produce metal chelating materials with antioxidant character. The IDA chelating moieties were capable of chelating transition metal ions, with chelating capacity tunable by coating thickness. The benzophenone moieties enabled rapid photocuring, resulting in a robust, uniformly applied coating. The integration of poly(n-butyl acrylate) permitted a final coating with surface energy values sufficiently low to be considered low fouling and suitable for product release, an important parameter in active packaging applications. Despite the low surface energy and the high hydrophobicity, the high contact angle hysteresis suggested sufficient interaction of IDA ligands, which was supported by the efficacy of the materials in both chelating ferric ions and inhibiting transition metal induced ascorbic acid degradation. The photocured coating on polypropylene was stable both chemically and physically after exposure to fatty, alcoholic, acidic, and aqueous product simulants, supporting its stability in active packaging applications. The photocurable polymer coatings, as reported in the present application, enables scalable production of active materials with metal chelating functionality. The copolymer coating can potentially be applied onto plastic films and bottles via industrially scalable coat/cure processes for the manufacture of metal chelating active packaging.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:
1. A curable polymer comprising:
    one or more base acrylic repeating units (─┤A├─);
    one or more repeating units with a chelating moiety or an antioxidant moiety (─┤B├─); and
    one or more repeating units containing a cross-linker (─┤C├─), wherein

—⁅A⁆— is —⁅R₃⁆—;

—⁅B⁆— is

[structure: acrylate unit with R₁, ester O-R₂]

—⁅C⁆— is

[structure: acrylate unit with R₄, ester O-R₅]

$R_1$ is H or $CH_3$;

$R_2$ is a chelating moiety or an antioxidant moiety;

$R_3$ is a repeating unit of a base acrylic monomer in a polymerized form;

$R_4$ is H or $CH_3$; and $R_5$ is a group containing cross-linking moiety, wherein the one or more of —⁅A⁆—, —⁅B⁆—, and —⁅C⁆— are linked together in any order.

2. The curable polymer according to claim 1, wherein the polymer is photo-curable.

3. The curable polymer according to claim 1 further comprising:

a structural filler mixed with —⁅A⁆—, —⁅B⁆—, and —⁅C⁆—.

4. The curable polymer according to claim 3 further comprising:

a bioactive moiety, wherein the structural filler is connected to and positioned between the bioactive moiety and the polymer.

5. The curable polymer according to claim 1, having the Formula (Ia):

[structure of Formula (Ia) with repeating units p, n, m, substituents $R_1$, $R_3$, $R_4$, $R_5$, $R_7$]

(Ia)

wherein p is 1 or more;

n is 1 or more;

m is 1 or more; and wherein p+m+n is 20 or more.

6. The curable polymer according to claim 1, wherein $R_2$ is selected from the group consisting of

[three structures shown: an iminodiacetic acid-type moiety with CH₂-OH, a caffeic acid ester type moiety, and a hydantoin-type moiety with CH₂-OH]

and wherein * is a point of attachment of $R_2$ to the polymer of Formula (Ia).

7. The curable polymer according to claim 1, wherein $R_3$ is selected from the group consisting of

[five structures: methyl acrylate, (CH₂)x-CH₃ acrylate, (CH₂)x-OH acrylate, (CH₂)x-O-CH₃ acrylate, and styrene]

wherein * is a point of attachment of $R_3$ to the polymer of Formula (Ia).

8. The curable polymer according to claim 1, wherein $R_5$ is a group containing a type II photo-initiator.

9. The curable polymer according to claim 1, wherein $R_5$ is selected from the group consisting of benzophenone, benzophenone derivative, anthraquinone, anthraquinone derivative, aryl azide, and aryl azide derivative.

10. The curable polymer according to claim 1, wherein the curable polymer has the Formula:

wherein
p is 1 or more;
n is 1 or more;
m is 1 or more; and
wherein p+m+n is 20 or more.

11. The curable polymer according to claim 1, wherein the curable polymer has the Formula:

wherein
p is 1 or more;
n is 1 or more;
m is 1 or more; and
wherein p+m+n is 20 or more.

12. A composition comprising the curable polymer according to claim 1.

13. A method of making a curable polymer coating on a solid support comprising:
providing a solid support;
providing a composition comprising a curable polymer, wherein the curable polymer comprises:
one or more base acrylic repeating units ($-\!\!+\!\!A\!\!+\!\!-$);
one or more repeating units with a chelating moiety or an antioxidant moiety ($-\!\!+\!\!B\!\!+\!\!-$); and
one or more repeating units containing a cross-linker ($-\!\!+\!\!C\!\!+\!\!-$),
wherein
$-\!\!+\!\!A\!\!+\!\!-$ is $-\!\!+\!\!R_3\!\!+\!\!-$;
$-\!\!+\!\!B\!\!+\!\!-$ is $-\!\!+\!\!C\!\!+\!\!-$ is $R_1$ is H or $CH_3$;
$R_2$ is a chelating moiety or an antioxidant moiety;
$R_3$ is a repeating unit of a base acrylic monomer in a polymerized form;
$R_4$ is H or $CH_3$; and
$R_5$ is a group containing cross-linking moiety,
wherein the one or more of $-\!\!+\!\!A\!\!+\!\!-$, $-\!\!+\!\!B\!\!+\!\!-$, and $-\!\!+\!\!C\!\!+\!\!-$ are linked together in any order; and
applying the composition comprising the curable polymer on a surface of the solid support.

14. A method of making a curable polymer coating on a solid support comprising:
providing a solid support;
providing a composition comprising a curable polymer, wherein the curable polymer comprises:
one or more base acrylic repeating units ($-\!\!+\!\!A\!\!+\!\!-$);
one or more repeating units containing a reactive group amenable to subsequent functionalization selected from the group consisting of epoxy, carboxylic acid, and amine ($-\!\!+\!\!D\!\!+\!\!-$);
one or more repeating units containing a cross-linker ($-\!\!+\!\!C\!\!+\!\!-$),
wherein
$-\!\!+\!\!A\!\!+\!\!-$ is $-\!\!+\!\!R_3\!\!+\!\!-$;
$-\!\!+\!\!D\!\!+\!\!-$ is $-\!\!+\!\!C\!\!+\!\!-$ is $R_1$ is H or $CH_3$;

$R_3$ is a repeating unit of a base acrylic monomer in a polymerized form;

$R_4$ is H or $CH_3$;

$R_5$ is a group containing cross-linking moiety; and $R_7$ is a reactive group amenable to subsequent functionalization selected from the group consisting of epoxy, carboxylic acid, and amine, wherein the one or more of ─[─A─]─, ─[─D─]─, and ─[─C─]─ are linked together in any order; and applying the composition comprising the curable polymer on a surface of the solid support.

15. A curable polymer comprising:

one or more base acrylic repeating units ─[─A─]─;

one or more repeating units containing a reactive group amenable to subsequent functionalization selected from the group consisting of epoxy, carboxylic acid, and amine (─[─D─]─); and one or more repeating units containing a cross-linker ─[─C─]─, wherein ─[─A─]─ is ─[─$R_3$─]─;

─[─D─]─ is

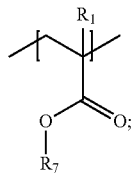

─[─C─]─ is

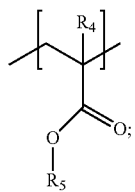

$R_1$ is H or $CH_3$;

$R_3$ is a repeating unit of a base acrylic monomer in a polymerized form;

$R_4$ is H or $CH_3$;

$R_5$ is a group containing cross-linking moiety; and $R_7$ is a reactive group amenable to subsequent functionalization selected from the group consisting of epoxy, carboxylic acid, and amine, wherein the one or more of ─[─A─]─, ─[─B─]─, and ─[─C─]─ are linked together in any order.

16. The curable polymer according to claim 15, wherein the curable polymer has the Formula (IIa):

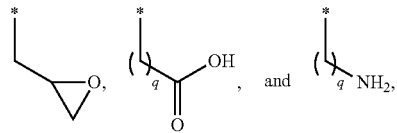

(IIa)

wherein p' is 1 or more;

n' is 1 or more;

m' is 1 or more; and wherein p'+m'+n' is 20 or more.

17. The curable polymer according to claim 15, wherein $R_7$ is selected from the group consisting of

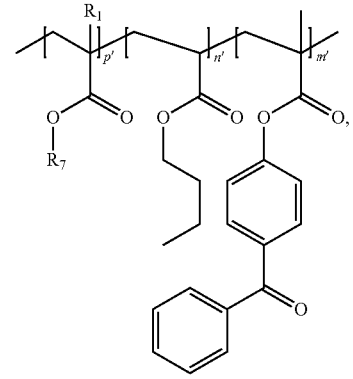

wherein q is 0 to 6;

X is $C_{1-6}$ alkyl; and

* is a point of attachment of $R_7$ to the polymer of Formula (IIa).

18. The curable polymer according to claim 15, wherein the curable polymer has the Formula:

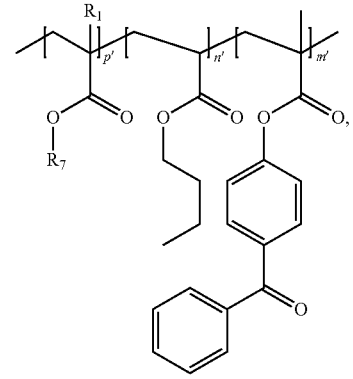

wherein p' is 1 or more;

n' is 1 or more;

m' is 1 or more; and wherein p'+m'+n' is 20 or more.

19. The curable polymer according to claim 15, wherein the curable polymer has the Formula:

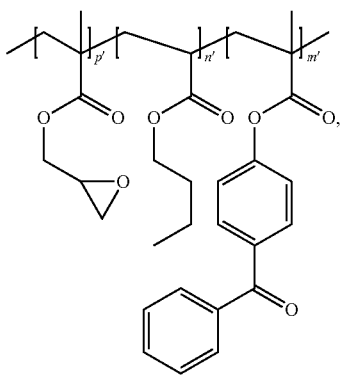

wherein p' is 1 or more;

n' is 1 or more;

m' is 1 or more; and wherein p'+m'+n' is 20 or more.

20. The method of claim 13, wherein the curable polymer coating is a bioactive curable polymer coating.

21. The method according to claim 13 further comprising:
curing the polymer on the solid support under conditions effective to provide the cured polymer coating.

22. The method according to claim 21 further comprising:
providing a compound containing a bioactive moiety; and reacting the polymer coating with the compound containing the bioactive moiety under conditions effective to provide the bioactive polymer coating.

23. The method of claim 13, wherein the polymer has the Formula (Ia):

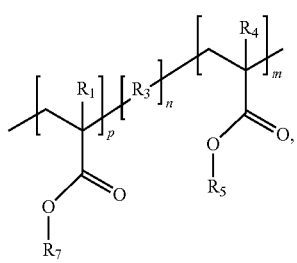

wherein p is 1 or more;

n is 1 or more;

m is 1 or more; and wherein p+m+n is 20 or more.

24. The method of claim 13, wherein $R_2$ is selected from the group consisting of

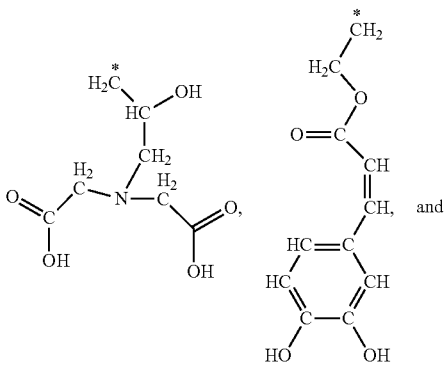

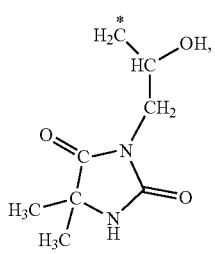

wherein * is a point of attachment of $R_2$ to the polymer of Formula (Ia).

25. The method of claim 13, wherein $R_3$ is selected from the group consisting of

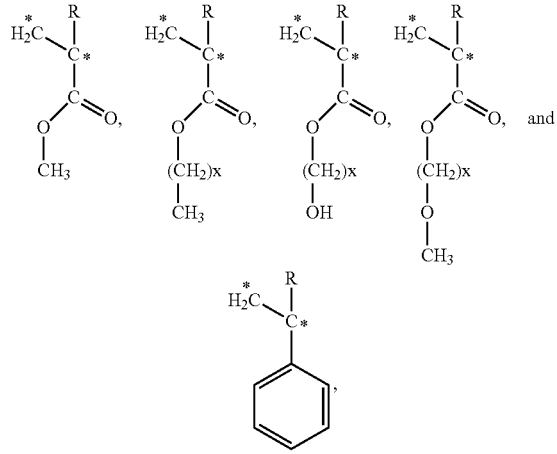

wherein * is a point of attachment of $R_3$ to the polymer of Formula (Ia).

26. The method of claim 13, wherein $R_5$ is a group containing a type II photo-initiator.

27. The method of claim 13, wherein $R_5$ is selected from the group consisting of benzophenone, benzophenone derivative, anthraquinone, anthraquinone derivative, aryl azide, and aryl azide derivative.

28. The method of claim 13, wherein the curable polymer has the Formula:

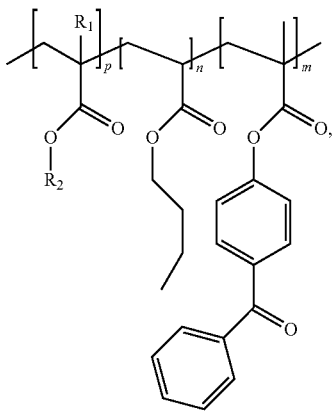

wherein p is 1 or more;

n is 1 or more;

m is 1 or more; and wherein p+m+n is 20 or more.

29. The method of claim 13, wherein the curable polymer has the Formula:

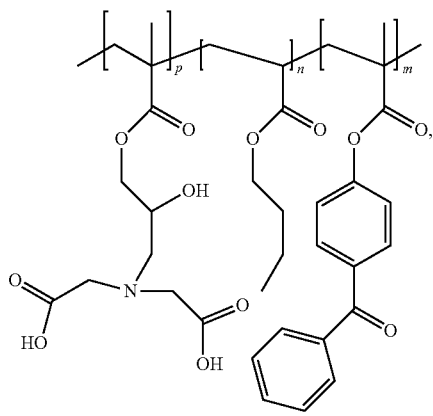

wherein p is 1 or more;

n is 1 or more;

m is 1 or more; and wherein p+m+n is 20 or more.

30. The method according to claim 14 further comprising:

curing the polymer on the solid support under conditions effective to provide the cured polymer coating.

31. The method according to claim 30 further comprising:

providing a compound containing a bioactive moiety; and reacting the polymer coating with the compound containing a bioactive moiety under conditions effective to provide the bioactive polymer coating.

32. The method of claim 14, wherein the curable polymer has the Formula (IIa):

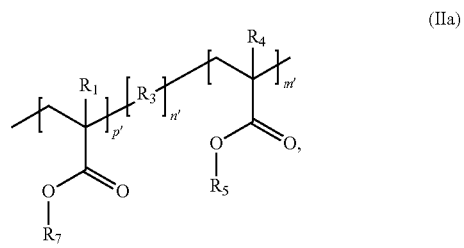

(IIa)

wherein p' is 1 or more;

n' is 1 or more;

m' is 1 or more; and wherein p'+m'+n' is 20 or more.

33. The method of claim 14, wherein $R_7$ is selected from the group consisting of

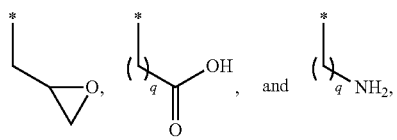

wherein q is 0 to 6;

X is $C_{1-6}$ alkyl; and

* is a point of attachment of $R_7$ to the polymer of Formula (IIa).

34. The method of claim 14, wherein the curable polymer has the Formula:

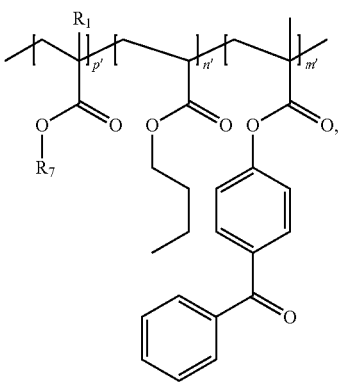

wherein p' is 1 or more;

n' is 1 or more;

m' is 1 or more; and wherein p'+m'+n' is 20 or more.

35. The method of claim 14, wherein the curable polymer has the Formula:
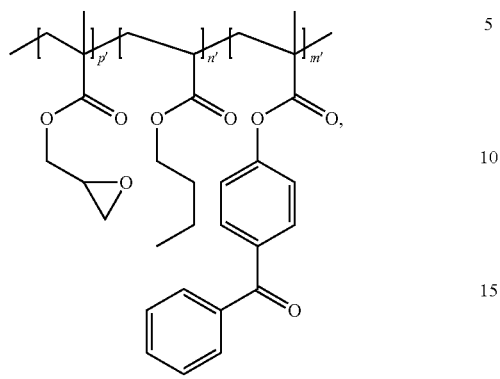
wherein
 p' is 1 or more;
 n' is 1 or more;
 m' is 1 or more; and
 wherein p'+m'+n' is 20 or more.

UNITED STATES PATENT AND TRADEMARK OFFICE
CERTIFICATE OF CORRECTION

PATENT NO. : 11,814,533 B2
APPLICATION NO. : 16/626186
DATED : November 14, 2023
INVENTOR(S) : Goddard et al.

Page 1 of 3

It is certified that error appears in the above-identified patent and that said Letters Patent is hereby corrected as shown below:

In the Claims

At Claim 5, Column 53, Lines 50-60, delete " 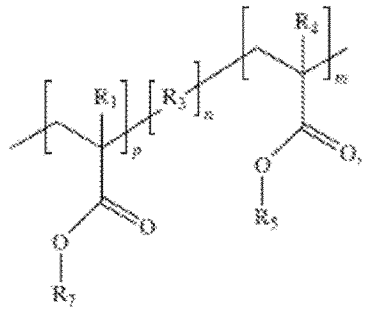 " and insert

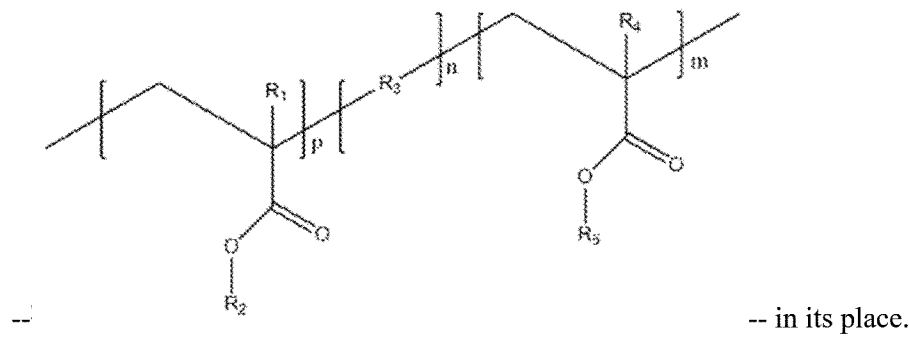 -- in its place.

Signed and Sealed this
Eighth Day of October, 2024

Katherine Kelly Vidal
*Director of the United States Patent and Trademark Office*

CERTIFICATE OF CORRECTION (continued)

At Claim 11, Column 55, Lines 30-47, delete " 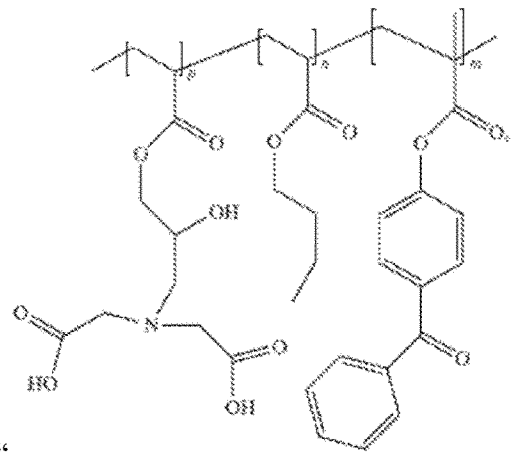 " and insert

-- 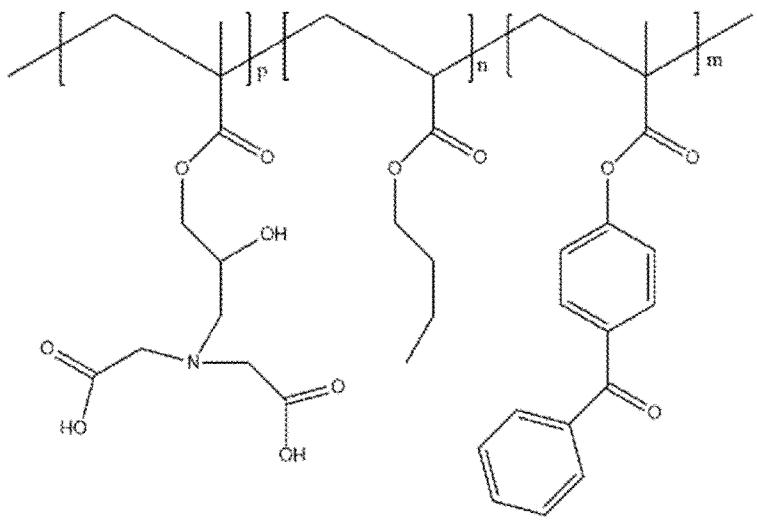 -- in its place.

At Claim 13, Column 56, Lines 1-9, delete " 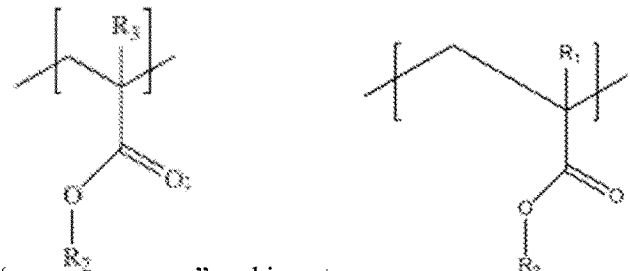 " and insert -- 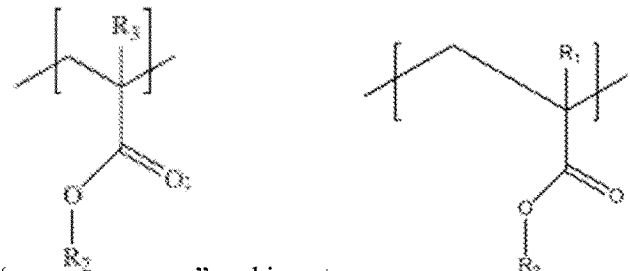 -- in its place.

At Claim 15, Column 57, Line 66, delete "―(B)―" and insert --(D)-- in its place.

CERTIFICATE OF CORRECTION (continued)
U.S. Pat. No. 11,814,533 B2

At Claim 23, Column 59, Lines 47-59, delete " 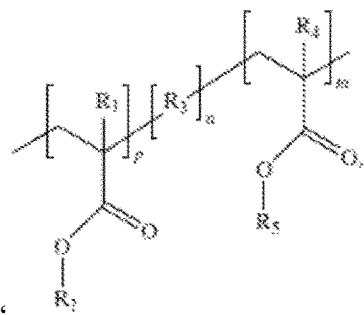 " and insert 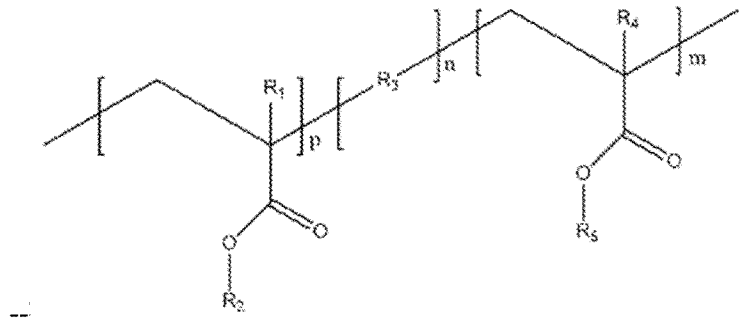 -- in its place.